United States Patent [19]

Blanchard

[11] Patent Number: 4,847,603

[45] Date of Patent: Jul. 11, 1989

[54] AUTOMATIC CLOSED LOOP SCALING AND DRIFT CORRECTING SYSTEM AND METHOD PARTICULARLY FOR AIRCRAFT HEAD UP DISPLAYS

[76] Inventor: Clark E. Blanchard, 1396 Mapleview SE., Kentwood, Mich. 49508

[21] Appl. No.: 859,120

[22] Filed: May 1, 1986

[51] Int. Cl.[4] ............................................. G02B 27/10
[52] U.S. Cl. .................................. 340/705; 340/980; 358/125; 350/145
[58] Field of Search ................ 340/705, 980; 358/139, 358/107, 103, 109, 125, 201; 324/74; 350/145, 174

[56] References Cited

U.S. PATENT DOCUMENTS

| | | | |
|---|---|---|---|
| 2,915,659 | 12/1959 | Goodman | 358/901 |
| 3,524,022 | 8/1970 | Schoenthal | 178/15 |
| 3,536,823 | 6/1967 | Goode et al. | |
| 3,710,018 | 1/1973 | Ryley et al. | 358/139 |
| 3,730,984 | 5/1973 | Smith | 358/139 |
| 3,939,486 | 2/1976 | Tomii | |
| 4,159,484 | 6/1979 | Strathman | |
| 4,167,113 | 9/1979 | Mann | 340/705 |
| 4,400,731 | 8/1983 | Brown | 358/107 |
| 4,485,394 | 11/1984 | Ghaem-Maghami et al. | 358/139 |
| 4,553,091 | 11/1985 | Bristol | 324/74 |
| 4,560,233 | 12/1985 | Banbury | 340/980 |
| 4,593,308 | 6/1986 | Kemplin | 358/139 |
| 4,625,153 | 11/1986 | Micic et al. | |
| 4,630,115 | 12/1986 | Hilsum | 358/139 |
| 4,632,508 | 12/1986 | Connelly | 340/705 |
| 4,636,843 | 1/1987 | Hosono et al. | |
| 4,647,967 | 3/1987 | Kirschner et al. | 358/139 |
| 4,683,467 | 7/1987 | Macaulay et al. | 340/705 |

FOREIGN PATENT DOCUMENTS 2156634 10/1985 United Kingdom .

Primary Examiner—John W. Caldwell, Sr.
Assistant Examiner—Mahmoud Fatahi-yar
Attorney, Agent, or Firm—Hill, Van Santen, Steadman & Simpson

[57] ABSTRACT

A display system and method, especially for use in an aircraft head up display system, for maintaining an optical image in a predetermined position on a light emitting screen. The system has a beam type image generator controlled by an operating circuit. A controlled beam scans both a central display region and marginal regions of the screen. The marginal regions have beam sensors and the beam is controlled by a sequence of plural coordinate commands in accordance with a plural coordinate search pattern restricted to the marginal regions and in the vicinity of the beam sensors. Signals resulting therefrom are utilized to eliminate beam deflection errors.

45 Claims, 27 Drawing Sheets

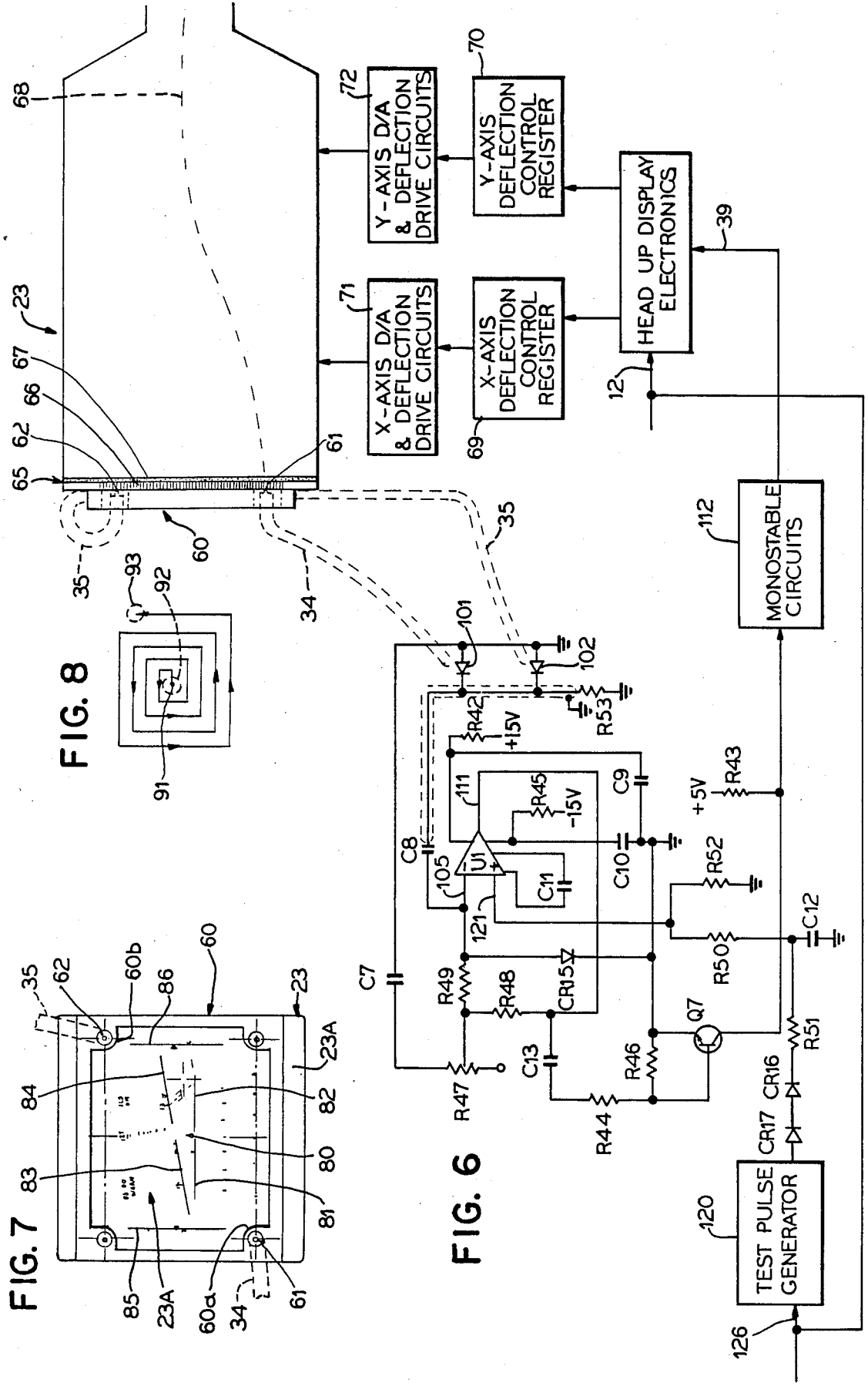

FIG. 9 (Z-AXIS LOGIC PC BOARD)
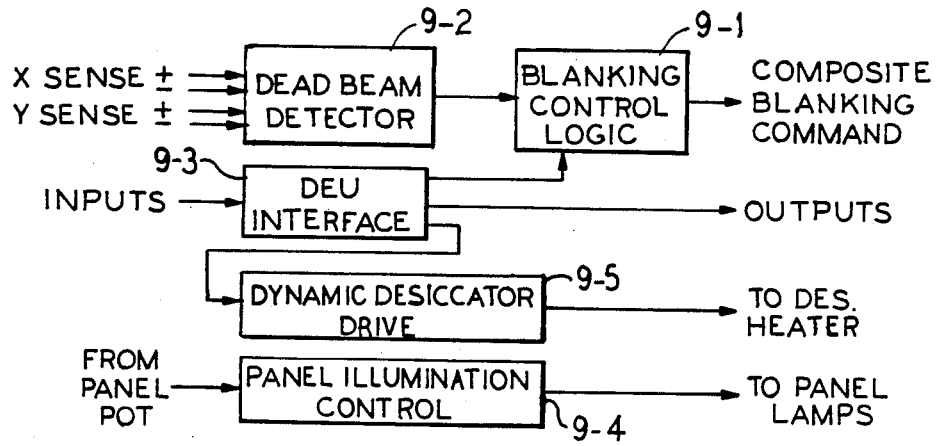
FIG. 10 (DEAD BEAM DETECTOR)
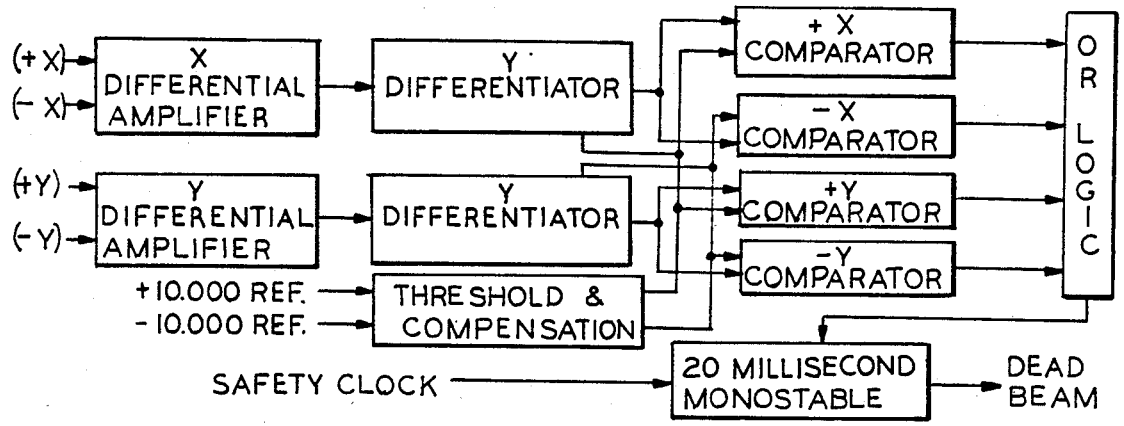
FIG. 11 (Z-AXIS ANALOG PC BOARD)
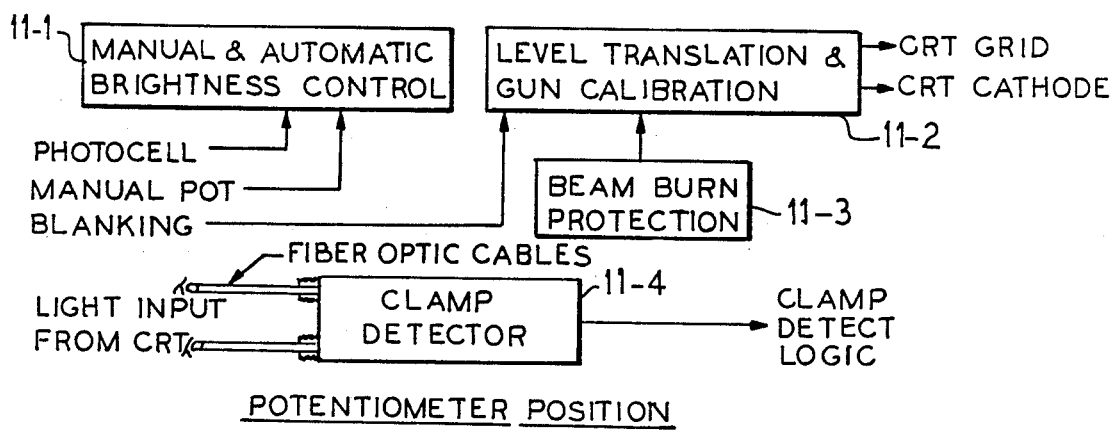
FIG. 12
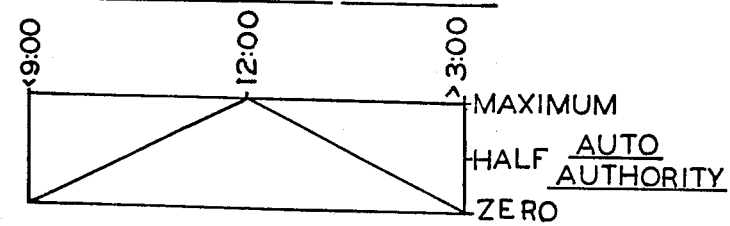

FIG. 13 (DISPLAY LOGIC PC BOARD)
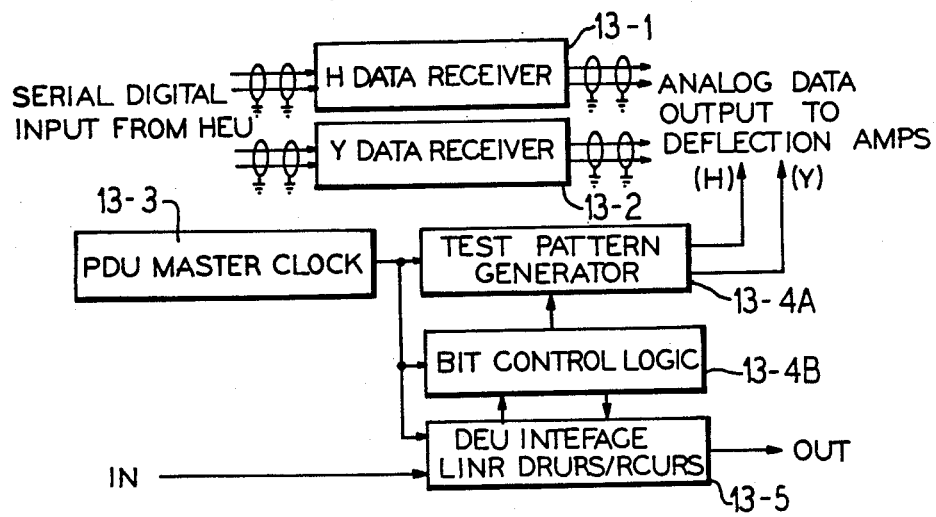
FIG. 14 (DATA RECEIVER CIRCUIT)
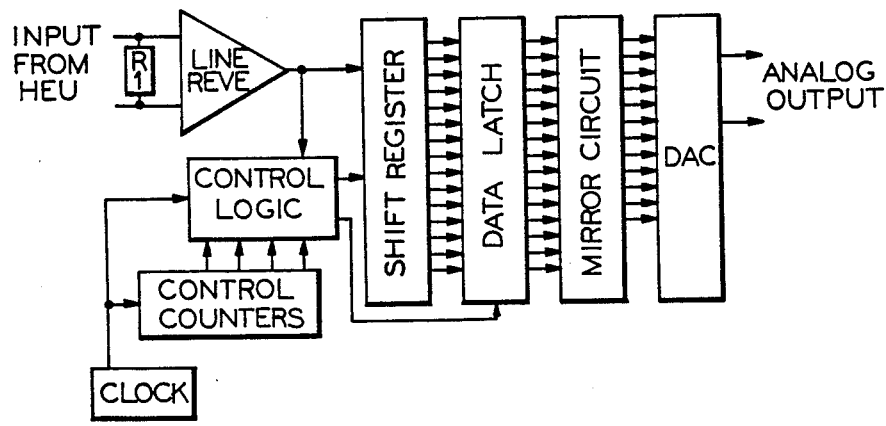
FIG. 15 (DEFLECTION AMPLIFIER)
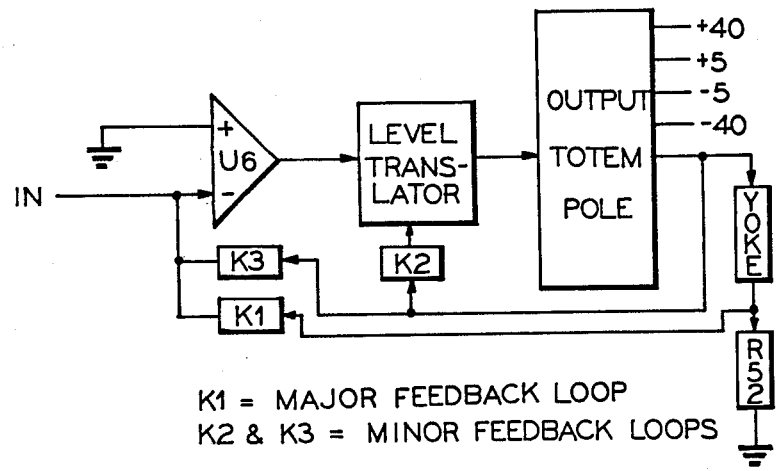
K1 = MAJOR FEEDBACK LOOP
K2 & K3 = MINOR FEEDBACK LOOPS FIG. 16 (HIGH VOLTAGE POWER SUPPLY)
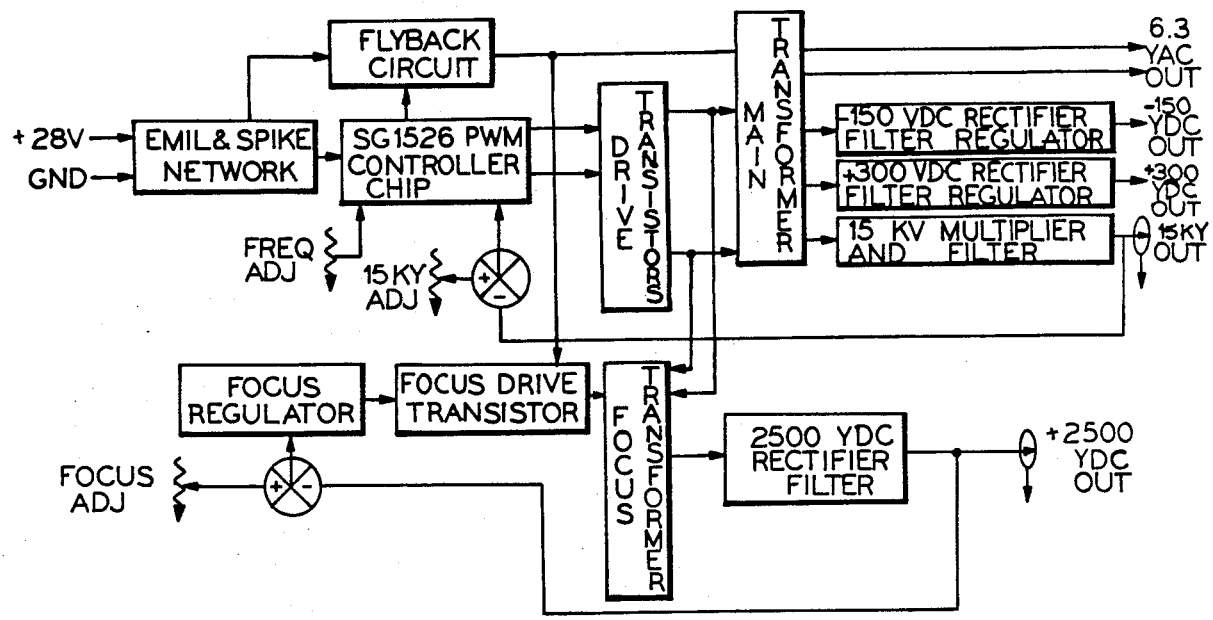
FIG. 17 (KEYBOARD SWITCHES)
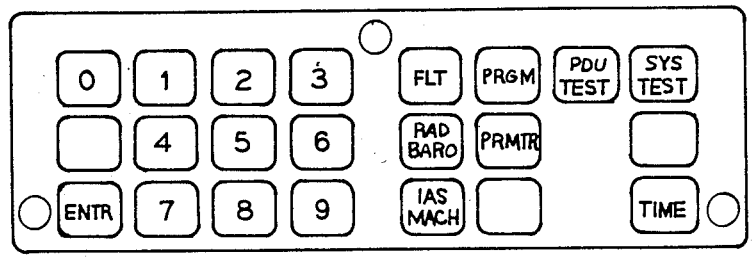
FIG. 18 (KEYBOARD INTERFACE PC BOARD)
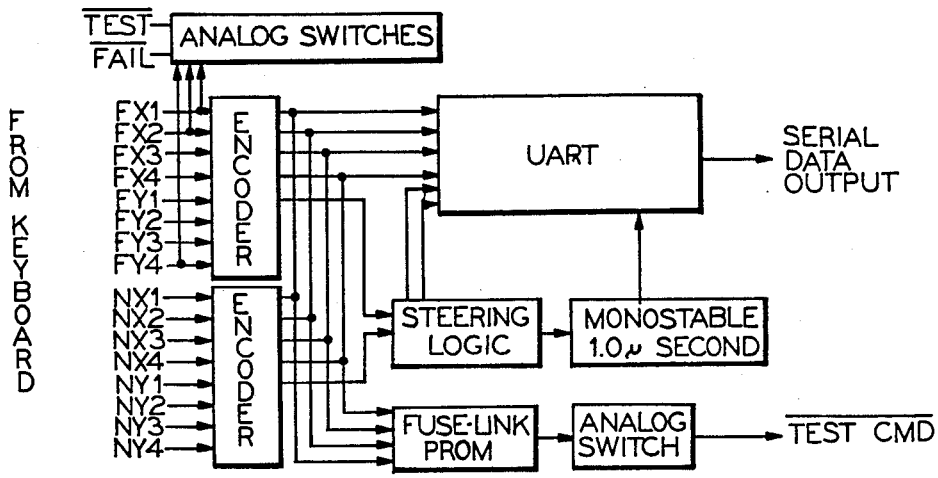

AUTOMATIC CLOSED LOOP SCALING AND DRIFT CORRECTING SYSTEM AND METHOD PARTICULARLY FOR AIRCRAFT HEAD UP DISPLAYS

BACKGROUND OF THE INVENTION

Certain applications of cathode ray tube (CRT) displays require highly accurate and reliable beam positioning with absolute registration. An example of this requirement exists for aircraft Head Up Displays (HUD). A HUD requires that certain CRT generated symbols be projected optically against the pilot's outside view of the real world, with accurate absolute registration. This accuracy must be maintained over production variation, environmental conditions, and over the life of the equipment. Present methods generally rely on use of high quality, expensive, low drift analog designs and components. In addition, periodic maintenance testing and calibration are also employed. Internal circuit monitoring is usually limited to a general test of the deflection amplifiers output with a known sample input. A much more desirable situation would involve monitoring the entire analog circuit path which controls the CRT beam position. A most ideal situation would be to drive the beam in a closed loop manner somewhat like a servo-mechanism.

Over a period of more than two decades, the military have proven the value of the HUD concept. All new generation fighter aircraft are equipped with HUD as standard issue. A major reason that the concept has been slow to penetrate the civil sector is cost. It is considered that the potential market in civil aviation for a cost effective HUD system has been substantial for a considerable number of years.

SUMMARY OF THE INVENTION

It is therefore a principal object of the present invention to provide an aircraft head up display system which may be implemented and maintained in a relatively economical manner so as to be suited to use in business and commercial aircraft, while yet providing a high degree of reliability over the life of the equipment.

A further object of the invention resides in the provision of a real time display system and method wherein beam deflection is periodically monitored, and registration errors are automatically corrected without detriment to the continuous display of real time information, for example, such as required by a pilot during landing of an aircraft.

It is also an object of the invention to provide a display system and method adaptable to aircraft head up display equipment and similar applications requiring highly accurate and reliable beam positioning with essentially absolute registration, wherein components with less stringent tolerance specifications may be utilized, and wherein the operational status of the display system may be automatically monitored while the equipment is in use for its intended purpose.

Another object of the invention is to provide a display system and method àpplicable either to a raster type display or to a stroke generating type display and which will automatically maintain a desired image scaling relationship and/or image centering in spite of enivronmental variations, component aging effects, and the like.

A feature of a preferred form of the invention resides in the provision of an aircraft head up display system wherein errors in image scaling and/or centering can be detected without detriment to an apparently continuous real time display in the pilot's field of view, and wherein errors are corrected by compensating the invididual beam deflection commands as generated by the HUD digital computer system itself (without reliance on the supply of separate gain and/or drift correction signals to the deflection amplifiers), so as to provide a system of increased simplicity, economy and reliability.

A further feature of preferred embodiments of the invention involves the optical transmission of beam position light pulses generated at the image display screen to photoelectric transducer means located remotely from the fluctuating electrostatic fields of the image display tube, so as to enable the use of simple pulse sensitive electronic circuitry for detecting beam alignment with known points on the image display screen.

In a preferred implementation of the present invention the exact deflection command signals required to position the beam at known locations are determined. If two known locations are used, both the drift (centering) and scaling errors in the deflection control can be directly determined and subsequently compensated. This concept will hold true for both raster and stroke formats. Detection of the beam at the chosen known locations is facilitated with photodetectors. In a raster type format, each photodetector will provide a pulse output when the beam is positioned at an associated beam sensing location. At this time the values of the horizontal and vertical deflection commands are stored. These values for each detector are then compared to baseline reference values, thereby obtaining a measure of the correction (or deviation) required to offset the effects of drift and/or scaling errors present in the system. Subsequently, these correction values can be used to compensate the main deflection control, thereby achieving accurate absolute registration of the CRT video image positioning. Implementation in a stroke type CRT format requires a slightly different technique because the beam does not periodically traverse the entire CRT face area. In a stroke CRT application, normal symbol generation may be periodically interrupted for a negligible time interval for testing beam registration. During a test, the beam is driven in a search patten in the known vicinity of a photodetector location. When the detector senses the beam at its location, it will signal the test control. The test control will store the instantaneous horizontal and vertical deflection command values. These values for each detector are than compared to baseline reference values, thereby obtaining a measure of the correction required just as in the case for the raster CRT. The test at respective detector locations can be performed in respective sequential intervals between normal symbol generation frames if required. The registration testing time intervals are kept short enough to be transparent to the human observer. The photosensors are coupled with beam sensing locations near the CRT outer face edge to avoid obstruction of the display. The use of two photodetectors is sufficient to allow logical determination of both drift (centering) and gain errors in the deflection system.

The advantages of a preferred implementation of the present invention include the following:

(1) Allows relaxation of critical deflection design parameters and of periodic maintenance schedules, with attendant economies.

(2) Simplicity of the required hardware.

(3) Provides correction based on testing of the entire beam control path so as to compensate for the effect of many specific error sources.

(4) Corrects for both drift (centering) and scaling errors.

(5) Monitors an essentially analog path digitally.

(6) Can be extended to determine long term trends in degradation for preventative maintenance.

(7) Automatic—does not require manual involvement.

(8) Does not require precision voltage or precision time base.

(9) Distinguishes between a correctable error and a gross malfunction.

A preferred embodiment of the invention has been reduced to practice and is now operative in a head up display system which is commercially available from Jet Electronics and Technology, Inc. of Grand Rapids, Mich.

Other objects, features and advantages of the present disclosure will be apparent from the following detailed description taken in connection with the accompanying sheets of drawings, and from the respective claims appended hereto.

BRIEF DESCRIPTION OF THE DRAWINGS

FIG. 6 shows exemplary details of a preferred implementation of the beam position sensing means of FIGS. 1 and 2;

FIG. 7 is a somewhat diagrammatic frontal view of the cathode ray tube faceplate (which is shown in FIG. 6 as it appears when looking toward a side edge thereof) and which faceplate frames an optical display for the closed loop HUD system of FIG. 2; and FIG. 8 is an enlarged diagrammatic view illustrating a portion of an exemplary beam search pattern which may be utilized to determine the actual beam positions corresponding to selected fixed locations such as the pinholes of the faceplate of FIG. 7 in the case of a stroke type symbol generator;

FIGS. 9, 10, 11 and 13–18 are block diagrams of various components of a head display system which has been built and successfully tested;

FIG. 12 is a graphical illustration showing the variation in gain as a function of a potentiometer setting for the brightness control of FIG. 11.

DESCRIPTION OF FIGS. 1–5

Figure 1:
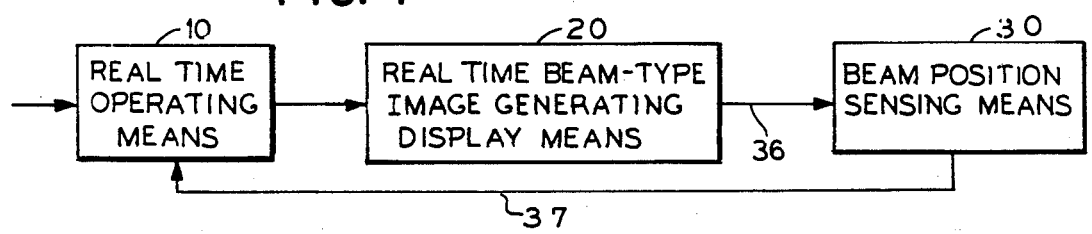
FIG. 1 is a block diagram for indicating the basic concept of certain preferred embodiments of the present invention.

FIG. 1 illustrates a system and method according to the present invention whereby scaling errors and/or drift in a real time display are automatically corrected with the use of a closed control loop. The diagram of FIG. 1 is more readily understood by reference to FIG. 2 which shows an aircraft head up display system in accordance with the basic concept of FIG. 1.

Figure 2:
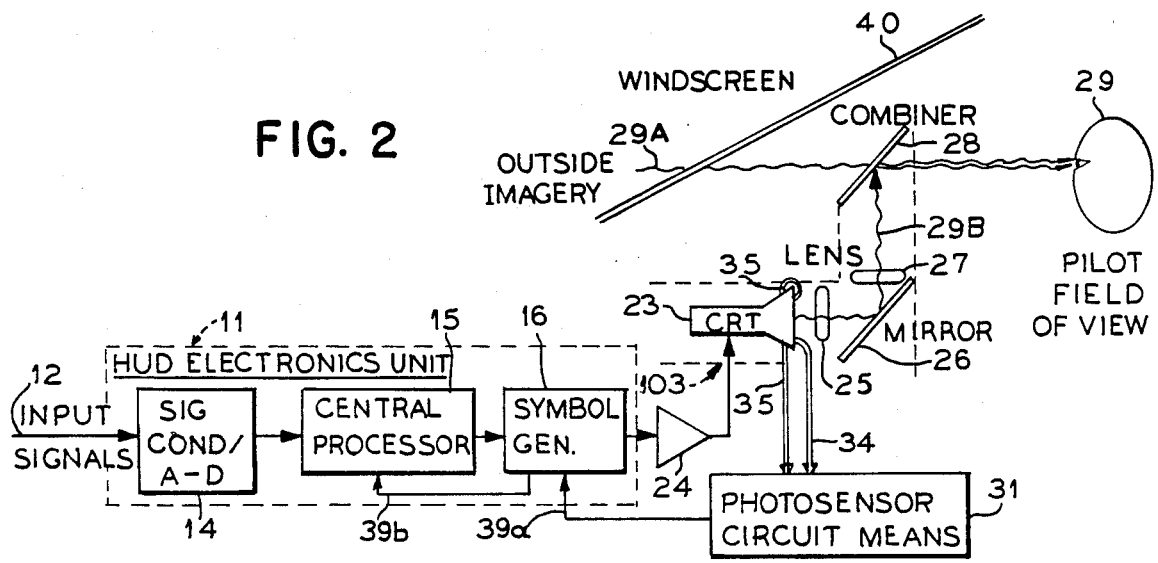
FIG. 2 is a diagrammatic view for indicating an aircraft head up display system as a preferred implementation of the block diagram of FIG. 1.

For the specific example of FIG. 2, real time operating means 10, FIG. 1, may comprise a HUD electronics unit 11 for supplying analog deflection command signals in accordance with input signals at 12 from the aircraft instrumentation. Exemplary input signals from the aircraft might include signals for defining the attitude (roll and pitch) and heading of the aircraft, altitude, speed, and other parameters useful to the pilot during takeoff, flight and landing of civil aircraft.

By way of example, these input signals may be in analog form and may require conversion conditioning to a suitable format by means represented by block 14 in FIG. 2. The aircraft input signals may be filtered and stored by central processor 15 for use in controlling symbol generator component 16. The central processor 15 manages the entire operation of the HUD system. It controls the input signal conditioning, data storage and reads the pilot control panel 18, FIGS. 3 and 4, on the pilot display unit 19, which may correspond generally with block 20, FIG. 1. Based upon pilot selected modes and the nature of the input signal data, the central processor 15 manages the symbol generator 16. To do this it may compute the value, position, and orientation of each individual symbol to be displayed.

As a result of these solutions, the central processor 15 loads a memory with commands for generation of each required symbol. Sixty times per second this data block is transferred to the symbol generator to execute. In an exemplary embodiment, central processor component 15 is implemented utilizing a commercially available sixteen bit microprocessor.

The symbol generator 16 receives the block of data which defines the required symbols, their values, positions and orientations. It then generates sequential high speed waveforms used to drive cathode ray tube 23, so as to produce the defined symbols. To achieve this, it generates three separate signals simultaneously:

Vertical deflection
Horizontal deflection
Blanking (video)

Each symbol set is generated at a rate of sixty times per second. This is necessary to eliminate display flicker and to insure a good brightness level from the CRT phosphor screen.

Cathode ray tube symbol generation is performed in either of two general techniques:

raster
stroke

Raster generation uses a beam which continously sweeps successive horizontal lines until the entire screen has been traced. Imagery is formed by modulating the beam intensity as the raster pattern is traced. TV is a raster generated image.

Stroke generation controls both beam position and intensity in a writing pattern as dictated by the imagery to be generated. Stroke generation requires complex high speed deflection signals for both horizontal and vertical axes, in addition to synchronous beam intensity control. Oscilloscopes are driven using stroke techniques.

The cathode ray tube 23, FIG. 2, may be a small (2.375"×3" screen) unit which is driven in stroke, like an oscilloscope, rather than in raster like a TV. It emits a green image which has a very narrow spectral band. This is done to enable special filtering in the optics.

Stroke symbol generators typically require large amounts of high speed digital circuitry. Significant reduction in the requirement has been achieved in a preferred implementation wherein a second sixteen bit microcomputer with special software emulates conventional stroke symbol generator hardware. The output of the symbol generator consists of two high speed analog deflection signals scaled to drive the CRT deflection amplifiers and a blanking control. The analog amplifiers are represented by component 24 in FIG. 2.

Figure 3:
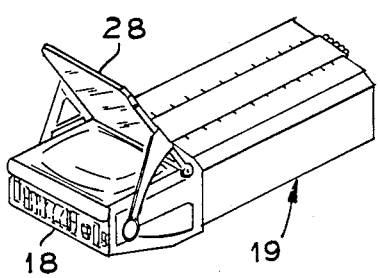
FIG. 3 is a diagrammatic perspective view showing the overall physical appearance of a pilot display unit for housing certain of the components of FIG. 2.

The cathode ray tube 23, located in the Pilot Display Unit 19, FIG. 3, is used to form the optical image. It receives signals from the symbol generator 16 which control beam position and intensity. The functions of the optics indicated at 25-28 in FIG. 2 are to:

Efficiently collect the imagery from the CRT screen.
Collimate (focus at infinity) the image.
Combine it with the real world image.
Project it into the pilot's field of regard at a 12-25 inch viewing distance and a 15° (height) by 30° (width) total field of view.
Provide optical correction to enable moderate head movement and binocular vision.
Insure adequate brightness/contrast to be seen against a luminous environment of 8,000-10,000 foot lamberts.

The optics unit will include:
CRT mounted inside its electromagnetic interference (EMI) shield and optically fixed relative to the optical path.
Image collector and corrector lenses indicated at 25 in front of the CRT.
A reflecting mirror 26 to direct the image upward to the combiner glass 28.
A collimating lens 27 to focus the image at infinity.
The combiner glass 28 used to both transmit the outside image represented at 29A, FIG. 2, and reflect the virtual image 29B to the pilot field of view 29. The combiner may be coated with a suitable filter to enhance contrast and aid symbol viewing in high brightness environment.

Component 30 in FIG. 1 is specifically represented by photosensor circuit means 31 in FIG. 2. For the sake of a specific example in FIG. 2, a fiber optic cable means indicated at 34 and 35 in FIG. 2, are shown as being aligned with specific locations on the screen of cathode ray tube 23. The beam position sensing means 30, FIG. 1, is shown as having a coupling 36 with display means 20 whch may comprise an optical coupling as shown at 34 and 35 in FIG. 2, and as having a feedback connection 37 with real time operating means 10 so as to provide a closed loop control configuration. In the specific example of FIG. 2, the photosensor circuit means 31 is shown as being coupled with an interrupt input 39a to symbol generator component 16. The symbol generator 16 reports the beam position to the central processor 15 on input 39b to complete the feedback path. The feedback connection at 39b in FIG. 2 allows control of the CRT beam in a closed loop manner analogous to a servomechanism. The preferred closed loop control system enables precise beam positioning over the temperature range to which business and commercial aircraft are subjected for the useful life of the equipment, without ultra expensive analog design or frequent manual calibration. Precise beam positioning is required to facilitate registration of the synthetic symbols against the real world image.

An early closed loop control system as represented in FIG. 2 had four photodetectors coupled with four corners of the CRT screen, but presently only two beam position sensing locations at diametrically opposite corners are being used to correct for both scaling and drift errors. The detectors sense beam position during a special automatic calibration routine. As a result of this calibration, the system can determine bias and scaling drift within the system and automatically insert compensation in a closed loop manner.

The calibration routine is automatic, periodic and transparent to the pilot.

A detailed explanation of the processing of the beam position signals is given hereafter in conjunction with the description of FIGS. 6 to 8.

Figure 4:
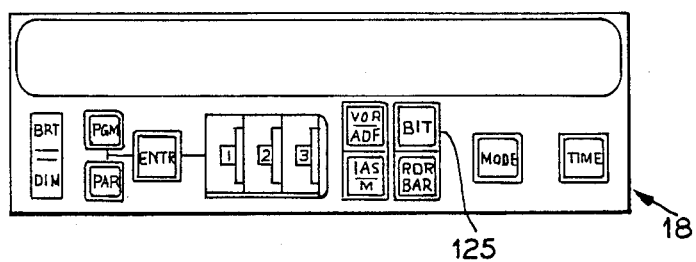
FIG. 4 is a diagrammatic frontal view showing an exemplary pilot control panel for the unit of FIG. 3.

An example of a pilot's control panel 18 is shown in FIG. 4. A more recent arrangement is shown in FIG. 17.

Measured from the pilot's eye reference, the pilot display unit (PDU) structure 19, FIG. 3, may be contained within the angular sector between −13° and −25°. In addition, it should not penetrate the instrument panel structure in depth nor extend closer than twelve inches ahead of the pilot's eye reference. Laterally, the unit may be constrained by the compound curve of the windscreen.

In addition, the installation requires a highly rigid bore-sighted mounting. To accommodate this requirement, the PDU may be mounted in a fixed tray. The tray will adapt to the specific aircraft installation and be permanently boresighted. This arrangement will enable removal of the PDU for maintenance without reboresighting. Hardware and software for electronic boresight alignment are provided in the system. It will also accommodate various type installations with a common model PDU. The Hud Electronics Unit 11, FIG. 2, can be installed remote from the PDU component 19 to allow for maximum installation flexibility.

Figure 5:
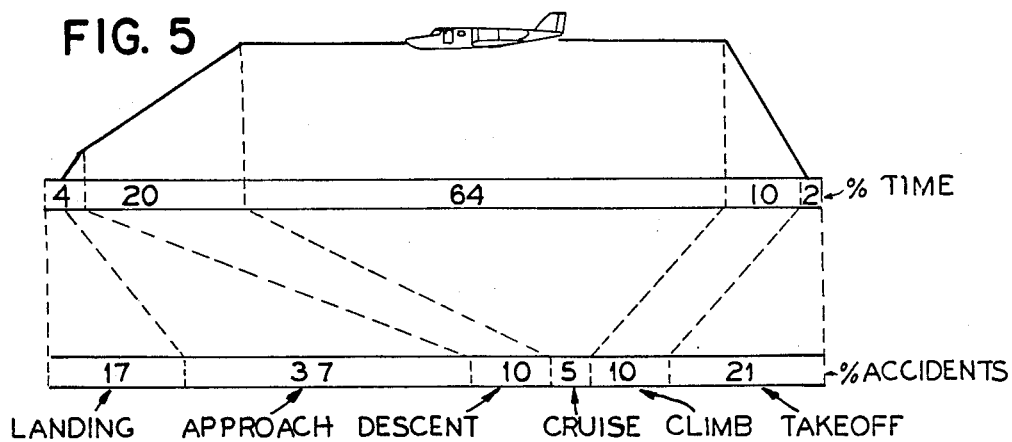
FIG. 5 shows a profile of the phases of aircraft flight with numerical scales for indicating the percentage of the time of an average flight occupied by the various phases, on the one hand, and for indicating the percentage of accidents which occur during the various phases, on the other hand.

FIG. 5 is included by way of background for emphasizing the utility of a HUD system for civil aircraft, particularly during the approach and landing phases of aircraft operation. FIG. 5 shows in a profile diagram where different percentages of aircraft accidents occur; specifically 21% are shown as occurring on takeoff and 54% during landing mode including approach and landing phases.

Closely associated with these accident statistics is the transition and accommodation burden placed upon the pilot. This is explained as follows, having reference to aircraft lacking a head up display.

Normally a pilot controls the flight of his aircraft using information from two widely different sources. One source is the visual information seen through the cockpit windscreen 40, FIG. 2. This "real world" information 29A is seen focused at infinity while looking "head up."

The second source of visual information (in the absence of a head up display) is represented on the flight instruments in a wide variety of formats. This instrument information is seen focused at 28-30 inches while looking "head down."

Neither information source is fully adequate to furnish the pilot's total data requirements in all phases of flight. Therefore, he must extract data from both sources which requires transitioning between "head up" and "head down."

This visual transition places many psychological and physiological burdens on the pilot. Physiological accommodation must be made for wide ranges of focal lengths, acuity and lighting levels. Psychological accommodation centers around the widely different formats in which information is made available between the real world scene and various cockpit instruments.

This visual transition and related accommodation situation are most critical during the landing phase.

The stringent demands on a real time display system such as a HUD sysdtem are particularly apparent when the landing mode of a high performance aircraft is considered. Specifically FIG. 5 illustrates on the "% Time" scale that approach and landing account for four percent of the elapsed time between takeoff and landing for an average flight. Referring to the "% Accidents" scale, the approach phase contributes 37% of the accidents, while landing phase is involved in 17% of the accidents.

DESCRIPTION OF FIGS. 6, 7 AND 8, AND EXPLANATION OF PROCESSING OF BEAM POSITION SIGNALS

In the specific embodiment of FIGS. 6, 7 and 8, a light emitting screen 65 of the cathode ray tube 23 may comprise a fiberoptic light transmissive end wall 66 and a fluorescent layer 67. the end wall 66 is shown as having an opaque mask 60 covering the marginal region, and the faceplate 60 has pinholes 61 and 62 for transmitting light pulses when the electron beam 68 is instantaneously aligned therewith. In the programming of the electronics unit 11, FIG. 2, the points on the cathode ray tube screen aligned with pinholes 61 and 62 may be assigned reference coordinate values which may be designated as X1,Y1 and X2,Y2, respectively, for the case of a cartesian coordinate system where the variables X and Y represent horizontal and vertical beam deflection, respectively.

Where the beam deflection circuits of component 24, FIG. 2, are controlled by respective horizontal and vertical deflection registers of symbol generator 16, in the absence of any beam registration errors, loading the reference values X1 and Y1 in the horizontal and vertical deflection registers would cause deflection of the beam so as to be in alignment with pinhole 61, while loading of reference values X2 and Y2 would align the beam with pinhole 62. Such horizontal and vertical deflection command registers have been indicated at 69 and 70 in FIG. 6, and have been indicated as controlling respective digital to analog converters and analog driver circuits of components 71 and 72, FIG. 6.

In the case of a raster type display, the beam might be deflected in a horizontal direction (e.g. from left to right as viewed in FIG. 7) over positions corresponding to count values from zero to one thousand and twenty three in the horizontal deflection register. The range in the vertical direction (e.g. from top to bottom in FIG. 7), an an arbitrary example, might also correspnd with count values from zero to one thousand and twenty three, (although then incremental vertical deflection for each count might be less than for the horizontal deflection). With such a range of count values, the reference coordinate values assigned to pinholes 61 and 62 might be RX1=183, RY1=183, and RX2=839, RY2=839.

For this numerical example, with zero registration error, the beam would align with pinhole 61 when scanning along line number one hundred eight-three, (Y=183), and pinhole 62 would be activated during scanning of line number eight hundred thirty nine, (Y=839). The beam blanking control may then turn on the beam for successive lines in the vicinity of lines one hundred eighty three and eight hundred thirty nine, and for values of horizontal deflection approximately corresponding to the horizontal extent of mask regions 60a and 60b, so that such scanning does not appear in the pilot's field of view (indicated at 29 in FIG. 2).

As explained in reference to FIG. 2, the light pulses representing the instants of beam registration with pinholes 61 and 62 may be conducted by fiber optic cables 34 and 35 to photosensor circuit means 31, FIG. 2, which provides respective interrupt signals at input 39. In this way the actual coordinate values at beam coincidence, (designated AX1, AY1, and AX2, AY2) may be stored in central processor component 15, FIG. 2.

For the case of a symbol generator 16, FIG. 2, which operates on the stroke generating principle, individual symbology elements such as indicated 80-86 in FIG. 7, as well as the smaller symbols and alphanumeric elements are generated by respective sets of deflection command sequences in each successive frame. In this case, further command sequences can be introduced at suitable intervals for causing the beam to execute search patterns in the vicinity of pinholes 61 and 62. An example of such a search pattern, shown greatly enlarged, is given in FIG. 8.

In searching in the vicinity of pinhole 61, for example, the beam might be turned on at starting point 91, with deflection command values X=183, Y=183, in the initial instance, so that pinhole 61 would be activated at once for the case of zero registration error. The next search command as indicated in FIG. 8, would be X=184, Y=183, followed by X=184, Y=184, and so on. The search pattern would cover each point in the vicinity of pinholes 61 and 62. The size of the beam spot is indicated at 92 in FIG. 8, and the size of the pinholes 61 and 62 is indicated at 93. The relationship of the sizes is such that even when the beam center intersects a margin of the pinholes, sufficient light will be transmitted through the pinhole to actuate the photosensor circuit 31, FIG. 2. (A preferred photosensor circuit is shown in FIG. 6.)

For the example of FIG. 8, the pinhole 61 as represented by circle 93 would be discovered at coordinate values AX1=188, AY1=186, and these values would be stored by central processor component 15, FIG. 2. The search pattern such as shown in FIG. 8 would be of total extent such as to be reliably confined behind the mask portions 60a and 60b. The starting point 91 for each successive search pattern may be at the coordinates found in the immediately previous search. Thus the second search pattern in the vicinity of pinhole 61 would be initiated with deflection command values X=188, Y=186, and would progress through points X=189, Y=186; X=189, Y=187; X=188, Y=187; X=187, Y=187; and so on.

Since the result of activating the phosphor of the CRT screen is not the production of a theoretical geometrical point of light, but rather of a spot of given diameter, and also due to reflection, diffusion, and acceptance angle effects in the conveyance of the light between the CRT phosphor and the light detection apparatus, some ambiguity will ensue in determining the exact position of the beam. In order to eliminate this ambiguity, the search operation occurs in two phases; the coarse locating mode followed by the fine positioning determining mode.

The coarse locating mode simply scans the search pattern already described until a detection event occurs. This event indicates that the beam position causing the event is within the circle of ambiguity resulting from the above described causes.

The fine positioning mode is then executed, which enables the system to find the center of the circle of ambiguity. As a description of one possible technique which has been successfully implemented, two search scans are made in the horizontal (X) axis, one approaching the circle of ambiguity from the left, and the other approaching from the right. The X command values at each occurrence of the detection event are stored, and the difference between them is calculated and then divided by two. The resulting number is then added to the smaller value so as to yield a value representing the X position of a vertical line bisecting the circle of ambiguity, which line obviously passes through its center.

Now the circle of ambiguity is approached along the line just established, first from the top downward followed by an approach from the bottom upward, and the Y command values upon the detection event are determined and stored. A similar algebraic procedure then determines the halfway point between the Y intercepts of the circle of ambiguity, and the theoretical center has been determined. These values, in conjunction with those determined for the other detection location, are subsequently compared with the reference values and used for the calculation of the required corrections in offset and scaling.

The successive searches in the vicinity of pinholes 61 and 62 may take place at intervals such as to insure that the pinholes 61 and 62 will always fall within each successive search pattern.

The principles involved in determining gain and drift errors from the beam position measurements are similar for the horizontal and vertical deflection axes, and are explained as follows.

Let $\Delta X$ and $\Delta Y$ be the magnitudes of the corrections required to position the beam properly with reference to the horizontal ansd vertical axes at each respective sensing location. Then let $\Delta X1$ and $\Delta Y1$ relate to the required corrections for pinhole 61 and $\Delta X2$ and $\Delta Y2$ represent the corrections required for pinhole 62. As a sign convention, assume that a positive $\Delta X$ value refers to a required shifting of the beam to the right as viewed in FIGS. 7 and 9, and assume that a positive $\Delta Y$ value indicates a need to shift the beam upwardly. Thus, if AX1=188 and AY1=186, (corresponding to location 93, FIG. 8, for the case of pinhole 61 as previously described), then the correction $\Delta X1$ would be plus five (AX1−RX1=188−183=+5), and correction $\Delta Y1$ would be plus three (AY1−RY1=186−183=+3). To shift the beam reference position (RX1, RY1), e.g., at 92, FIG. 8, to the actual position of the pinhole (AX1, AY1), e.g., at 93, the beam is to be shifted five count increments to the right (the direction assigned positive polarity) and three counts increments upward (also assigned positive polarity).

If the position of pinhole 62 were sensed at a position AX2=834, AY2=836, then $\Delta X2$ would be minus five (AX2−RX2=834−839=−5), and $\Delta Y2$ would be minus three (AY2−RY2=836−839=−3), and the X- and Y-axis scaling errors would be plus ten [$\Delta X1 - \Delta X2 = +5-(-5) = +10$] and plus six [$\Delta Y1 - \Delta Y2 = 3-(-3) = +6$]. The polarity would indicate that X-axis gain and Y-axis gain were too high.

On the other hand, if pinhole 61 was offset from the reference position (RX1, RY1) so as to require corrections of $\Delta X1 = +5$, $\Delta Y1 = +3$ as before, but pinhole 62 was detected at the reference position and therefore required zero corrections (i.e., $\Delta X2 = AX2 - RX2 = 839 - 839 = 0$; and $\Delta Y2 = AY2 - RY2 = 839 - 839 = 0$), then the scaling errors would be reduced to plus five for the X-axis gain and plus three for the Y-axis gain, the polarity indicating the X-axis deflection gain and Y-axis deflection gain were again too high. Further, the lack of symmetry between the required X and Y axis corrections with respect to pinholes 61 and 62 would indicate a drift of the display image, i.e., a drift of the display image to the left and downward relative to a midpoint intermediate between pinholes 61 and 62.

The X-axis error logic may be summarized as shown in the following table:

| | $\Delta X2$ | | |
|---|---|---|---|
| $\Delta X1$ | − | 0 | + |
| + | High Gain | High Gain Left Drift | Left Drift |
| 0 | High Gain Right Drift | O.K. | Low Gain Left Drift |
| − | Right Drift | Low Gain Right Drift | Low Gain |

This type of error determination logic holds qualitatively for both axes. Quantitatively, difference values provide a means of precise error compensation. Although a variety of test beam search patterns could be employed, the expanding square shown in FIG. 8 is given as an example. In FIG. 8, generally point 91 may represent the last known deflection coordinates where the pinhole 61 and 62 was located during an immediately previous search, and location 93 may represent the pinhole location determined as a result of the illustrated search pattern which began at point 91. Generally, the closed loop control system establishes new deflection coordinates for each symbol generated so as to reduce gain and drift errors in the resultant image display and so as to minimize the deviation between the desired pinhole coordinate values (RX1, RY1; RX2, RY2) and the successive actually observed pinhole coordinate values (AX1, AY1; AX2, AY2).

Thus, if a drift to the left is found (e.g., as viewed in FIG. 8), the subsequent symbol generating commands can each be numerically corrected by adding an X-bias value such that the display image at 23A, FIG. 7, tends to resume its illustrated centered relationship, with symbol 80, for example, precisely aligned with the optical axis.

For the case where the horizontal gain is found to be excessive, symbols at the left of the display region 23A may have proportionate gain correcting values added thereto, so that such symbols tend to be adjusted proportionately in a rightward direction, while for symbols at the right of the display region, proportionate gain correcting values may be subtracted to tend to shift such symbols proportionately in a leftward direction. A similar situation will exist for vertical axis gain and drift corrections such that the control loop tends to maintain the image display precisely centered relative to the optical system, and with constant gain on both axes. As a result, displayed lines 83, 84, FIG. 7, may be adjusted to maintain slopes accurately conforming to that of the earth's horizon, for example, relative to the roll condition of the aircraft as represented by lines 81, 82, for example, in spite of different degrees of variation in X-axis and Y-axis gain during aircraft flight operations.

FIG. 6 shows a preferred circuit for implementing photosensor circuit means component 31 of FIG. 2. In this embodiment the light pulses produced at pinholes 61 and 62 are detected by PIN (Positive-Intrinsic-Negative) diodes 101 and 102, which are optically coupled with the pinholes by means of fiberoptic cables 34 and 35. The diodes 101 and 102 are mounted on a printed circuit board remote from the cathode ray tube 23, and outside of the electromagnetic interference shield 103 as indicated in FIG. 2. Thus the diodes 101 and 102 are essentially outside the influence of the AC electrostatic field of the cathode ray tube which is many orders of magnitude greater than the signal output from diodes 101 and 102.

The original design incorporated four location sensing, and there were four PIN diodes and four fiberoptic cables coupled with the pinholes at the four corners of faceplate 60. Although theoretically, a two location sensing system cannot detect gain variations along an axis normal to a line joining the two sensing locations, in practice such a variation will not occur. Thus, it is preferred to utilize only two pinholes at diagonally opposite corners of the faceplate 60, with only two fiberoptic cables and two diodes; however, the present disclosure specifically comprehends the use of all four pinholes of faceplate 60, with two further PIN diodes connected in parallel with diodes 101 and 102, and two further fiberoptic cables arranged similarly to cables 34 and 35. Thus the coupling indicated at 36 in FIG. 1 may represent four optical paths for transmitting actual beam position signals between components 20 and 30, as another example.

Because the central processor component 15 stores the X and Y deflection values representing the actual beam locations of the first and second pinholes 61 and 62 during the execution of respective first and second search patterns which occur at different times, a common sensing circuit can be used for sensing activation of both diodes 101 and 102. (In principle, a single diode could be used.)

The PIN diode structure is such that the P and N layers are separated by a very thin layer of pure silicon, which is a nonconductor. A PIN diode will not show conduction in either direction in the absence of activation by light energy. When light strikes the junction, the photons induce "tunneling", and the diode puts out a very low current in the order of microamperes, but with very fast risetime in the order of nanoseconds.

The actual beam position signals from diodes 101 and 102 are supplied via capacitor C8 to the inverting input 105 of an operational amplifier U1. Amplifier U1 is a high speed hybrid device (LH0032). It is configured in the detector circuit to have unity gain for DC and near open-loop gain for short risetime signals. This circuit is unstable in the presence of AC input signals, but this behavior is of no consequence in this application. Unity gain DC feedback occurs through T-network R47/R48/R49. C7 in the ground branch of the T-network allows the network to act only for AC or pulse signals; for DC only R48 and R49 are active. Potentiometer R47 adjusts the AC gain, normally set as close to maximum as possible without encountering no-signal instability.

When light from the CRT strikes a PIN diode, a current pulse is injected into the inverting input 105 of U1 through coupling capacitor C8. This pulse causes the high gain amplifier to temporarily become unstable, and a burst of noise and ringing appears at the output 111. This signal is coupled to the base of Q7 through network C13/R44 and causes Q7 to produce a burst of short negative-going pulses at its collector. This signal is sent to a monostable circuits component 112 where it is converted into a precisely timed pulse for transmission to the central processor interrupt line 39 as indicated in FIG. 2.

A test pulse generator component 120 is coupled to U1 non-inverting input 121 by a network CR17, CR16, R51, C12, R50, and R52. This applies a DC step of approximately 3.0 VDC to input 121. The effects of this step input, in the short term, on the amplifier U1 are indistinguishable from a PIN diode input, and an output occurs which triggers the monostable circuits component 112. An output from the component 112 in this case may represent a confirming signal signifying a valid test of amplifier U1. For example, the test may be initiated by a key 125, FIG. 4, which serves to advise the central processor 15, FIG. 2, of the test and which actuates the test pulse generator 120 via its input 126.

If the test key 125, FIG. 4, is held continously actuated to authorize a diagnostic/programming mode of the central processor 15, the interrupt at input 39 may be removed by means of the T-network already described, which provides unity gain DC feedback, anf CR15. If CR15 were not in the circuit, eventually the T-network would raise the voltage at the inverting input 105 to equal the 3.0 VDC test level at input 121, at which time photosensor circuit would resume normal operation, disregarding the DC bias level due to the test signal. However, when 0.7 VDC is reached on the inverting input 105, CR15 clamps it at that level, and the amplifier U1 remains "hard over" with its output saturated positive, inhibiting any further response which could produce output by Q7. When the test key 125 is released, voltages in the photosensor circuit return to normal, and the circuit is ready to detect light pulses from pinholes 61 and 62.

During normal operation, the monostable circuits component 112, once actuated by a light pulse from pinhole 61, will prevent any further response to the signal from amplifier output 111 for a time interval sufficient for the symbol generator 16 to respond to the interrupt at 39, and to command the beam away from the vicinity of the pinhole 61, allowing amplifier U1 to restabilize before the search pattern in the vicinity of pinhole 62 is initiated. A symbol generating frame of 16.667 milliseconds may intervene between a search pattern in the vicinity of pinhole 61, and a search pattern in the vicinity of pinhole 62.

Exemplary Parameters for FIGS. 6 and 7

Electrical Parameters (FIG. 6)

U1, Ultra fast FET Operational Amplifier
Q7, Jantx type 2N2222A

Resistance Values

R42, ten ohms; R43, 1.0 kilohm;
R44, 1.0 kilohm; R45 ten ohms; R46, 1.0 kilohm;
R47, ten kilohm (adjustable);

R48, 1.0 megohm;
R49, ten kilohms; R50, 1.0 kilohm;
R51, 1.0 kilohm;
R52, ten kilohms; R53, ten kilohms Capacitance Values (Microfarads unless otherwise specified)

Figure 20A:
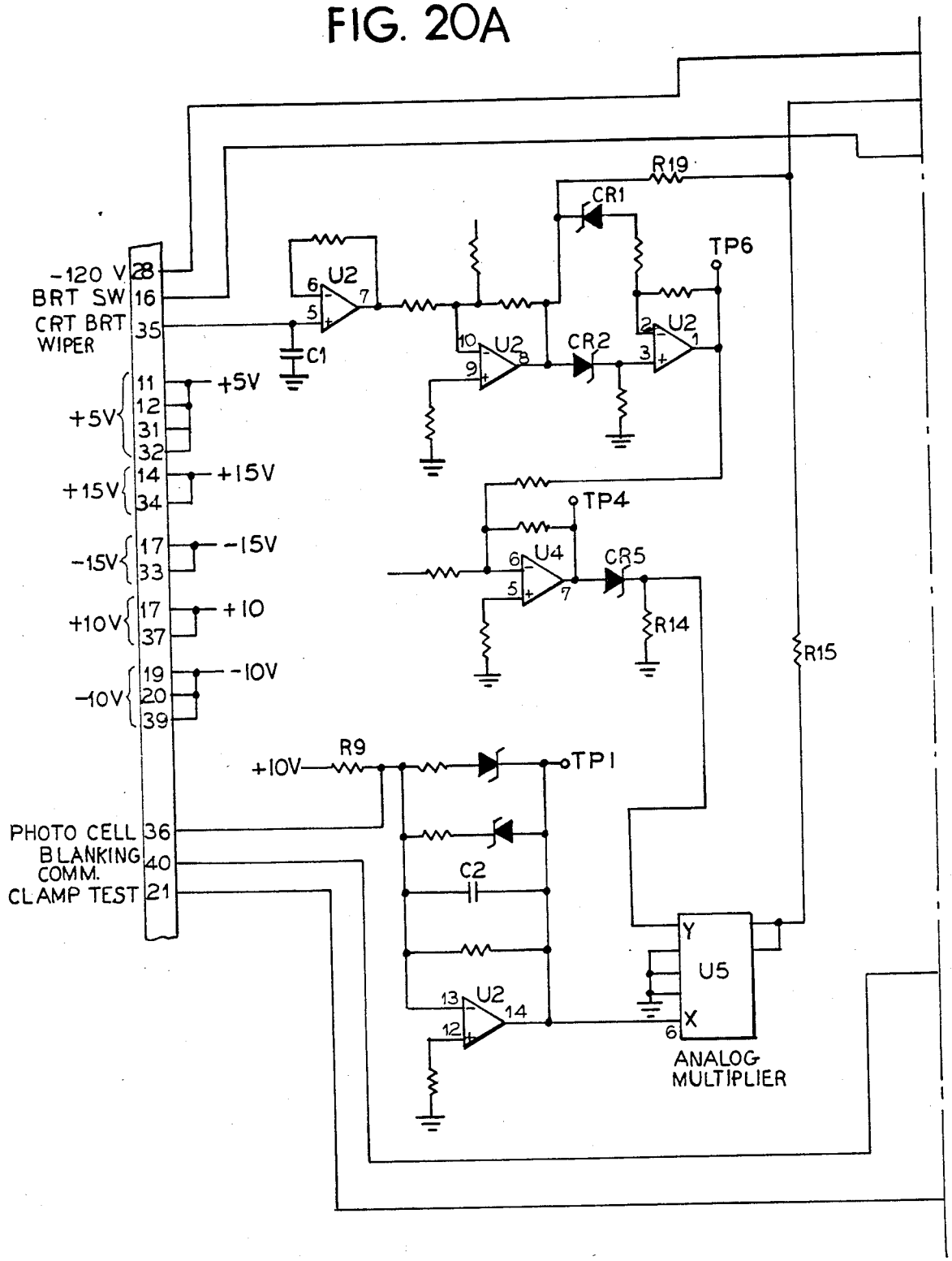
Figure 20B:
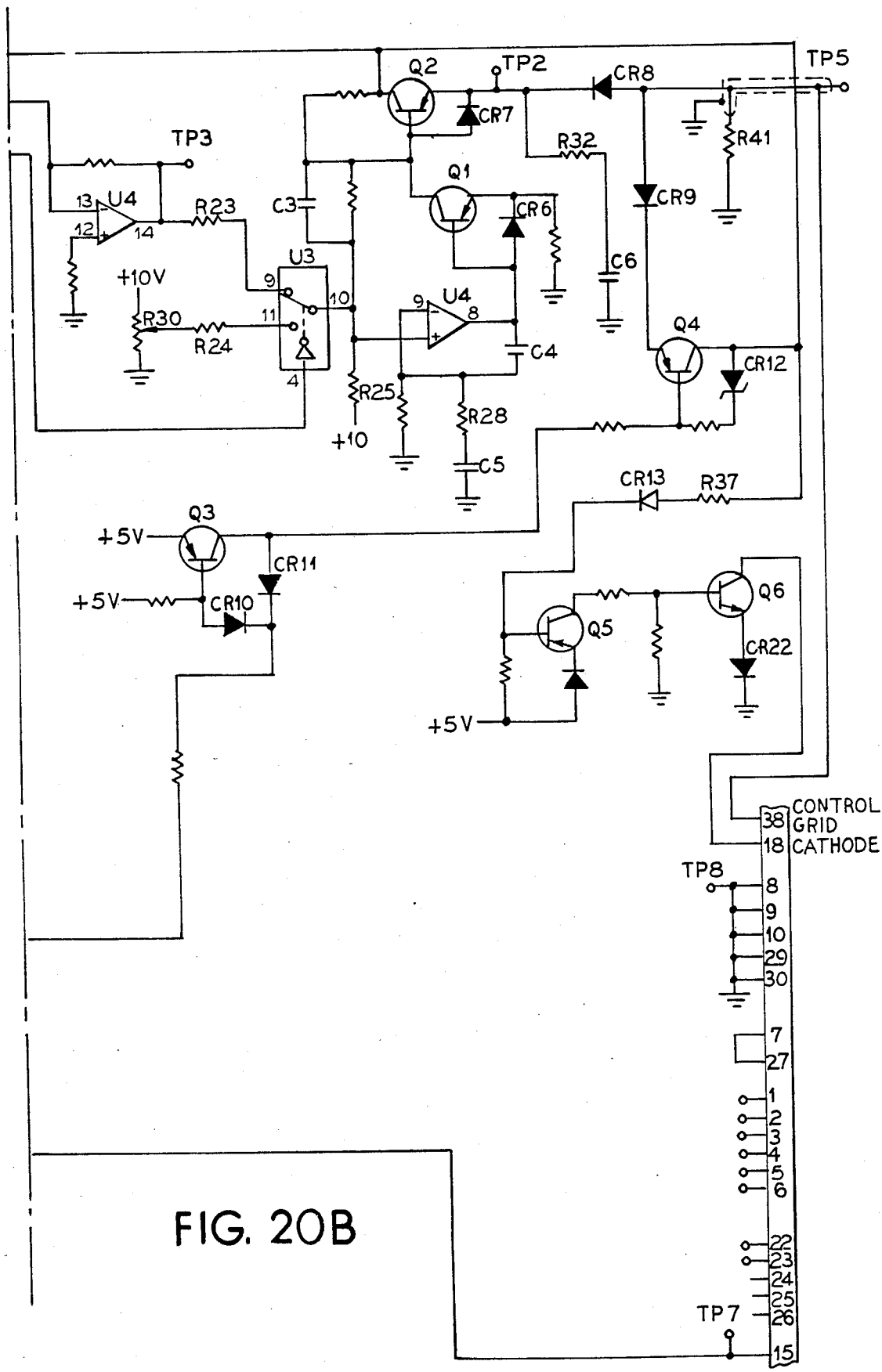

C7, 3.0 (fifty volts); C8, 3.0 (fifty volts); C9, 1.0 (fifty volts);
C10, 1.0 (fifty volts);
C11, ten picofarads (two hundred volts);
C12, 0.1 (fifty volts); C13, 0.1 (fifty volts);

Additional Electrical Parameters for FIGS. 6, 201 and 20B Diodes

Unless otherwise specified, all diodes are type JANTX IN4148.

Capacitors

Unless otherwise specified, all capacitance values are in microfarads, (plus or minus ten percent).

Resistors

Unless otherewise specified, all resistance values are in ohms ($\frac{1}{4}$ watt, plus or minus five percent).

Transistors

Unless otherwise specified, all transistors are 2N 5401.

| Other Components | |
|---|---|
| Designation | Type |
| U1 | LH0032 |
| U2, U4 | LM124 |
| U3 | AD 7512D1 |
| U5 | AD 532 |

Faceplate 60 FIGS. 6 and 7 (Dimensions in inches)

Length, 3.3; width 2.75; thickness 0.250; horizontal separation between pinholes 61 and 62, 2.70; vertical separation between pinholes 61 and 62, 2.0; radius of curved margins of sections 60a and 60b (measured from pinhole center), 0.150. Pinhole diameters, 0.010; pinhole depth 0.030; diameter of receiving holes for cables 34 and 35, 0.185, depth of receiving holes, 0.220.

Beam Deflection

By way of example, horizontal and vertical beam deflection values of zero volts DC may (in the absence of drift error) position the beam at the center of faceplate 60. A maximum horizontal deflection of the beam of minus fifteen angular degrees may deflect the beam to the left a distance of 1.43 or 0.08 inch to the left of the center of pinhole 61. A maximum vertical deflection of the beam in the downward direction may be about 1.08 from beam center position or about 0.08 inch below the center of pinhole 61. The deflection to the right and upward may be symmetrical in relation to deflection to the left and downard, and utilize deflection voltages of opposite polarity. (The beam center position may be assigned horizontal and vertical deflection command values of $200_{16}$ or decimal 512.)

The generation of two search patterns such as that indicated in FIG. 8 may take place in much less than twenty milliseconds and much less than 16.667 milliseconds. As shown, each search pattern may cover many more than twenty points in the vicinity of a pinhole.

Material of Faceplate

Aluminum (flat black anodized after machining)

Programming Example

An exemplary procedure for calculating the scale and drift correcting factors is set forth on the following pages. As will be apparent to those skilled in the art, the calculated scale factors XSF and YSF for the X and Y axes could be supplied to digital to analog converters for controlling the gain of X-axis and Y-axis deflection amplifiers, and the calculated values of XBIAS and YBIAS or AYBIAS could be directly inserted into the X-axis and Y-axis deflection amplifier inputs to maintain the center of the displayed image at a desired central optical axis. For the sake of a preferred example, however, the values of XSF and YSF may be used to proportionately adjust the positions of the symbology by modifying the successive X and Y axis deflection commands in digital form so as to maintain a selected scale. Similarly, values of XBIAS and YBIAS or AYBIAS may be inserted into each deflection command as a digital correction, so that the complete displayed image maintains a desired centered relationship.

| | |
|---|---|
| BIT | Built-in test |
| CLAMP | (Closed Loop Automatic Monitor Program) An Acronym referring to the closed loop automatic system of the present invention |
| CRT | cathode ray tube |
| DEU | display electronics unit |
| DMU | display management unit |
| FET's | field effect transistors |
| HEU | HUD electronics unit |
| HUD | heads up display |
| JET | Jet Electronics and Technology, Inc. of Grand Rapids, Michigan |
| LRU | line replaceable unit |
| OP | operational |
| PC | printed circuit |
| PDU | pilot display unit (19, FIG. 3) |
| SGU | symbol generator unit (16, FIG. 2) |

Examples of suitable constants for the foregoing listing are as follows based on the example where pinholes 61 and 62 have the reference command values RX1=183, RY1=183; and RX2=839, RY2=839, as previously explained.

SFDIFF=RX2−RX1=RY2−RY1

SFDIFF=839−183=656

DOTPDEG=1022/30 degrees=34.067 (since 511 is midway between 183 and 839, and also midway between zero and 1022).

BIASOFF=RX2=RY2

BIASOFF=839

Referring to the earlier notation, the scale factors XSF and YSF would be expressed as follows:

$$XSF = \frac{AX2 - AX1}{SFDIFF}$$

$$YSF = \frac{\Delta Y2 - \Delta Y1}{SFDIFF}$$

A more complete program listing is given at the end of the written description herein simply by way of example and not of limitation.

Discussion of an Actual Implementation of a Head Up Display System Embodying Features of the Present Invention While the features of the invention will be understood by those skilled in the art from the foregoing, a supplementary discussion is presented by way of background and to document an actual reduction to practice, having reference to FIGS. 9 to 18 and 19A, et seq. of the drawings. This supplementary discussion is based on written documentation referring to assignee drawing numbers; however, the corresponding FIG. numbers are indicated in the headings so that the documents are readily correlated with the accompanying figures of drawings.

In the block diagrams of FIGS. 9 to 18, reference characters have been applied wherein a digit or digits representing the figure number are included as the first or first two characters, followed by a hyphen. Thus designation 9-1 refers to a component of FIG. 9.

Abbreviations in the documentation are explained as follows:

| | |
|---|---|
| BIT | Built-in test |
| CLAMP | (Closed Loop Automatic Monitor Program) An Acronym referring to the closed loop automatic system of the present invention |
| CRT | cathode ray tube |
| DEU | display electronics unit |
| DMU | display management unit |
| FET's | field effect transistors |
| HEU | HUD electronics unit |
| HUD | heads up display |
| JET | Jet Electronics and Technology, Inc. of Grand Rapids, Michigan |
| LRU | line replaceable unit |
| OP | operational |
| PC | printed circuit |
| PDU | pilot display unit (19, FIG. 3) |
| SGU | symbol generator unit (16, FIG. 2) |

CIRCUIT DESCRIPTION for Z-Axis Logic PC Board (FIGS. 9, 10, 19A and 19B)

The Z-Axis Logic PC Board assembly contains part of the circuitry for controlling the blanking and brightness of the CRT. Circuitry partitioned to this board primarily involves discrete logical functions as opposed to proportional control functions located on the Z-Axis Analog PC Board, to be discussed elsewhere. The Z-Axis Logic PC Board also contains the power FET's to drive the panel illumination and dynamic desiccator heater (where provided), as well as part of the line drivers/receivers required for interfacing with the DEU.

The Z-Axis Logic PC Board is located to the right of the CRT, against the right side wall of the PDU chassis. It is the outer of two PC boards mounted in this location. Refer to Schematic Diagram 506-1649 during the discussion of this PC board, (FIGS. 19A and 19B).

Functions contained on the Z-Axis Logic PC Board Assembly are:
1. Blanking Control Logic (See component 9-1, FIG. 9)
2. Dead Beam Detector (See component 9-2, FIG. 9)
3. (part of) DEU Interface (See component 9-3, FIG. 9)
4. Panel Illumination Control (See component 9-4, FIG. 9)
5. Dynamic Desiccator Drive (See component 9-5, FIG. 9)

Figure 19A:
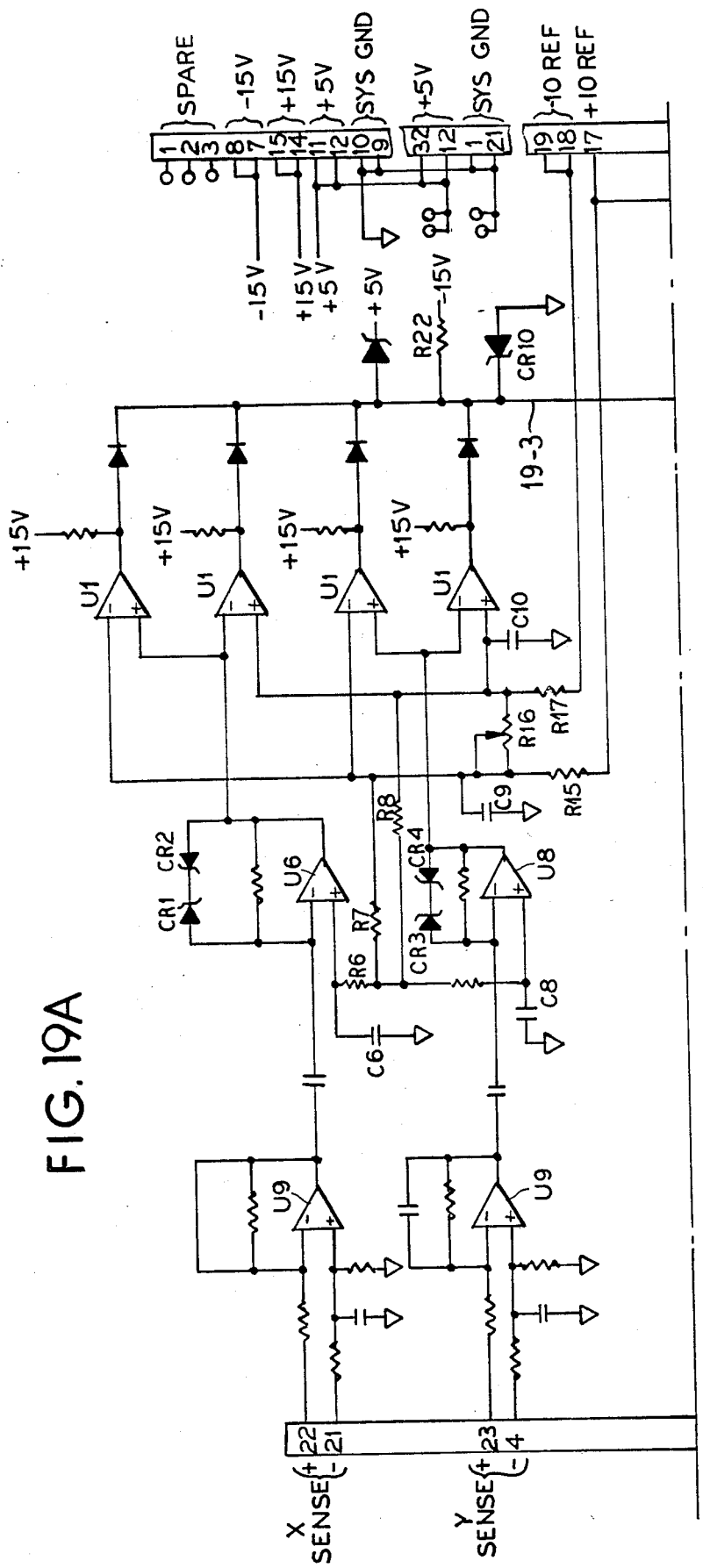
FIGS. 19A, 19B, 20A, 20B, 21A, 21B, 21C, 22A to 22E, 23A, 23B, 24, 25, 26A, 26B, 27A, 27B, 28A, 28B, 29 and 30 are detailed circuit diagrams showing exemplary details of the system of FIGS. 9 to 18 as actually built and successfully tested.
Figure 19B:
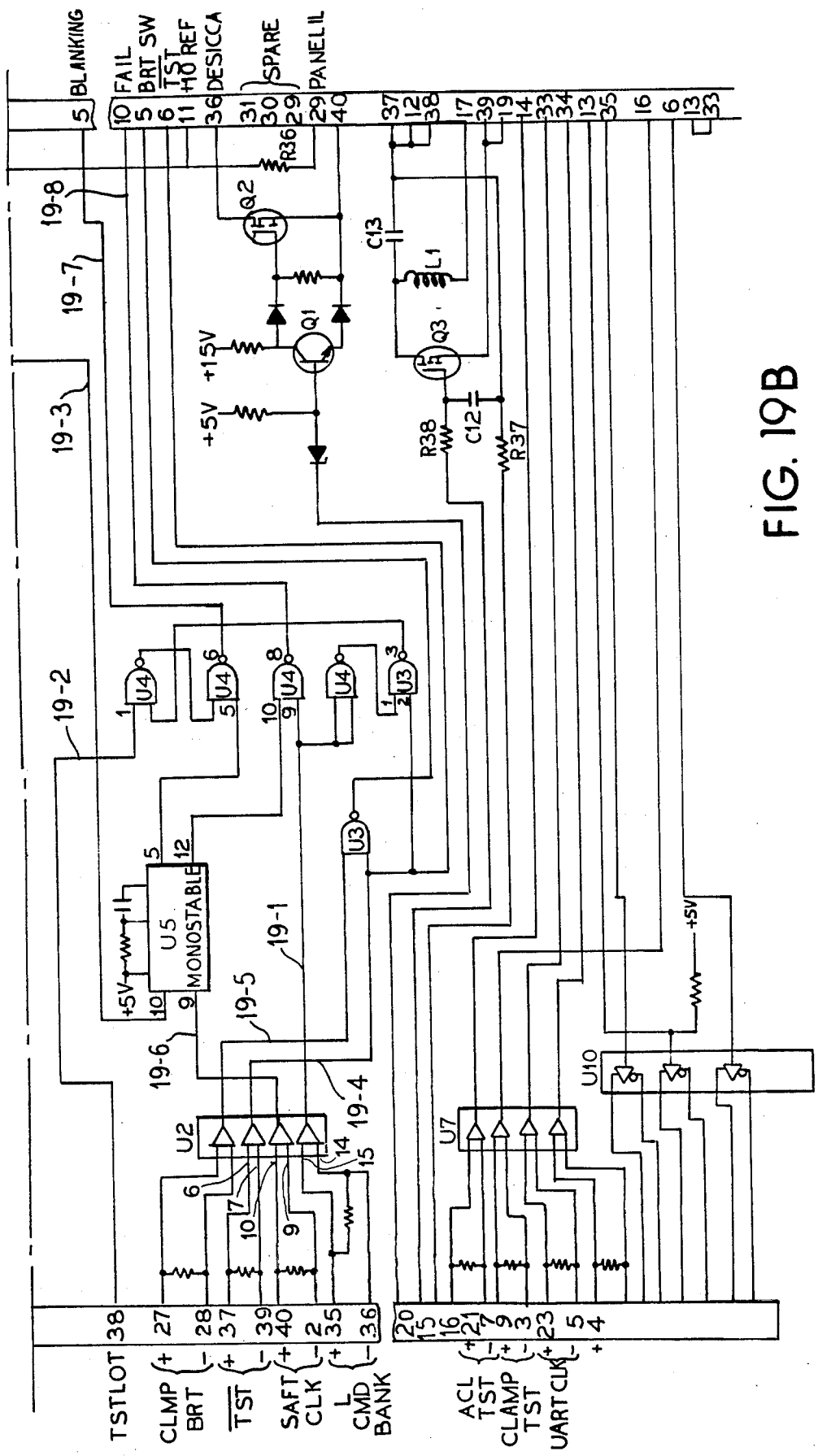

Blanking Control Logic (9-1, FIG. 9 and FIGS. 19A and 19B)

The Blanking Control Logic circuitry receives the various sources of command signals for control of the CRT beam, and, as a function of modes and conditions, determines which signal or signals will have control of the beam at any given time. The logic network is implemented by NAND gates U3 and U4 (54LS00), and Monostable U5 (54LS123). The inputs to the network are:
1. COMMAND BLANKING (19-1, FIG. 19B)
2. TEST DOT (19-2, FIG. 19B)
3. DEAD BEAM VALID (19-3, FIGS. 19A and 19B)
4. TEST VALID (19-4, FIG. 19B)
5. CLAMP BRT (19-5, FIG. 19B)
6. SAFETY CLOCK (19-6, FIG. 19B)

There are two outputs, Composite Blanking Command, and $\overline{\text{FAIL}}$, (19-7 & 19-8)

Under normal operating conditions, Command Blanking, received from the Symbol Generator in the HEU by the Data Receiver, is active for control of CRT blanking. This signal enters the Z-Axis Logic PC Board on pins 14 and 15 of Line Receiver U2 (part of the DEU Interface). The Blanking Control Logic steers this signal to Composite Blanking output on pin 6 of U4 as long as the system is not in the Test mode nor has a stationary beam been detected.

When the system enters the Test mode, gate U3, (section pins 1-2-3), disables the Command Blanking input, and TEST DOT is active in its place, entering U4, pin 1. This signal was discussed under Display Logic PC Board, and produces the "dashes" in the BIT Test Pattern display. The TEST mode logic level is received from DEU (Display Logic) by Line Receiver U2, on pins 6 and 7. During design, no line receiver was provided for the TEST DOT signal, as momentary noise glitches on this line could not produce any logic malfunctions in the system.

If any conditions occurs that results in no deflection of the beam in both X and Y axes for more than 20 milliseconds, the output on pins 5 and 12 of monostable U5 will switch states. This applies logic to pin 5 of gate U4 resulting in a cutoff command for the CRT beam, regardless of the source of blanking command. At the same time, (section pins 8-9-10) of U4 determines if under these conditions the Symbol Generator in the HEU is commanding beam "bright-up". If this is true, a Failure Mode discrete is active at U4 pin 8 and is sent to the Keyboard Interface PC Board for transmission of that information to the HEU. This confirms that there actually is a deflection failure in the PDU, and not an intentionally "parked" beam, which is a normal occurrence during execution of many symbology configurations. Monostable U5 is normally continuously retriggered by the 1.267 Mhz Safety Clock at pin 9, received from the PDU Master Clock on the Disply Logic PC Board at line receiver U2 pins 9 and 10. If the Dead Beam Detector continuously sees no beam motion, pin 10 of monostable U5 will remain low, and after approximately 20 milliseconds, will time out. The delay is introduced so that momentary halts or reversals of the beam will not result in nuisance outputs causing undesired modulation of the beam.

Dead Beam Detector (9-2, FIG. 9, and FIGS. 10 and 19A)

The Dead Beam Detector circuit is shown in the upper part of Schematic Diagram 506-1649. Its purpose is to determine when the beam is stationary in both X and Y axes, and produce an output under this condition. This output is used to override the Command or Test Blanking, and cut the CRT beam off, to prevent burning of the phosphor or physical destruction of the CRT. The CRT used in the PDU operates at an extremely high beam current density in order to obtain the high brightness required, and the electron beam can actually drill through the glass faceplate in a matter of seconds if it dwells in one spot, while the phosphor can be burned in a matter of milliseconds. The Dead Beam Detector is the most important of several circuits in the PDU designed to protect the CRT from damage under abnormal conditions or circuit failures.

Deflection yoke current is sampled by resistors R52(X), and R76(Y), in the Deflection Amplifier circuits for feedback purposes, as described elsewhere. This same voltage is sent to the inputs of dual OP Amp U9 (OP 04) in the Dead Beam Detector circuit, over twisted pairs in the PDU chassis wiring harness to avoid noise pickup. These OP Amps operate as differential amplifiers with a gain of 15 (the non-inverting input is normally grounded at the current sense resistor and is provided only for common mode noise reduction). The output of each OP Amp channel is applied to the input of differentiator stages using OP Amps U6 and U8 (AD509). The sensed current must be differentiated as it is possible for the beam to "dwell" at any point on the screen, not just at the center where the current is zero. The detector circuit thus is looking for no change in deflection current, rather than "no current".

The X and Y differentiator circuits are provided with a special resistive network to provide for automatic compensation of drift and bias current, as well as a threshold adjustment to set the minimum value of current change to be regarded by the circuit as "no change". This network is made up of fixed resistors R6, 7, 8, 13, 15, 17, and potentiometer R16, along with noise control capacitors C6, 8, 9, & 10. The output of the two differentiators, modified by the resistor network, is applied to the inputs of four sections of comparator U1 (LM139).

A current derived from the precision + and −10.000 VDC reference is applied across the potentiometer R16 and across reference bridge resistors R7 and R8 through series resistors R15 and R17. The voltage spread obtained by adjustment of potentiometer R16 is applied to the respective reference inputs of the comparators and establishes the "window" for determining stationary beam. The output from the reference bridge resistors R7 and R8 is applied through bias current compensation resistors R6 and R13 to the non-inverting inputs of differentiators U6 and U8, and results in compensation of the zero point of the differentiator output so that it will center in the window established for the comparators, even if the reference voltages should drift asymmetrically due to temperature or component aging. The comparator stages run essentially "open loop gain", and are clamped by zener diodes CR1 thru 4 at about 6 volts output to avoid problems with saturation, latchup, or recovery time in the OP Amps. The high gain is necessary because of the small signal involved originating at the current sense resistors in the Deflection Amplifier for small values of beam excursion, and the inevitable result is a residual level of noise. The window at the comparators must be set to exclude this noise level, to permit detection of a valid "dead beam".

The four comparator stages are set up to detect respectively the following conditions:
1. No right X beam motion
2. No left X beam motion
3. No up Y beam motion
4. No down Y beam motion Under normal operation, at least one of the four stages will have its output high. Diode-resistor discrete logic at the comparator outputs "OR's" these outputs, and for any beam motion in any direction, the output line connected to pin 10 of monostable U5 will be high, permitting the monostable to be retriggered by the clock on pin 9. When the beam "dies", the output of both differentiators falls within the window, and the output of all four comparators goes low. At this time current through R22 pulls the output line down and clamps against ground through Schottky diode CR10. This allows the monostable to time out after 20 milliseconds, and the logic to cut off the beam is generated.

(part of) DEU Interface

As discussed elsewhere under the Display Logic PC Board assembly, line drivers and line receivers have been provided for critical logic signals running between the relocatable DEU portion of the PDU electronics and the remainder located within the PDU proper. The DEU portion of this driver/receiver array is located on the Display Logic PC Board assembly, while the PDU portion is found on the Z-Axis Logic PC Board assembly. Some sections of the line receivers on this board have already been mentioned in reference to the Blanking Control Logic. Additional sections of the drivers/receivers (U2, U7, and U10) can be seen at the lower left of Schematic Diagram 506-1649, and their functions are indicated at the board connector pinouts. Refer also to PDU Interconnect Diagram (Drawing No. TBA), for routing of these signals throughout the PDU.

Panel Illumination Control

The keyboard of the PDU is illuminated by 15 small 5 Volt incandescent lamps connected in parallel. It is desirable to provide a means of manually dimming this panel illumination, and a potentiometer is provided for this purpose on the left side of the instrument, near the keyboard. Because considerable current is involved, a signal level potentiometer is used, with a current amplifier driving the bulbs. This circuitry is located on the Z-Axis PC Board assembly, along with a similar circuit for controlling the dynamic desiccator heater (when installed). The power semiconductors involved are mounted along the right edge of the PC Board and are thermally mated to a large area of unetched copper which contacts the PC Board guide rail when the board is installed in the chassis. This provides for conduction cooling of these components in accordance with the thermal design philosophy of the PDU.

PowerFET Q3, type IRF530, is used as a source follower to provide a variable voltage to the bulbs in response to a control voltage from the wiper of the manual brightness pot. Inductor L1 and capacitor C13 associated with the incoming +5 VDC lighting buss act as spike suppressors to protect the PowerFET from breakdown in the event of transients on the line. A RC Network (R38, C12) protects the gate from spikes which may be picked up on the line from the pot wiper. Resistors R37 and R36 are TBD or select values and serve to set the range of brightness change as a function of pot rotation. The lighting buss entering the circuit at PC board connector pin P2-17 may also originate from an aircraft dimmable master lighting buss. In that case, the panel pot can only increase the illumination up to the limit established by the voltage coming in on the dimmable buss.

Dynamic Desiccator Drive

At one time in the design of the PDU, it was decided to use a closed-loop dynamic desiccator in association with the sealed air chambers in the Optical Assembly. This type of desiccator requires no periodic maintenance, as the desiccant is regenerated periodically by heating, which discharges the accumulated moisture to the ambient air. The system which was to have been used in the JET PDU would have controlled the heating cycle as a function of increasing aircraft altitude so that the outflow of air from the optical chambers would sweep the expelled moisture outwards. During aircraft descent, a fresh bed of desiccant would dry the air returning into the chambers.

Present design uses a static desiccator requiring periodic replacement of desiccant cartridges. In the event that the design should revert to the dynamic desiccator, or should such a system be preferable for a specific HUD installation, the drive circuitry has been provided for in the PDU, and the altitude related control software exists in the DMU computer in the HEU.

PowerFET Q2, type IRF530, is used as a switch to ground one end of the heater element in the dynamic desiccator. The other end of this element is provided with aircraft +28 VDC power. The heater current is approximately one Ampere. NPN transistor Q1, type JANTX2N2222A, along with associated passive components, is used as a level translator stage between the desiccator control logic signal (5 Volt logic), and the gate of the PowerFET, which requires a +15 VDC excursion. The components associated with the desiccator drive may be depopulated from production models of the PDU, but the layout on the PC board will be retained.

CIRCUIT DESCRIPTION for Z-Axis Analog PC Board (FIGS. 11, 12, 20A and 20B)

The Z-Axis Analog PC Board assembly contains part of the circuitry for controlling the blanking and brightness of the CRT. Circuitry partitioned to this board primarily involves analog level control and voltage level-translation functions which work in response to logic control inputs from the Z-Axis Logic PC Board assembly and in response to analog inputs from the manual CRT brightness control potentiometer and the automatic brightness control photocell. The Z-Axis Analog PC Board assembly also contains the CLAMP (Closed Loop Analog Monitoring Program, Patent Pending) sensor PIN diodes and the special interface circuitry for CLAMP, FIG. 6. Part of the safety circuitry to protect the CRT from burn damage from circuit failure or abnormal operating conditions is also located on the Z-Axis Analog PC Board assembly.

The Z-Axis Analog PC Board assembly is located to the right of the CRT in the PDU. It is the innermost of two boards mounted in this location. In addition to electrical connections, this board receives light input from two (four in the original design) fiber optic cables which bring light from the face of the CRT to the CLAMP sensing PIN diodes on the PC board. Refer to Schematic Diagram 506-1648 during the discussion of this PC board, FIGS. 20A and 20B.

Functions contained on the Z-Axis Analog PC Board are:
1. Manual/Automatic CRT Brightness Control, (11-1, FIG. 11)
2. CRT Gun Level Translation & Calibration Circuitry, (11-2, FIG. 11)
3. (part of) Beam Burn Protection Circuitry (11-3, FIG. 11)
4. CLAMP Detector Circuitry (11-4, FIG. 11)

Manual/Automatic CRT Brightness Control (11-1, FIG. 11, & FIG. 20A)

The JET HUD System is provided with a display brightness control system which combines inputs from a manually adjusted potentiometer and from an ambient light sensing photocell in a novel manner. This method of display brightness control was developed in 1975 by JET for use in an evaluation Head Down EADI/EHSI System on the USAF C-141 AWLS program at WPAFB. The essential principle of this method of brightness control is that the authority of the automatic control is varied as a function of the setting of the manual control pot. This "washes out" the automatic control proportionally as the manual pot is deviated from its nominal centered position, assuring that when the pilot desires levels of brightness near the maximum or minimum, the automatic system will be overridden. The system, as implemented in the JET HUD, uses only three chips; two quad OP Amps and a monolithic analog multiplier.

The circuitry involved in the Manual/Automatic Brightness Control is shown in the left half of Schematic Diagram 506-1648. Automatic control input originates from a CdS photoresistive cell mounted on the Inertial/Reference PC Board Assembly. This cell looks upward into a plastic light diffusing dome with its rear hemisphere painted flat black, so that response will be obtained from the ambient lighting outside of the aircraft facing forward, the area of sky against which the collimated HUD display will be viewed. The −10.000 VDC precision reference voltage is locally supplied to one side of the photoresistive cell. Current from the cell, which is nonlinearly proportional to ambient brightness, is supplied to inverting input pin 13 of OP Amp U2, type LM124. Passive circuitry associated with the feedback loop of this OP Amp yields a current-to-voltage converter with a three-slope gain transfer function. Component values in this network were empirically chosen so that the brightness of the display seemed to change in a proportional manner with changing ambient brightness as judged by the eye. R9 in this network serves to set the "center point" of the converter, while C2 filters out the effects of rapid changes in ambient brightness to prevent any annoying display flicker. The output of OP Amp U2 pin 14 is a conditioned representation of ambient brightness level, and is applied to the X input of four quadrant Analog Multiplier U5, type AD532, on pin 6.

Manual control input arrives from the wiper of the potentiometer located on the right side of the PDU near the keyboard. This pot is locally supplied with ground on its CCW end and with −10.000 precision reference on the CW end. Refer to PDU Interconnect Diagram, Drawing No. (TBA), for details. The wiper signal is applied to non-inverting pin 5 of OP Amp U2 (LM124) which acts as a unity gain buffer to eliminate nonlinearity from potentiometer loading. Capacitor C1 protects the input of U2 from possible damage from spikes which may be picked up on the input line in the wiring harness. Scaling at the output of U2 pin 7 is as follows:

| POT POSITION | REPRESENTS | VOLTAGE |
| --- | --- | --- |
| CCW | MINIMUM BRIGHT | 0.0 |
| MID | NORMAL BRIGHT | −5.0 |
| CW | MAXIMUM BRIGHT | −10.0 |

Output from pin 7 of U2 is applied to the next U2 stage (pins 8, 9, & 10) which introduces an offset to "center" the pot signal around zero, invert its polarity, and multiply the gain by two. Scaling at the pin 8 output is:

| POT POSITION | REPRESENTS | VOLTAGE |
| --- | --- | --- |
| CCW | MINIMUM BRIGHT | −10.0 |
| MID | NORMAL BRIGHT | 0.0 |
| CW | MAXIMUM BRIGHT | +10.0 |

Note that a percentage of this output from pin 8 is fed into the brightness control summing amplifier, U4, by R19. This represents the manual contribution to overall brightness control. The U2 pin 8 output is also fed to U2 stage (pins 1, 2, & 3) through Schottky diodes CR1 and CR2. This stage is configured as an absolute value circuit, and its output at pin 1 is:

| POT POSITION | REPRESENTS | VOLTAGE |
| --- | --- | --- |
| CCW | MINIMUM BRIGHT | +9.6 |
| MID | NORMAL BRIGHT | 0.0 |
| CW | MAXIMUM BRIGHT | +9.6 |

The small deviation of 0.4 VDC is due to the drop in the Schottky diodes. The U2 pin 1 output is fed to U4 stage (pins 5, 6, & 7), which in conjunction with Schottky diode CR5 and R14, provides offset, scaling, and inversion such that the final signal applied to the Y input of Analog Multiplier U5 has the following characteristics:

| POT POSITION | REPRESENTS | VOLTAGE |
| --- | --- | --- |
| FULL CCW | MINIMUM BRIGHT | 0.0 |
| 9:00 Position | Low Auto Cutoff | 0.0 |
| MIDPOINT | NORMAL BRIGHT/ Max Auto | +10.0 |
| 3:00 Position | High Auto Cutoff | 0.0 |
| FULL CW | MAXIMUM BRIGHT | 0.0 |

Between the pot position limits of 9:00 to 3:00 the Automatic Control is active, and its gain, controlled by Analog Multiplier U5, varies in a linear manner according to the following graph: (see FIG. 12).

The output of Analog Multiplier U5 represents the conditioned response of the photocell to ambient light, modified in gain by the position of the manual brightness control pot. The output is applied to the inverting input of brightness control summing amplifier U4, stage pins 12, 13, & 14, by resistor R15, and is summed with the direct contribution from the manual pot through R19. Voltage at the output of this amplifier on pin 14 is scaled to correlate with brightness control input conditions as follows:

| | |
| --- | --- |
| Zero Ambient Light & Manual Pot Fully CCW | +10.0 VDC |
| "Nominal" Ambient Light & Pot at Midpoint | 0.0 VDC |
| Maximum Ambient Light & Pot fully CW | −10.0 VDC |

The U4 pin 14 output is fed to the CRT Gun Level Translation & Calibration circuit through resistor R23, one of the calibration resistors. Selection of this control input is made by Analog Switch U3. Under normal display operation, this switch is connected as shown on the schematic, and the brightness of the display is controlled by the Manual/Auto system. During the TEST mode, and also during execution of the CLAMP cycle, the switch U3 substitutes the output of a preset potentiometer R30 for the normal control voltage. This provides for a brightness level at the CRT during these modes which is considerably higher than the normal maximum, and is required for the CLAMP scan and to provide override of the brightness control circuitry (which might be set at beam extinction), to verify that the basic CRT circuitry is "good" during a BIT cycle. The control input to Analog Switch U3 (pin 4) is the logical OR of CLAMP and TEST, and comes from logic on the Z-Axis Logic PC Board.

CRT Gun Level Translation & Calibration Circuit
(11-2, FIG. 11, & FIG. 20B)

The control grid voltages required at the CRT gun between the limits of maximum brightness and beam extinction run typically from −20 to −50 VDC, and vary considerably between tubes. Because of this, it is necessary to provide circuitry to translate the logic and analog voltage levels found in the control circuits to the higher levels required by the gun. Calibration resistors must also be provided to accommodate different tubes. Another function required is that of "mixing" the blanking signal and the analog brightness control signal at the grid. These functions are performed by the CRT Gun Level Translation & Calibration circuit, shown at the upper right of Schematic Diagram 506-1648.

Level translation and scaling for the analog brightness control signal is done by one section of OP Amp U4 (pins 8, 9, & 10), along with high voltage transistors Q1 and Q2 and associated passive components. Although OP Amp U4 appears to be in an unstable configuration, it is really in the inverting configuration due to the action of the other circuit components. This OP Amp serves as a current source to the base of Q1, which in turn controls the voltage at the emitter of Q2. The collector of Q2 is supplied with −120 VDC which originates from the High Voltage Power Supply, discussed elsewhere. Feedback is taken from the collector of Q1 and returned to pin 10 of the OP Amp, where it opposes the current from the brightness control input, from pin 10 of the Analog Switch. The output of the circuit at the emitter of Q2 is applied to the cathode of CR8, and pulls current from ground through load resistor R41. This establishes a "porch" level to which the control grid returns after it has been pulled down below extinction by the blanking amplifier Q4 acting through diode CR9.

Resistors R23, R24, and R25 are the calibration resistors for matching the circuit to individual gun characteristics, and function as follows:

R23 Sets span of Man/Auto Brightness control from extinction to "full brightness"
R24 Sets span or authority of the CLAMP/TEST preset potentiometer R30
R25 Sets "center" of the span CR6 and CR7 provide reverse voltage protection for the base-emitter junctions of Q1 and Q2. RC networks R28/C4/C5 and R32/C6 along with C3 were empirically determined to help stabilize the loop. Poor transient response in this circuit will cause objectionable display characteristics, especially "ringing" which causes an especially troublesome problem with small pinpoints of light at the start and end of symbology elements when the brightness level is reduced.

Transistors Q3 and Q4 and associated passive components comprise the level translator between the logic-level blanking command and the required voltage excursion at the CRT control grid. First stage Q3 is provided with a "Miller clamp" (CR10 & CR11) to improve switching speed. Zener diode CR12 (1N5836) associated with the base of Q4 subtracts 36 VDC from the −120 VDC source. This is done to reduce the negative swing at Q4 emitter so as to speed up the response, since it is unnecessary to pull the CRT control grid below assured cutoff. When Q4 turns off in response to a "bright-up" command, the CRT grid is passively pulled up by current through load resistor R41 until it is clamped to the analog brightness "porch" level by CR8.

(part of) Beam Burn Protection Circuitry (11-3, FIG. 11, & FIG. 20B)

Part of the beam burn protection circuitry is also located on the Z-Axis Analog PC Board assembly, comprising transistors Q5 & Q6 and associated passive components. This part of the circuit insures beam cutoff in the event of loss of the −120 VDC biasing supply, and is used to provide cutoff during HUD system startup, before power and logic conditions have stabilized. Ground for the cathode of the CRT gun is provided through transistor Q6, which must be on for normal operation. If Q6 is turned off, the cathode is disconnected from ground, and is pulled up by cathode current until a voltage difference between cathode and grid sufficient to cause beam cutoff by self-biasing occurs. A few microamps of leakage current will usually remain; enough to still see light at the screen in a darkened room, but current of a destructive level with a stationary beam cannot flow. Q6 is held on by Q5, which receives base current from the −120 VDC supply through R37 and 100 Volt Zener diode CR13 (1N5271B). If the output of the −120 VDC supply drops below approximately −95 VDC, Q5 loses base drive and is turned off, turning off Q6 and opening the CRT cathode. The emitter of Q6 is grounded through CR22 and normally open contacts of relay K1 on the Display Drive PC Board assembly, discussed elsewhere. Since the emitter of Q6 is not grounded during the start cycle, the screen is protected against the stationary beam during this time. During a "cold start" of the HUD system, this is not a problem, as the heater in the CRT has not had time to warm up, but during a power recycle, the protection is necessary, as the cathode remains hot for several seconds after removal of heater power.

CLAMP Detector (11-4, FIG. 11)

General Discussion of CLAMP

CLAMP (Closed-Loop Analog Monitoring Program, Patent Pending), is a proprietary method of assuring the geometric stability of CRT images in spite of disturbing factors such as power supply variations, component aging, external magnetic fields, trimpot misalignment, etc. Geometric stability of the image is essential in the HUD application, as the symbology must register accurately with the outside world defined by inertial and radionavigation data and boresighting of the PDU in the aircraft. Use of the CLAMP technique has permitted cost reductions in the JET HUD system without consequent loss of performance, as high stability power supplies and amplifiers are unnecessary.

CLAMP works by determining the X and Y command values necessary to place the beam at specified locations on the CRT face. If for any reason these command values have deviated from theoretical, the measured deltas can be converted to gain and offset corrections by the computer, and these corrections applied to subsequent CRT drawing commands. The method works equally well with an analog system, or as in the case of the JET HUD, a digital/analog system.

CLAMP Detector Circuitry (FIGS. 6, 20A and 20B)

The Z-Axis Analog PC Board assembly contains the hardware necessary to detect light from specific locations on the CRT face during the execution of CLAMP scans and produce an electrical output in response. The electrical output from the CLAMP detector circuit is not in a form suitable for immediate use by the system, and is further conditioned by monostable U37 on the Display Logic PC Board, discussed elesewhere. The CLAMP detector circuit interfaces closely with the BIT circuitry, and is subject to test during the BIT cycle. Provision is also made for disabling the CLAMP Detetctor circuit output during the "extended test" condition used to call up the system diagnostic and programming mode. The CLAMP Detector circuit is shown on the lower right of Schematic Diagram 506-1648.

Detection of light at the face of the CRT is done by PIN (Positive-Intrinsic-Negative) diodes mounted on the PC Board. Light is brought to the detector diodes by fiberoptic cables which run from the PC Board to the Optical Assembly, where they are in contact with two corners of the CRT faceplate. The PIN diodes are mounted on the PC board rather than locally at the CRT to avoid pickup of the AC electrostatic field of the CRT, which is many orders of magnitude greater than the signal output from the PIN diodes. The original design incorporated four-location sensing and there were four diodes and cables; this has recently been reduced to two. Although theoretically, a two-location system cannot detect gain variations along an axis normal to a line joining the two sensing locations, in practice such a variation will not occur. Since the computer "knows" which sensing location on the screen is being scanned, the two PIN diodes are connected in parallel; no separate amplifier channel and signal being required. The PIN diode structure is such that the P and N layers are separated by a very thin layer of pure silicon, which is a nonconductor. A PIN diode will not show conduction in either direction with an Ohmmeter. When light strikes the junction, the photons induce "tunneling", and the diode puts out a very low current in the order of microamperes, but with very fast risetime in the order of nanoseconds.

OP Amp U1 is a high speed hybrid device (LH0032). It is configured in the CLAMP detector circuit to have unity gain for DC and near open-loop gain for short risetime signals. This circuit is unstable in the presence of AC input signals, but this behavoir is of no consequence in this application. Unity gain DC feedback occurs through T-network R47/R48/R49. C7 in the ground branch of the T-network allows the network to act only for AC or pulse signals; for DC only R48 and R49 are active. Potentiometer R47 adjusts the AC gain, normally set as close to maximum as possible without encountering no-signal instability.

When light from the CRT strikes the PIN diode, a current pulse is injected into the inverting input of U1 on pin 5, through coupling capacitor C8. This pulse causes the high gain amplifier to temporarily become unstable, and a burst of noise and ringing appears at the output pin 11. This signal is coupled to the base of Q7 through network C13/R44 and causes Q7 to produce a burst of short negative-going pulses at its collector. This signal is sent to the monostable circuits (U37) on the Display Logic PC board, where it is converted into a precisely timed pulse for transmission to the HEU as a processor interrupt for the SGU. The monostable circuits also disable any further response from the U1 pin 11 signal for a time sufficient for the HEU to respond to the CLAMP interrupt and to command the beam away from the sensing location, allowing the CLAMP detector amplifier U1 to restabilize.

During execution of a BIT cycle, the CLAMP TEST logic discrete entering the PC board on P1, pin 21 is coupled to U1 non-inverting input pin 6 by network CR17, CR16, R51, C12, R50, & R52. This applies a DC step of approximately 3.0 VDC to OP Amp pin 6. The effects of this step input, in the short term, on the amplifier are indistinguishable from a PIN diode input, and an output occurs which triggers the monostables. The BIT logic looks for this response, and concludes that the test of the CLAMP amplifier was valid. If the TEST key is continuously held down to authorize the diagnostic/programming mode of the HUD computer, the CLAMP interrupts must be defeated. This is accomplished by the T-network already described, which provides unity gain DC feedback, and CR15. If CR15 were not in the circuit, eventually the T-network would raise the voltage at U1 pin 5 to equal the 3.0 VDC test level at pin 6, at which time the CLAMP detector would resume normal operation, disregarding the DC bias level due to the test signal. However, when 0.7 VDC is reached on pin 5, CR15 clamps it at that level, and the amplifier remains "hard over" with its output saturated positive, inhibiting any further response which could produce output by Q7. When the Test key is released, voltages in the CLAMP detector amplifier circuit return to normal, and operation resumes.

CIRCUIT DESCRIPTION for Display Logic PC Board (FIGS. 13, 14, 21A–21C & 30)

The Display Logic PC Board assembly contains the circuitry for receiving the digitally-coded and serially-transmitted commands for CRT beam deflection originating from the Symbol Generator located in the HEU. Also contained on the Display Logic PC Board is a substantial portion of the PDU BIT (Built-in Test) circuitry, and interface circuitry required should the DEU be remotely mounted from the PDU. The PDU Master Clock Generator is also located on this board.

The Display Logic PC Board Assembly is located in the rear extension of the PDU chassis along with the Display Drive PC Board Assembly. These two boards are collectively referred to as the DEU (Display Electronics Unit) as they contain circuit functions that were partitioned to them during design to permit remote relocation of these boards in possible future models of the HUD system for installation in aircraft where sufficient space is not available for a PDU with all the electronics integrally packaged. The required line drivers/line receivers are already incorporated in the circuit design so that only a mechanical package redesign, not a PC board redesign, will be required to configure the system with a remote DEU. These line drivers/line receivers are located on the Display Logic PC Board.

Refer to Schematic Diagrams, 506-1646, sheets 1 and 2, during this discussion of the Display Logic PC Board Assembly. A simplified functional block diagram of the Display Logic PC Board assembly is given below: (see FIG. 13).

Functions contained on the Display Logic PC Board assembly are:
1. X-Axis Digital Data Receiver (13-1)
2. Y-Axis Digital Data Receiver (13-2)
3. PDU Master Clock Generator (13-3)
4. (part of) PDU BIT Circuitry
   a. Test Pattern Generator (13-4A)
   b. (part of) BIT Control Logic (13-4B)
5. DEU/PDU Data Distribution (Line Drivers/Receivers) (13-5)

X and Y Axis Digital Data Receivers (13-1, 13-2, FIG. 13, & FIGS. 14, 21A & 30)

As the X and Y Digital Data Receiver channels contain nearly identical circuitry, only the X Axis will be discussed here. Refer to the top section of Schematic Diagram 506-1646, Sheet 1, during this discussion. Also refer to the Timing Diagram, HUD HEU-to-PDU Communication, Drawing No. (TBA). Where differences exist between the two channels, they will be specifically mentioned.

During the early development of the HUD system, an analog interface was used to send the deflection data from the HEU to the PDU. Even with use of the best instrumentation grade or video OP Amps available the level of noise introduced on the lines could not be reduced to a level that was visually acceptable. The problem was eventually resolved by implementation of a 6 megabaud (recently increased to 8) receive-only UART-type serial data interface between the HEU Symbol Generator and the PDU, permitting relocation of the DAC's to the PDU, physically close to the Deflection Amplifiers, reducing the noise to an acceptable level. At the same time that the digital interface was implemented, it was found convenient to send several control discretes from the HEU to the PDU over the same interface, thus reducing the number of wires required in the cabling between HEU and PDU.

The data communication scheme resembles a UART in the receive mode, with the exception that any "stop bits" which may or may not be sent over at the end of the word are inactive for control purposes. Once the "start bit" is received at the receiver, it starts running asynchronously until internal counters reach a predetermined number, at which time the channel is internally reset, to await the next "start bit". Shifting and strobing of incoming data is controlled by the counters and associated logic. Each channel is independent of the other, except for sharing a common clock. Word length, including the start and stop bit times, is seventeen bits. Fifteen bits of active, usable data are provided. Of these fifteen bits, 12 are assigned to the data word for the deflection command, giving a resolution of one part in 4096. The remaining 3 bits are assigned to convey discrete data, as follows:

| BIT | H CHANNEL | Y CHANNEL |
|---|---|---|
| 11 | H Overrange (mirror function) | Y Overrange (mirror function) |
| 12 | Desiccator Control | Clamp Briteup Command |
| 13 | PDU Test Command | Z-Axis (blanking) Command |

Clock oscillator module U13 operates at 32 MHz, four times the data rate of 8 megabaud, in order to provide sufficient margin for the data strobe to fall within the required "data stable" window. The static offset between the incoming data stream and the sequence of events occurring in the receiver circuit due to the asynchronous start is kept within 25% of one bit time. The output of the clock oscillator module is individually buffered for the X and Y channel by sections of U14, 54S37, and applied to the control counters, U9 & U10, 54F161A, and after inversion by U11, to stop gate decoder, U15, 54S20. Clock is continuously applied to these chips. Note that the data receiver clock is a separate system independent from the PDU Master Clock Generator to be discussed later.

Incoming data from the HEU is transmitted differentially over a shielded, twisted-pair line and received by Differential Line Receiver, U16, AM26LS33, to gain noise immunity. 100 Ohm resistor R1 is used as a line termination to match the line impedance for minimum SWR and ringing. The output of U16 normally rests in the "high" or "Logic 1" condition between transmission of data frames. The first bit in the data frame is a start bit and is always "low".

A cross-coupled NAND latch composed of two stages of U11 is used as the status control for the receiver. Between data frames it is in the "waiting" state with a "low" on pin 8 and a "high" on pin 6. The pin 8 "low" is applied to 4-bit binary counters U9 & U10, 54F161A, keeping them in the "reset" condition. After inversion by a section of U11, the pin 8 signal is also applied to the data transfer strobe inputs of data output latches U4 and U7, 54LS374. Since at this time the proper logic combination for decode of "stop" is not being applied to the inputs of U15, its output is "high" and is not active at the pin 4 input of the cross-coupled NAND.

Figure 30:
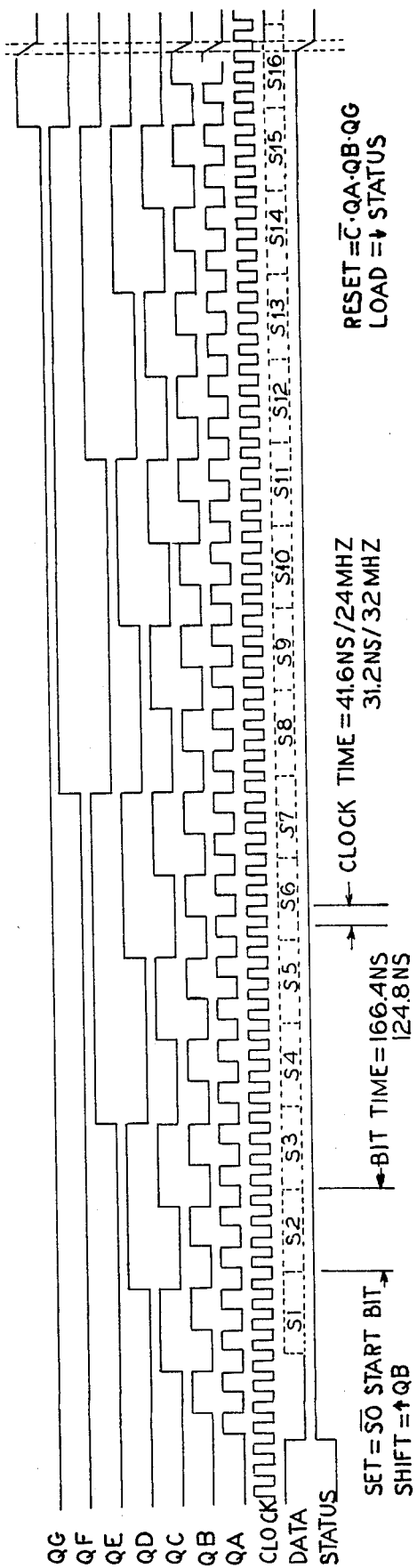

As soon as the start bit is received, the outputs of the cross-coupled NAND latch switch states, and the channel enters the "receive" state. The channel remains in this state independently of any incoming data until 17 bit state times have elapsed, at which time the control counter outputs and the clock yield the logic (C QA QB QG) at the output of decoder U15, applying the "low" to pin 4 of the status control latch and resetting the channel. During the time that the channel is in the "receive" state, a data shift is generated each time that control counter output QB transitions from "low" to "high" and is applied to clock input pin 8 of the shift registers U5 and U8, 54F164, loading another data bit into these shift registers. The timing of the QB positive transition occurs during a window of 25% of the bit time and is so placed that the data is guaranteed valid and stable anywhere within the limits of the window (see timing diagram) (FIG. 30).

At the seventeenth bit time, the complete data frame has been loaded into the shift registers and the bits are aligned properly in the stages of the register. At this time the status latch is reset, as previously described and the word at the output of the shift registers is transferred to the data latches U4 and U7 by the transition of the status latch applied to pin 11 of the data latches. The received word remains active at the outputs of the data latch until the next incoming word has been completely received. The time interval for this to occur is variable, and depends on processing time required by the Symbol Generator in the HEU to set up the next word for transmission, but the time is never so short as to not allow the receiver to reset and maintain "sync", nor so long as to cause flicker or visible display anomalies. These timings are a function of hardware and software processing in the DMU and SGU in the HEU, and have been carefully "tuned" to optimize the quality of the display. For example, specified delays have been introduced at certain symbology transitions to provide for extra beam blanked time to compensate for settling time in the deflection amplifiers.

Before the latched output word is applied to the input of DAC U1, AD-DAC-87, it passes through an array of exclusive-OR gates, U2, U3, and U6, 54HC86, referred to as the "mirror" circuit. This circuit is required to prevent display smearing when the SGU computes an overrange data word, which it will do due to essential design compromises in the SGU. The SGU must prepare successive data frames with minimal delays in order to draw the required amount of symbology within the mandatory 20 millisecond screen update time required to avoid visible flicker. Inserting a magnitude check for each data frame in the software would have consumed too much time.

The input range of the DAC is 12 bits, including sign. If this magnitude is exceeded, the high order bit involved will be lost and the remainder modulo 12 will be applied to the DAC, being interpreted as a sudden command to go from $V_{out(max)}$ to $V_{out(min)}$. Even though the blanking command is set to "beam off" during the overranged word, the Z-axis amplifier cannot respond fast enough, and the slewed beam would be visible as a "tail" or "smear" in the display. By using the high-order or overrange bit to switch the alternate inputs of the X-or gates, the modulo 12 remainder will be complemented and the DAC will now see only a 1-bit diminution in the prior maximum value. Successive overrange increments with the high order bit set will be interpreted as continuing decrements. No slewing of the deflection amplifier is commanded, and the Z-axis command is properly executed.

The output of the mirror circuit is applied to the inputs of the DAC. This device is internally referenced and has a video bandwidth response time suitable for the application. The "low" analog output is not connected to a local ground, but is individually run to a single-point ground for the input/output of the respective channel of the deflection amplifier on the Display Drive PC Board. This method of connection was necessary to reduce noise in the display to a minimum.

Figure 21A:
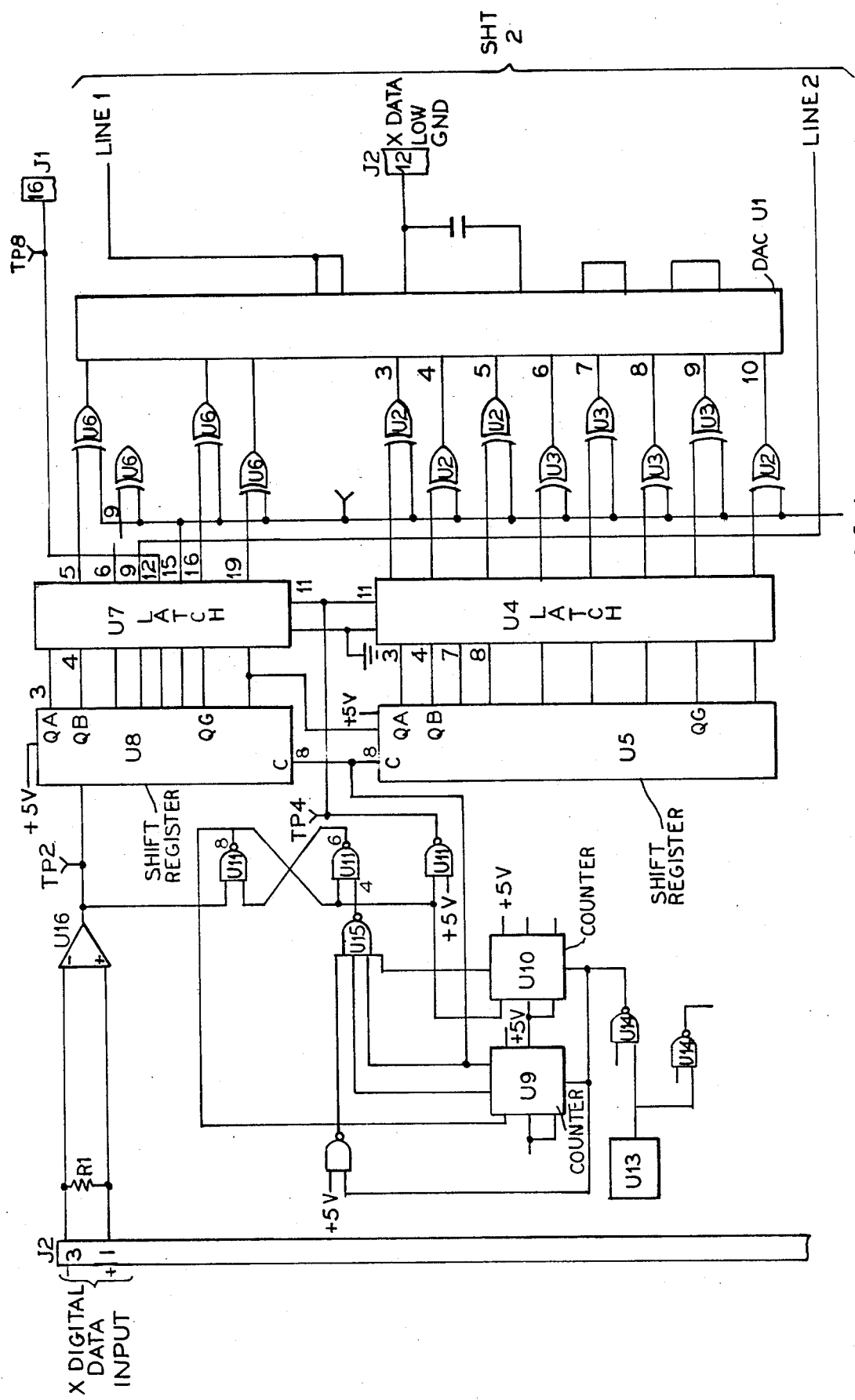
Figure 21B:
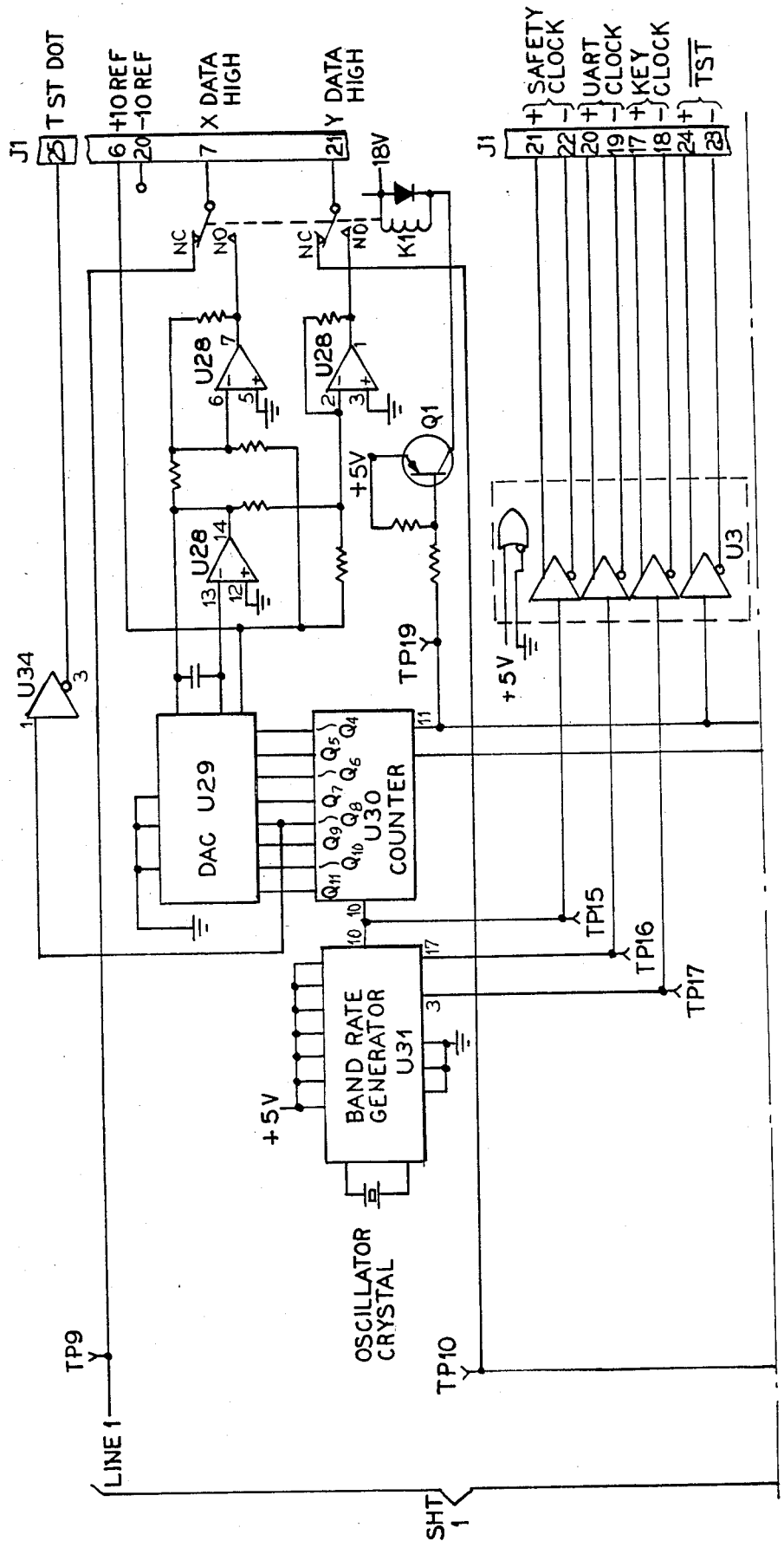

PDU Master Clock Generator (13-3, FIG. 13, & FIG. 21B)

Clock signals required for the operation of the PDU, with the exception of the Data Receiver clock previously described, are provided by a Programmable Baud Rate Generator chip, type COM8136, U31 on Sheet 2 of Schematic Diagram 506-1646. The chip is associated with an oscillator crystal of 5.0688 megaHertz, and is hard wired on its programming pins to provide three output frequencies. These frequencies, and their use in the PDU, are as follows:

| OUTPUT | PIN | FREQUENCY | FUNCTION |
|---|---|---|---|
| FX4 | 10 | 1.267 Mhz. | 1. BIT Symbol Generator(Test Pattern) |
|  |  |  | 2. Dead Beam Detector retriggering |
| FR | 3 | 6.4 Khz. | Keyboard Encoder clock |
| FT | 17 | 316.8 Khz. | UART (PDU Data Transmission) clock (9600 Baud) |

Since the BIT Symbol Generator (Test Pattern) function is also located on the Display Logic PC board, the 1.267 Mhz. output from U31 is directly connected to pin 10 of U30, the counter chip involved in that function. The other clock functions are used by other PDU boards in the non-DEU area of the partitioning, so the clock outputs are converted to differential line-driver output by three sections of U32, AM26LS31, for noise-free transmission through the PDU wiring harness, or over interconnect cabling in the cae of a remote DEU installation. The master clock functions will be discussed elsewhere along with their respective circuitry.

(part of) PDU BIT Circuitry (13-4A & 13-4B, FIG. 13)

NOTE: The PDU BIT Circuitry is distributed among several of the boards in the PDU, which is logical due to the many different functions that need to be tested. The primary control logic for PDU BIT is located on the Display Logic PC Board. Therefore, the basic theory of PDU BIT operation will be discussed at this time, with references made to test signals used on other boards. These other tests and signals will be more fully discussed with the Circuit Descriptions for the respective boards involved.

PDU Test Pattern Generator (13-4A, FIG. 13, & FIG. 21B)

The PDU is provided with a simplified local symbol generator which is capable of independently drawing a dashed diagonal line from the lower left to the upper right corner of the image plane in response to a test command and without any cooperation from the HEU other than the furnishing of proper power to the PDU. Also, certain other tests must be valid within the PDU before the line can be drawn. This provides some assistance to the service technician in localizing a HUD system failure to the proper LRU. The local SGU operates when the TEST status line goes low, and its output is substituted for the normal deflection signal from the Data Receiver DAC's by a DPDT relay.

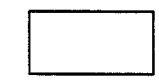

PDU BIT TEST PATTERN

The FX4 output (1.267 Mhz.) of the PDU Master Clock chip U31 is continuously applied to the clock input pin 10 of CMOS binary counter chip U30, type CD4020. Under normal PDU operation, this counter is held in the reset condition by a "high" on the reset input pin 11. The logic is supplied by the TEST status being in the inactive condition, which is "high". When a PDU test cycle commences, this line goes "low" and the counter operates while TEST is low, approximately two seconds. Counter outputs Q4 through Q11 are supplied to inputs of DAC chip U29, type AD7520. The two unused inputs of this DAC are tied off to ground, causing it to run as an 8-bit DAC. During the time when the counter is active, the DAC is continuously scanned and outputs an analog signal in the form of a sawtooth ramp.

The sawtooth ramp from the DAC is subjected to scaling and offset by three sections of OP Amp U28, type HA4602, and associated passive components. Reference voltage for both the DAC and the OP Amp circuitry is provided by the +10.000 VDC Precision Reference, insuring a stable and known amplitude signal for drawing the test pattern. If the test pattern were to be grossly undersize or oversize, the technician could conclude the possibility of a failure in the precision reference, deflection gain, or elsewhere, depending on the observed details. Two conditioned outputs are provided; one for input to the X deflection axis and the other for Y. These signal levels are chosen such that when applied to the inputs of the deflection amplifiers a diagonal line is drawn from the lower left to the upper right of the normal image plane. The signals are supplied to the normally-open contacts of DPDT relay K1 which switches them into the deflection amplifiers in place of the normal signals from the Data Receivers when the relay closes. The relay is driven by the internal PDU TEST line through driver transistor Q1.

One of the counter outputs, state Q8, is buffered by a section of line driver U34, type AM26LS31, and fed to the Z-Axis Analog PC board to provide a square-wave blanking signal to the CRT grid during the time that TEST is active. Logic gates on that board (to be discussed elsewhere) are used to switch from normal command blanking to the test blanking signal as a function of the PDU TEST status being active. Failure of the dashes in the line to be visible during test could possibly diagnose a failure in the blanking circuitry.

Figure 21C:
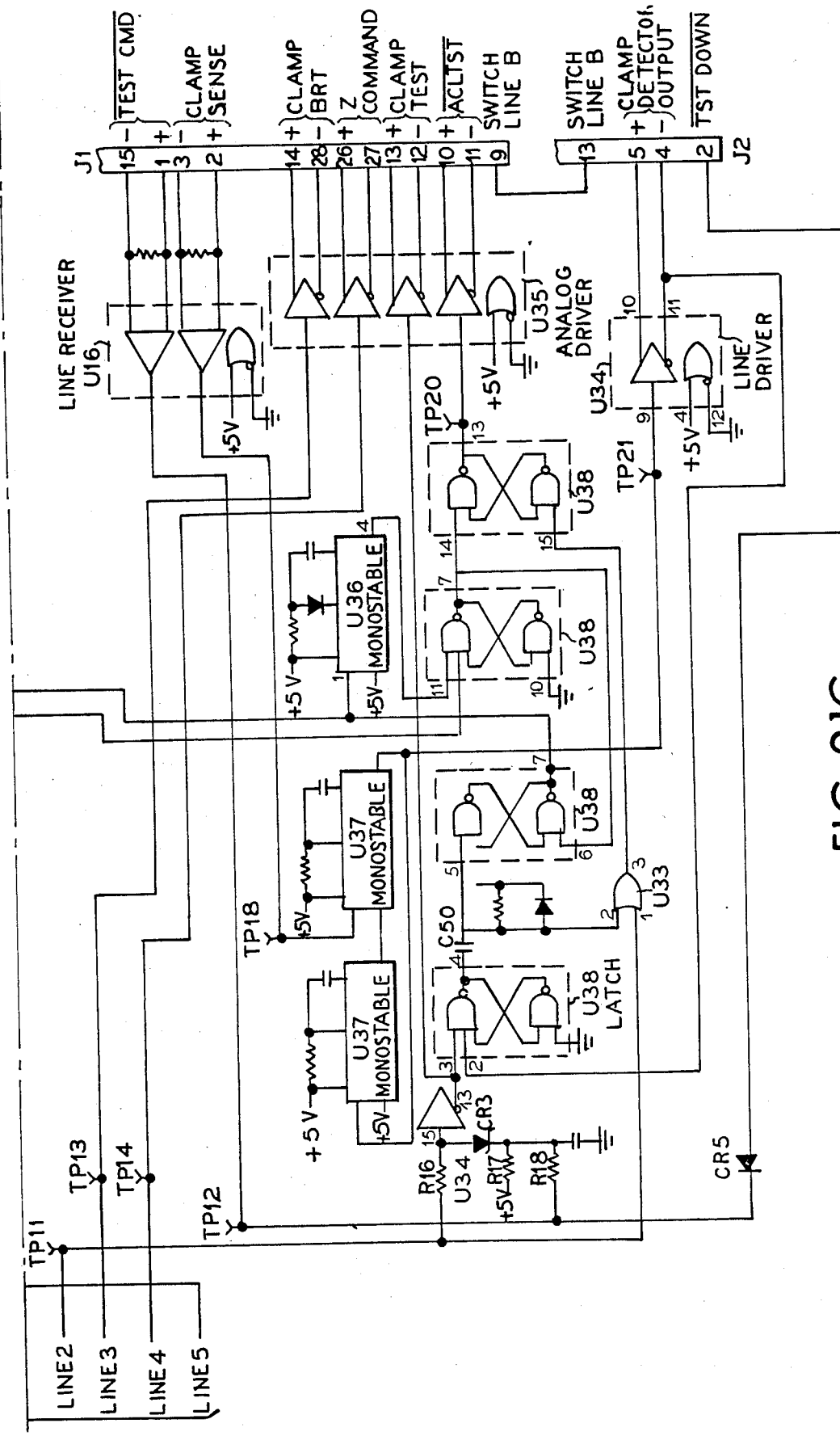

(part of) BIT Control Logic (13-4B, FIG. 13, & FIG. 21C)

Most of the logic associated with PDU BIT control is located on the Display Logic PC board. This circuitry occupies the lower half of Schematic Diagram 506-1646, Sheet 2. This logic is complex and rather difficult to describe, as it tests diverse hardware in the PDU and interfaces with both hardware and software in the HEU, involving some rather critical timings.

A PDU Internal Test Cycle can be commanded in two ways. The first of these is when the pilot or a maintenance technician presses the "PDU TEST" key on the PDU keyboard. The second way is when the HEU transmits a PDU Test Command over the data interface (X Channel Bit 13). An HEU commanded test can be done in response to a System Test Cycle, or if (currently unimplemented) the HEU System Software would verify PDU status automatically. In addition, whenever the "PDU TEST" key on the keyboard is held down, this is reported to the HEU over a separate discrete line. If the "down" condition is continuously maintained, the HEU software can switch into a special test, diagnostic, and programming mode intended for use by maintenance technicians. These test command functions are controlled by one stage of line driver U34 and associated passive components R16, R17, R18, CR3, CR5, and C51, as follows:

U34 stage (pins 15 and 13) is used as an inverter and as an impedance buffer so that there can be a high impedance presented at the R16/CR3 node to allow the "analog logic" used here to work. A buffered input from the Keyboard Interface PC Board representing "PDU TEST" key down" enters on one section of line receiver U16 and is applied to 100 Ohm resistor R18. This is "Active Low", and is also applied to cathode of CR5, the anode of which is supplied over the aircraft cabling as an input discrete "TESTDOWN" to the HEU. The diode CR5 prevents a short on this line or a failure in the HEU from locking the PDU in the TEST mode. The other input to this network comes in on R16 from the X channel data latch, bit 13, on the Data Receiver and goes "low" when a PDU test command is received from the HEU. This signal is also applied to U33, pin 1, and is used to authorize the Accelerometer test sequence. R16 and CR3 prevent the External Test Command from coupling to the TESTDOWN discrete. R18 and C51 provide local key debouncing for the "PDU TEST" input.

The output at pin 13 of U34 goes "high" whenever a PDU test sequence is commanded, from either source. It is applied to a section of quad R/S latch U38, type 54LS279, pin 3. This section is configured as a 2-in NAND. The input at pin 3 cannot immediately produce an output at pin 4 until pin 2 also goes "high". This happens in response to a successful test of the CLAMP detector circuit.

The U34 pin 13 signal is sent to the CLAMP detector circuit on the Z-Axis Analog PC Board by Line Driver U35. If the CLAMP circuit responds to this test input, a signal "CLAMP SENSE" is received at a section of Line Receiver U16 and triggers one section of monostable U37. The detailed function of these two monostables will be explained when the theory of CLAMP is discussed. The resulting pulse is sent to the HEU as a normal CLAMP interrupt by Line Driver U34, and pin 11 of this line driver is applied to pin 2 of U38, where it is "anded" with the signal at pin 3. A low-to-high transition at pin 2 coupled with the remaining high at pin 3 results in a high-to-low transition at pin 4, which is differentiated and coupled to pin 5 of U38 by C50. This flips the Test Status Latch (U38, pins 5, 6, & 7) from the normal to the test state. If the test command had come from the HEU over the data receiver, pin 1 of U33 will be low and the differentiated low-going pulse also applied to pin 2 of U33 will cause the output on pin 3 to pulse low. This flips the accelerometer test latch U38, pins 13, 14, & 15, to the accelerometer test status, and a signal is sent by line driver U35 to the accelerometer test buffer on the Inertial/Reference PC Board. Verification of proper accelerometer response to this test command is done by software in the HEU monitoring the accelerometer analog inputs.

The active low TEST signal at pin 7 of U38 is applied to the input pin 9 of line driver U32 and then distributed throughout the PDU. Functions of this signal will be discussed with the respective PC Boards involved. The TEST signal is also applied to input pin 1 of monostable U36 and initiates a two second timing period. When U36 times out, its output at pin 4 again goes high and is anded with test pattern counter state Q14 at pins 11 and 12 of a section of U38 being used as a NAND gate. The output at pin 9 of this gate is applied to pin 6 and pin 14 of U38 and used to reset the TEST latch and the Accelerometer Test latch after two seconds of operation. The reason for the anding of U36 output with the test pattern counter Q14 is to avoid a logic race at the beginning of the TEST cycle.

DEU/PDU Data Distribution (Line Drivers/Receivers) (13-5, FIG. 13 & FIG. 21C)

Besides those Line Driver/Receiver sections already discussed above two additional sections of Line Driver U35 are used to buffer the CLAMP Bright and the Z Command discretes from the Data Receiver for distribution through the PDU wiring harness, or through aircraft wiring if the DEU is remoted.

Safety Interlock (FIG. 21C)

One other design feature, common to all PC Boards in the PDU, will be discussed at this point. Note the PC track jumper between Display Logic PC board connector J1 pin 9 and J2 pin 13, labelled "Switch Line B". This is a safety interlock to prevent possible damage to the PDU resulting from unauthorized or improper maintenance procedures, and works as follows:

Power to the HUD System is controlled by a switch located near the keyboard of the PDU, on the Display Brightness control pot. Closure of this switch applies a ground to a power relay in the HEU which applies aircraft +28 VDC to the HEU power supply. Connection between this switch and the pins on the PDU system connector passes through "switch line" jumpers on every PC Board in the PDU. This insures that system power cannot be unintentionally applied if a PC Board has been removed from the PDU, and also insures that power will be shut off if a board is pulled "live". This is necessary to insure against serious hardware damage from operation with critical circuitry missing. As an example, the CRT can be burned in a matter of milliseconds if the beam should become stationary and the automatic protection circuitry was not functioning. Other high value components, such as the accelerometers, could be damaged from improper voltages resulting from missing PC Boards.

Functions contained on the Display Drive PC Board assembly are:
1. PDU/HEU interconnection distribution (FIGS. 22A & 22B)
2. Local regulators for + and −15 VDC PDU Power (FIGS. 22C & 22D)
3. Local regulators for + and −6 VDC power required by the pincushion corrector chip (FIG. 22B)
4. Pincushion Correction circuitry (FIG. 22B)
5. X Axis Deflection Amplifier (FIGS. 15 & 22E)
6. Y Axis Deflection Amplifier (FIG. 15)
7. Startup Lockout circuit for deflection (FIGS. 22A & 22B)

Figure 22A:
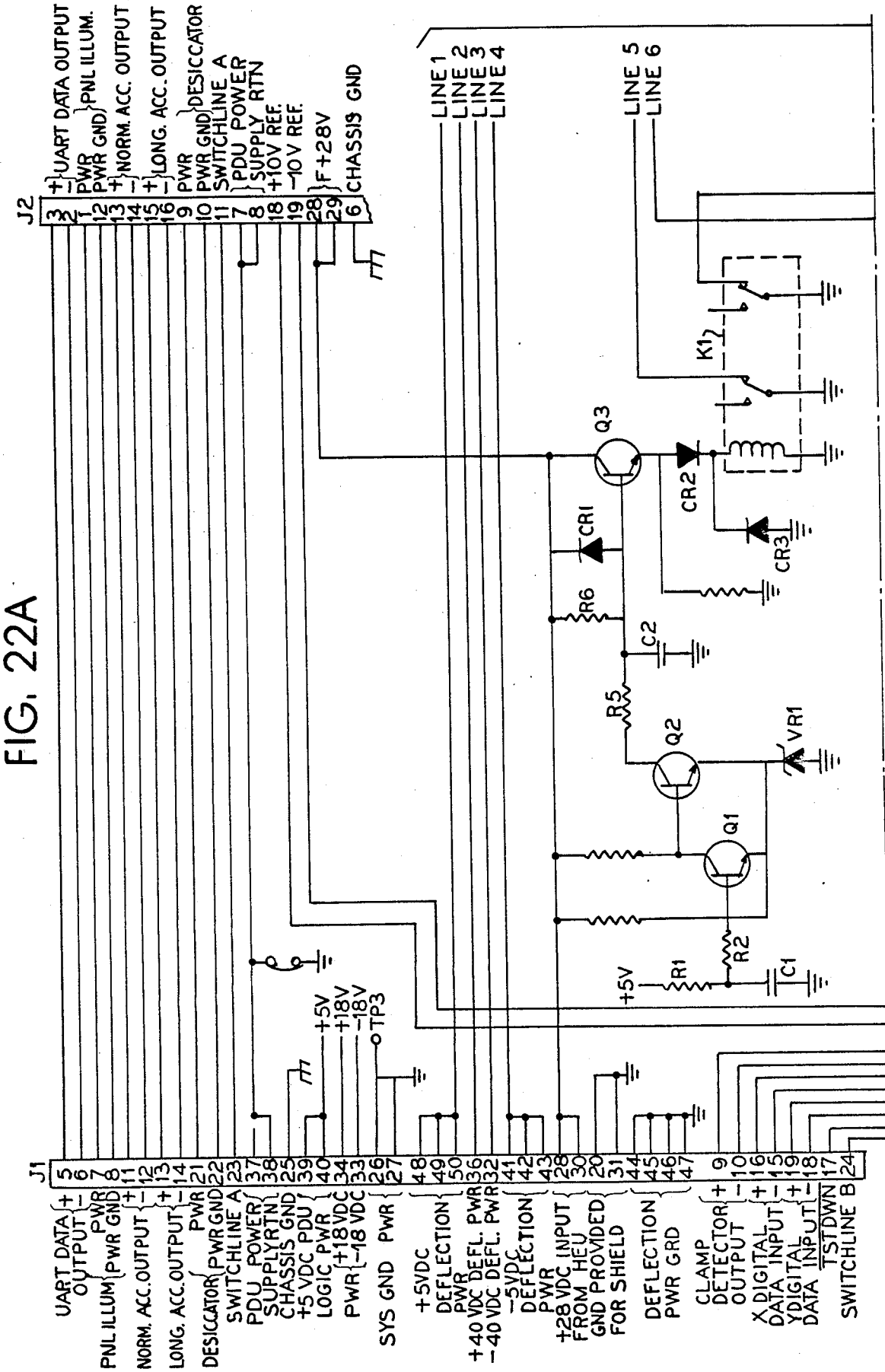
Figure 22B:
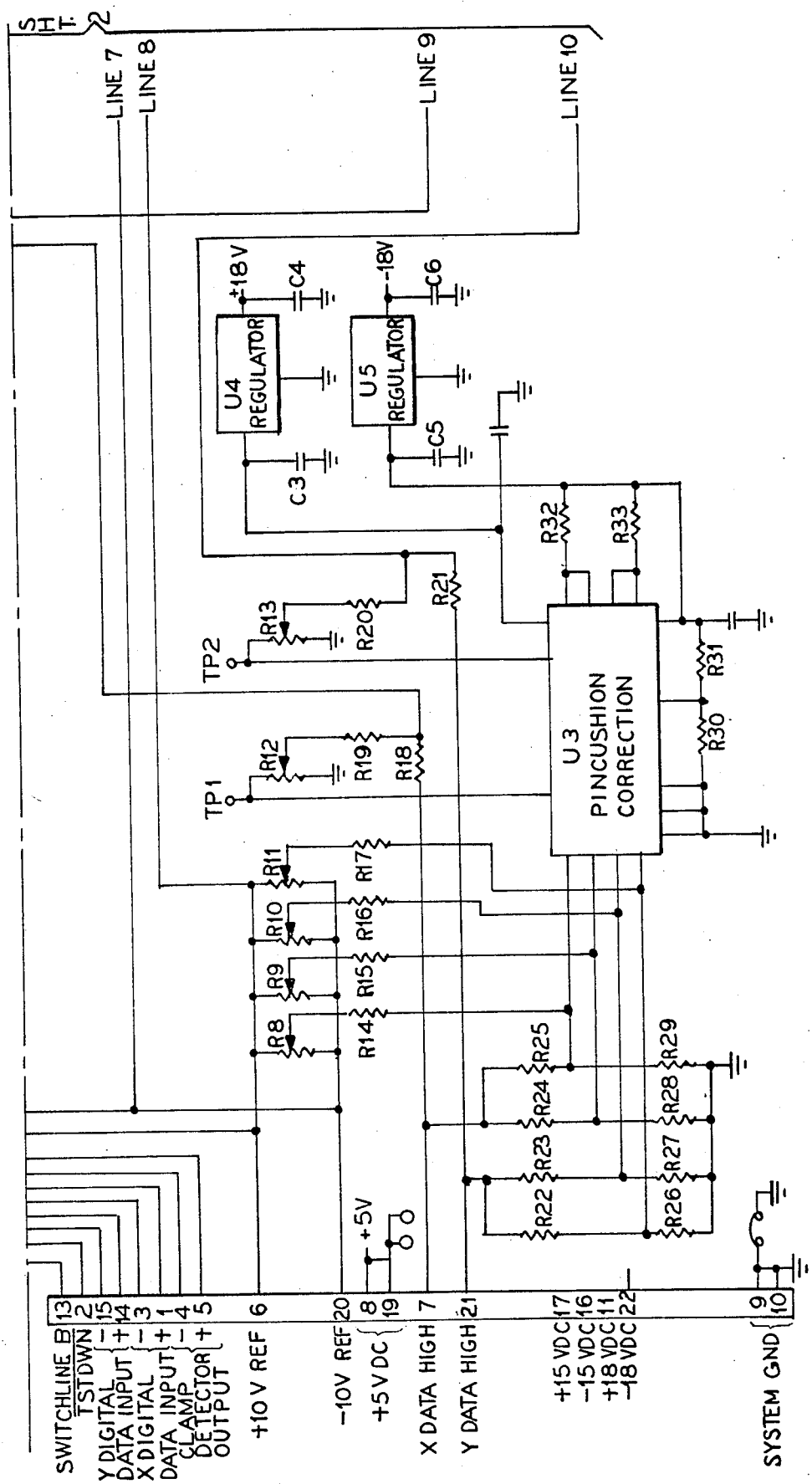

PDU/HEU Interconnection & Distribution (FIGS. 22A & 22B)

All electrical connections between the PDU and the remainder of the HUD System, including those aircraft lines that do not enter the HEU (such as Desiccator and Panel illumination Dimmer Bus) are made through a male 50 pin D-style connector (J1) accessible through an aperture on the bottom rear of the PDU chassis. This connector is permanently affixed to the Display Drive PC Board assembly, and those lines which need to be distributed to other circuitry in the PDU are run by PC track to two other connectors on the Display Drive board; 34 pin male AMPMODU connector J2, which connects to the PDU wiring harness, and 22 pin male connector J3, which jumpers to the Display Logic PC board. The particular routing of lines was chosen to facilitate the remote relocation of the DEU, as has been described above. In addition, the routing of signal and ground lines has been designed to minimize the effects of noise pickup and unwanted coupling between high and low level signals. For example, The analog ground from each deflection amplifier is individually run to its respective Data Receiver DAC on the Display Logic PC Board, and single-point grounding is used for all signals, input and output, associated with each deflection amplifier. Also, there are three "ground" connection systems in the PDU, and the Display Drive PC board makes provision for selectably jumpering these grounds to each other so that attempts can be made to minimize noise problems in any individual installation if required. Modulation of ground voltage due to power supply return currents can thus be isolated from unwanted coupling into signal paths. No tweaking has been required in the Pilatus configuration units; it may become of more importance if and when the DEU is remotely located in a future model. It might be mentioned that noise reduction was one of the major design goals during the transition between breadboard and prototype, and has been successfully accomplished. The interconnection scheme can be seen on Sheet 1 of Schematic 506-1647

Figures 22C, 22D, 22E:
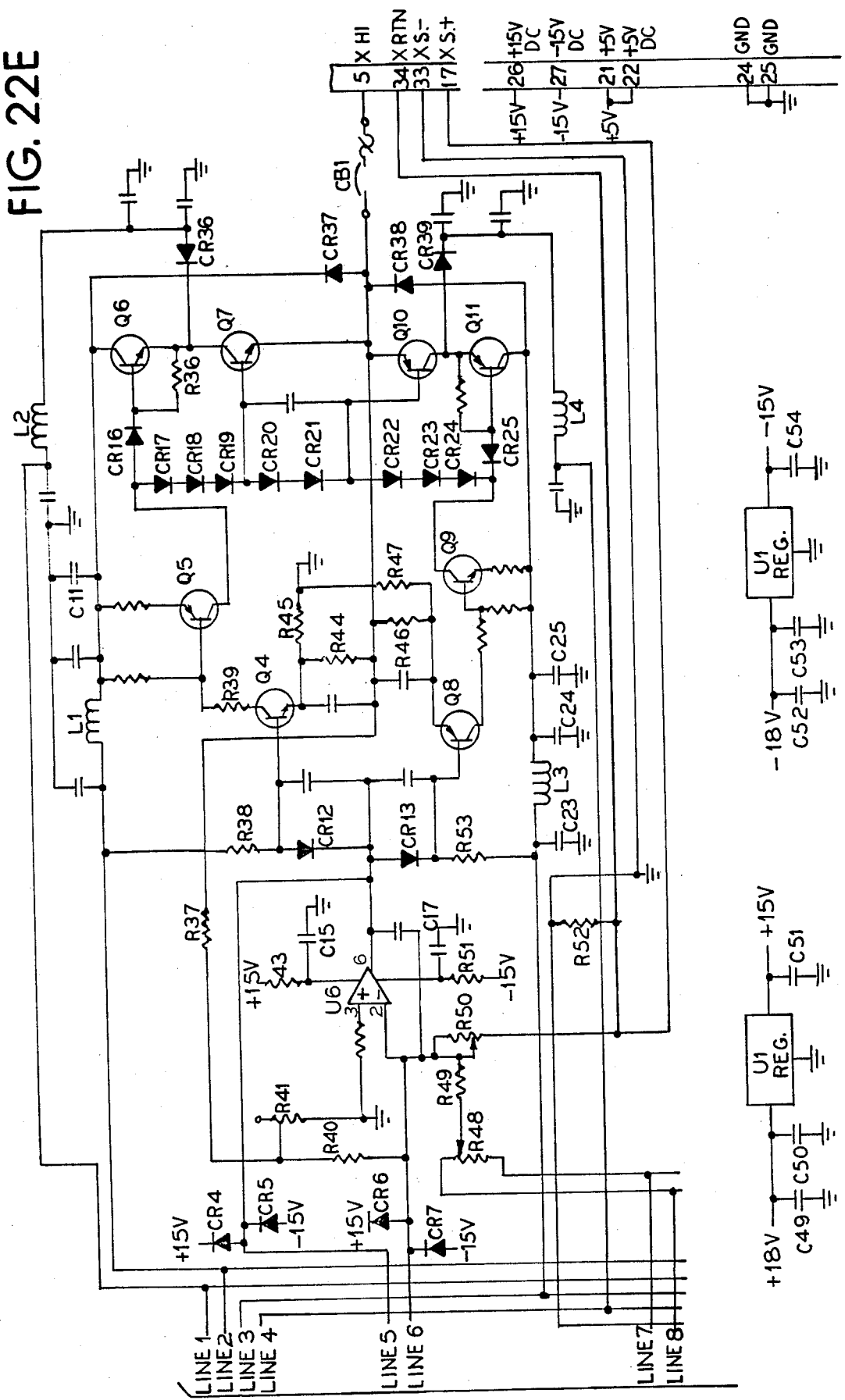

Local Regulators for + and −15 VDC PDU Power (FIGS. 22C & 22D)

TO-220 style regulators, LM340T15 (U1, positive) and LM320T15 (U2, negative), are used to provide regulated + and −15 VDC power for analog circuitry in the PDU. They are located on the Display Drive PC Board to take advantage of one of the central thermal sink locations, the chassis rail provided for cooling the deflection amplifier transistors. Since there is no fan in the design of the PDU, the PDU was designed for conduction cooling of all major heat-producing components, with eventual disposal of the heat through the chassis, into the PDU Mounting Tray, and eventually into the airframe. These regulators receive their input power from the unregulated + and −18 VDC from the power supply in the HEU. Capacitors C49 thru C54 are associated with these regulators to provide local decoupling and filtering. Their outputs are distributed to components on the Display Drive PC Board by means of PC track, and to other components in the PDU through connector pins to the wiring harness.

Local Regulators for + and −6 VDC, required by the Pincushion Corrector chip (FIG. 22B)

The Pincushion Corrector chip (to be discussed below) is a type C312 made by Intronics Corp. This chip requires an accurately regulated + and −6 VDC for referencing internal analog function generator and multiplier circuits. These voltages are provided by Fairchild regulators type 78M06HM (U4, positive), and 79M06HM (U5, negative), located on the Display Drive PC Board in close proximity to the Pincushion Corrector chip, U3. The regulators are provided in the TO-5 package, and require no heatsinking as their dissipation is very low. Input power to these regulators also comes from the HEU + and −18 VDC unregulated source. Output of the regulators is provided to only the pincushion chip. Capacitors C3 thru C6 provide local decoupling and filtering for the regulators.

Pincushion Correction Circuitry (FIG. 22B)

Because the deflected beam in the CRT scans a flat faceplate, a nonlinear relationship comes into being between the angle of beam deflection and the spot displacement on the faceplate, approximating a tangent function, and giving rise to what is called "pincushion distortion". The deflection signals must therefore be "inversely distorted" in order to secure a linear displacement in the image. These functions are provided in a specialized high-speed analog computing chip made by Intronics (type C-312). This chip (U3) receives the X and Y deflection command signals from the DAC's on the Display Logic PC Board, computes a correction term for X and Y, and sums the correction term into the original commands before they are fed to the Deflection Amplifiers. Associated with the C-312 chip is a complex network of 20 fixed resistors (R14 thru R33), and 6 potentiometers (R8 thru R13), which provides a fixed precalibration or range scaling of the chip for the deflection angles and image size associated with the CRT and yoke, and also a means for fine tuning the circuit to minimize the overall residual distortion. The pincushion correction circuit also has the capability of minimizing some of the residual systematic and translation-invariant distortion in the optical system. The C312 chip also has an output available to introduce a correction for variations in focus with beam displacement, but during design it was decided that this phenomenon was sufficiently minor to not require correction. To have used the focus correction output would have required the design of a high-speed high-voltage amplifier to modulate the +2500 VDC focus output with the correction signal. Working closely with the Pincushion Correction System are additional potentiometers in the input of the Deflection Amplifiers, which set Gain, Offset, and Loop Response. Calibration of the system for minimizing pincushion and other geometric distortion involves a sequential procedure for adjusting the potentiometers, including multiple passes through the sequence until the distortion has been reduced to acceptable limits. Test patterns are built into the HEU software to use during the calibration procedure. Once calibration has been established, CLAMP (Closed Loop Analog Monitoring Program, Patent Pending), will maintain calibration of the image for gain and offset, but not for pincushion. It is assumed that for small increments of gain and offset correction, pincushion will "track".

X-Axis Deflection Amplifier; Y-Axis Deflection Amplfier (FIGS. 15 & 22E)

As both deflection amplifiers have identical circuitry, they will be discussed together. Component nomenclature will refer to the X-Axis channel, top drawing on sheet 2 of 506-1647.

A major design effort was put forth in the area of the deflection amplifiers in the PDU, in order to reduce power consumption and display noise. The resulting design of these amplifiers is unconventional, and provides a very high level of performance along with low component count and cost, and low power consumption.

The biggest problem during the design of the deflection amplifier was to develop the wide bandwidth current output to the inductive load of the yoke without the power consumption penalty of sourcing this current from a high rail voltage. Yet a high rail voltage is requred for slewing the beam within an acceptable time. The solution chosen was to use a variation of the Class B amplifier known as Class G, in which the rail voltage essentially is instantaneously selected from 2 or more levels available as a function of the command and load requirements. Two levels of rail voltage are used in the PDU Deflection Amplifier, because fortunately the bandwidth spectrum of the stroke writing signal is clustered around two peaks, one for writing and another for slewing. The problem is more complex in a similar amplifier for high fidelity audio, as the spectrum is flatter, and the Carver amplifier uses three rail levels. In spite of the complexity required for switching rail levels, the deflection amplifier must have a high degree of stability and wide bandwidth at low levels of output, to prevent noise and distortion in the output, especially when drawing alphanumerics. The eye is much more sensitive than the ear to low levels of noise and distortion. Since a stroke writing amplifier is a terrible generator of EMl, special decoupling networks had to be placed close to the amplifier circuitry to avoid radiating the broadband EMl back out the aircraft cabling, or into other nearby PDU circuitry. Other specialized circuitry had to be provided to allow system reset if the amplifier should remain "hard-over", and to provide a safe pathway for the energy stored in the yoke inductance to bleed away if the loop should open (such as the instant that system power is removed).

The Deflection Amplifier consists of three "stages"; a voltage amplifier consisting of OP Amp U6 and associated passive components, a level translator circuit consisting of transistors Q4, Q5, Q8, and Q9 and associated components, and the output totem-pole consisting of transistors Q6, Q7, Q10, and Q11 and associated components. There are three feedback loops (K1, K2, & K3) in the deflection amplifier (excluding any minor loops which may be contained entirely within OP Amp U6). The major feedback loop (K1) is closed around the deflection yoke current as sensed by 0.05 Ohm, 1%, 2.2 Watt wirewound resistor R52. A voltage proportional to instantaneous deflection current is developed across this resistor and fed to the inverting input of U6 through potentiometer R50 which serves as the primary gain control for the amplifier. The first minor loop (K2) serves to set the internal gain of the level translator stage. Deflection Amplifier output voltage is applied to resistive divider networks R44/R45 and R46/R47 which develop a follow-up bias for the emitters of Q4 and Q8 which comprise the first stages of the level translator. Degenerative feedback is thus provided to this stage, allowing a voltage excursion to take place at the output of Q6 which otherwise would have to act as a pure current source for the bases of Q4 and Q8. To aid in avoiding crossover distortion in the interface between U6 and the level translator, diodes CR12 and CR13 are used to match the emitter characteristics of Q4 and Q8, and are foreward biased by resistors R38 and R53, which also source the drive current for Q4 and Q8 bases as the voltage at U6 pin 6 is "followed-up". These resistors are sourced to + and −40 VDC to aid in providing a more linear current source.

The second minor loop (K3) consists of a T-network between the voltage output of the Deflection Amplifier and the inverting input of U6, consisting of R37, R40, and adjustable potentiometer R41 which serves as a stability adjustment for the entire amplifier. Feedback through this network, among other effects, will cancel out the effect of the charging current of the distributed capacitance of the deflection yoke and associated wiring harness slowing down the response of the amplifier during small high speed excursions, such as when writing alphanumerics. How this loop works can best be visualized by observing the behavior of the amplifier at both limits of adjustment, and then it will become evident how a compromise is found to maximize the stability of the amplifier. If R41 is turned all the way towards ground, no feedback is provided in this minor loop, and all of the feedback to U6 has to come from the voltage developed across current sensing resistor R52. In this case the amplifier "slows down" when rapid excursions are required due to the charging current of the yoke distributed capacitance being sensed. The net effect is "tails" and smeared symbology, especially visible when alphanumerics are being drawn. In the other extreme, with the maximum value of resistance of R41 in the network, the percentage of feedback from the major loop (R52) is diminished to the point where the amplifier becomes unstable and breaks into oscillation. Before this point is reached, the amplifier high frequency response becomes increasingly sensitive, and another type of "tail" is observed due to "ringing" in the amplifier. It is possible to find a point of adjustment for R41 where the symbology and alphanumeric characters are "square" and show minimal "tailing". In practice this adjustment behaves in a manner very similar to the compensation adjustment of a scope probe.

A centering adjustment is provided by potentiometer R48 and resistor R49 to electrically compensate for any mechanical misalignment of the deflection yoke or CRT/Optical assembly. R48 receives the precision + and −10.000 VDC Reference voltage at either end of its element, and a small current proportional to potentiometer displacement from center is bled into the inverting input of U6 through current scaling resistor R49. During calibration, R48 is set for image centering with CLAMP not operating.

OPERATION OF CLASS "G" OUTPUT STAGE: As mentioned earlier, since an inductive load is being driven and the loop is being closed around current, it is necessary to provide a high rail voltage when rapid changes of current are required, but to maintain amplifier efficiency, a low rail voltage is required for slow current changes or steady state conditions. This is accomplished by the modified complementary totem-pole output stage consisting of power transistors Q6, Q7, Q10, and Q11, along with biasing diodes CR17 thru CR24, coupling diodes CR16, CR25, CR36, and CR39, and protection diodes CR37 and CR38. Two levels of rail voltage are provided to the output stage; + and −5 VDC coupled into Q7 and Q10 collectors thru CR36 and CR39, and + and −40 VDC supplied to the collectors of the upper stages Q6 and Q11. During steady state conditions or during slow excursions of the beam, Q7 and/or Q10 supply the current to the deflection yoke from the 5 Volt rails. Q6 and/or Q11 remain off as the command voltage from the level translator stage is not sufficient to turn them on. When, however, the 5 Volt rails cannot supply the required value of current, the voltage output of the level translator stage will increase to the point where Q6 (or Q11) will be turned on, supplying current from the 40 Volt rail, and decoupling the 5 Volt source through CR36 or CR39. Need for current from the 40 Volt rail is momentary during rapid beam excursion, and the peak currents required are supplied from stored energy in capacitors C11 and C25; the power supply in the HEU not being designed to supply this much energy on a continuous basis. As soon as the slew is accomplished, the amplifier drops down onto the 5 Volt rail again. Diodes CR37 and CR38 protect the output stage from possible damage from release of stored energy in the yoke by clamping the inductive "kick" to a value limited by the rail voltage. These diodes are equivalent in function to those used for the same purpose in Static Inverter circuits. All power transistors used in the totem pole are mounted to an aluminum strip which is attached to the Display Drive PC Board assembly. This aluminum strip mounts to a cooling rail which is part of the PDU Chassis, and thus a path for conduction cooling of the Deflection Amplifiers is provided. The waste heat is sunk to the airframe through the PDU Mounting Tray.

During the testing of this amplifier design, it was found necessary to also provide OP Amp U6 with protection diodes, CR4 thru CR7 on the schematic. It was found that the discharge current of the yoke could reach the OP Amp and burn out the bonding wire for the amplifier output internally connected to pin 6. These protection diodes clamp both the output and the inverting input to the + and −15 VDC OP Amp supply, eliminating the failure mode.

Associated with the output of the deflection amplifier is an auto-reset circuit breaker, CB1, in series with the deflection yoke. This component is necessary to permit the HUD System to restart inself without pilot intervention if the beam should remain commanded "hard over" due to a glitch or a data or software error. The power supplies in the HEU which supply the deflection rail voltages to the PDU have been designed to supply the normal average deflection current requirements, plus a margin of safety, but have not been designed to supply the 6 or 7 Amperes necessary to continuously hold the beam over to the limit of the CRT. If, for example, symbology was being drawn over at the right side of the screen and a momentary "glitch" stopped the processor in the HEU, the last received data word would remain latched in the PDU Data Receiver, and the beam would dwell indefinitely at the right side of the screen. Within a very short time the stored energy in the filter capacitors is used up, and now the HEU power supply cannot put out enough current to keep the beam at its commanded position, and the supply pulls out of regulation. Now the processors in the HEU lose the 5 VDC logic supply required to function, and the system dies. However, the auto-reset breaker (nominal average current 2 Amperes) will eventually open, relieving the overload. Now the processors in the HEU are repowered and reinitialized, good data is again sent to the PDU, and by the time the breaker resets, normal deflection commands are again being received at the deflection amplifiers.

Considerable pains had to be taken in the design of the Display Drive PC Board to prevent radiation of EMI back out the lines supplying the rail voltages to the deflection amplifier, as the load on these lines is a broadband, high current pulsing load. Also, a local energy storage capacitor had to be provided for each line at each amplifier to handle the instantaneous peak current demands. These functions are provided by inductors L1 thru L4 and associated capacitors. The electrolytic capacitors provide for energy storage, while the ceramic capacitors provide high frequency decoupling. Note that the inductors are intended to prevent outgoing EMI and not to provide filtering for the incoming power. Note also that the incoming power to OP amp U6 is locally decoupled by R43/C15 and R51/C17 to prevent noise from entering the chip on its supply lines. The Display Drive PC Board is also designed as a multilayer board with power and ground plane to aid in noise reduction and EMI control.

Startup Lockout Circuit for Deflection (FIGS. 22A & 22B)

Refer to Schematic Diagram, 506-1647, Sheet 1, (FIGS. 22A & 22B) Because during initial powerup of the HUD System, the logic state of the data latches in the Data Receiver circuit in the PDU is indeterminate, and because a certain time is required for the processors in the HEU to become initialized and begin sending valid data to the PDU, is is possible for the beam to be commanded "hard over" during this time, causing the power supply in the HEU to become overloaded, as described above in conjunction with the auto-reset circuit breakers. Therefore, circuitry is provided on the Display Drive PC Board to disable the Deflection Amplifiers for about two seconds immediately following powerup, or after any time in which the +5 VDC logic supply drops below a value consistent with reliable computer operation. These functions are provided by transistors Q1, Q2, and Q3, along with relay K1 and associated passive components. Relay K1, in the normally deenergized condition, places a short on the outputs of the OP Amps U6 and U7 in the Deflection Amplifiers, preventing any output from the amplifiers. Circuitry associated with K1 energizes the relay two seconds after the +5 VDC becomes valid. Zener diode VR1, and Q1 form a level detector set to switch at 4.6 VDC. Logic supply voltage is applied to the base of Q1 through noise filter network R1/C1/R2. When the value of the logic supply transitions above 4.6 VDC, Q1 is turned on, turning off Q2 by robbing it of base current. This permits C2 to begin charging up through R6, and Q3 follows the voltage up, applying it to the coil of K1 through CR2, until a value is reached at which K1 energizes, activating the deflection amplifiers. R5, and CR1 thru CR3 provide a rapid discharge path for C2 and protection for Q3 from inductive kickback of the coil in K1.

Figure 23A:
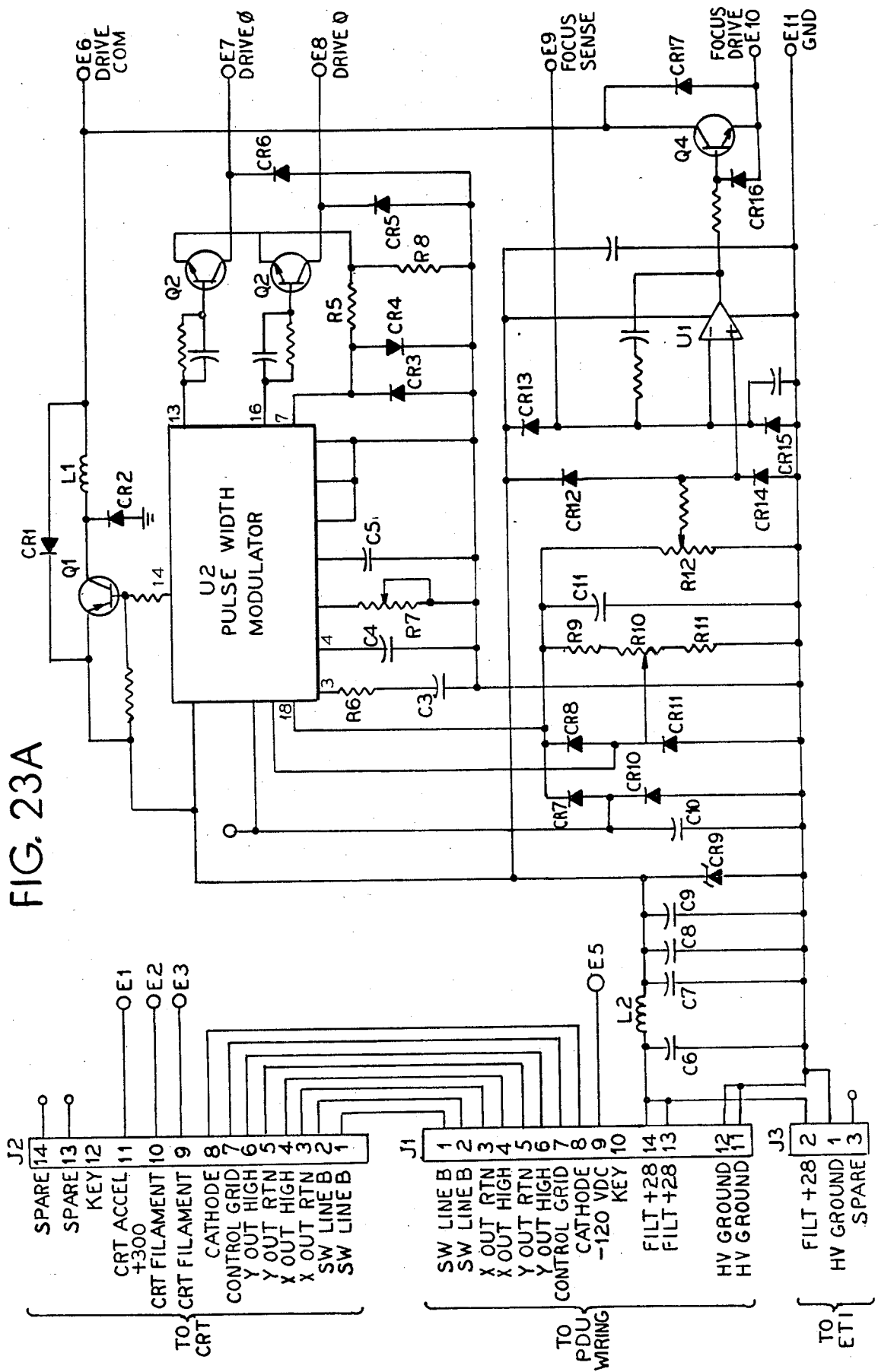
Figure 23B:
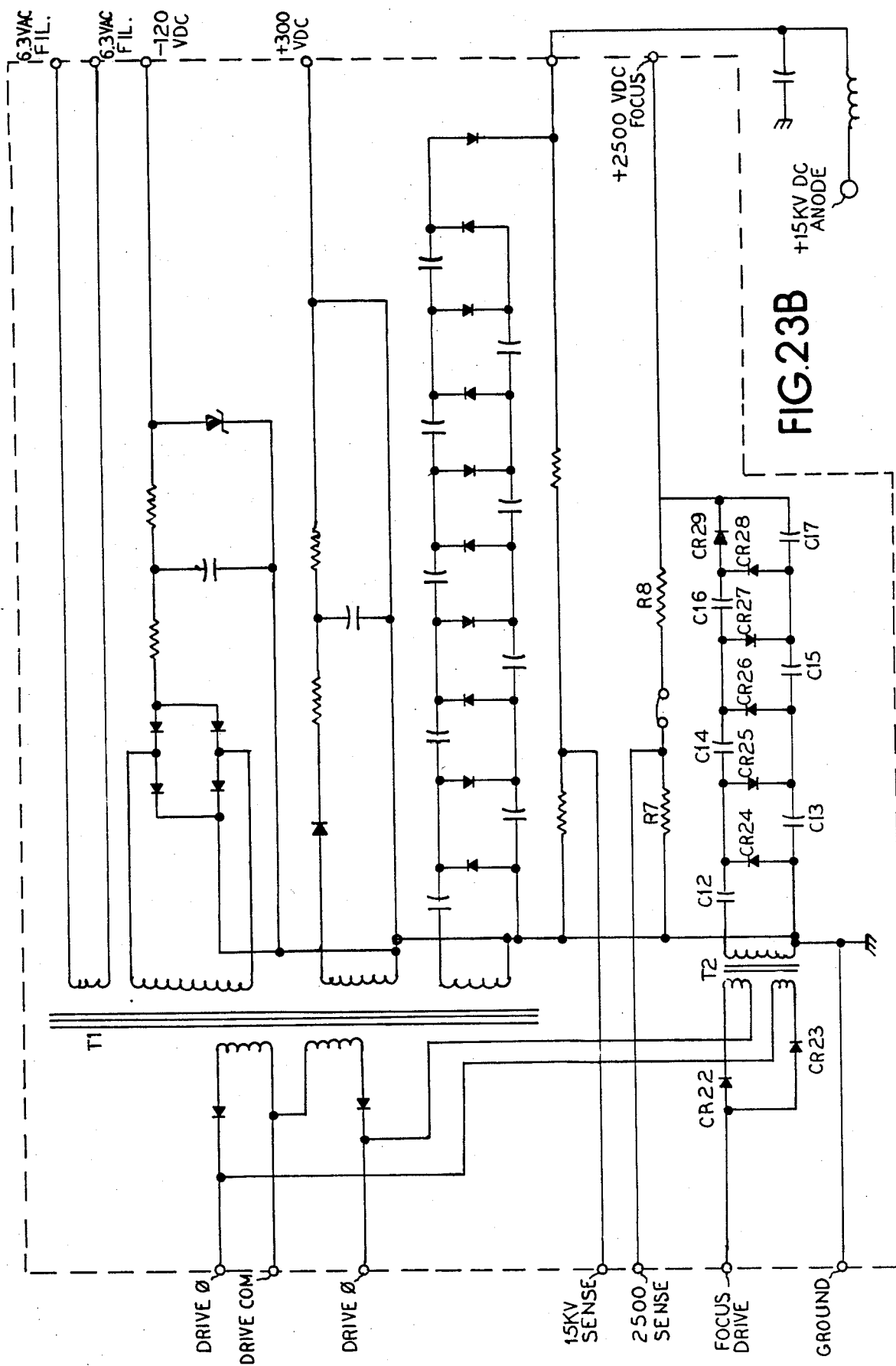

Circuit Description for Power Supply, High Voltage (FIGS. 16, 23A & 23B)

The Power Supply, High Voltage (JET design configuration) is a custom unit designed to provide the special voltages required by the Cathode Ray Tube (CRT) and associated circuitry in the PDU. The assembly consists of two PC Boards and several discretely mounted components. Because of the very close functional interrelationship of components in this unit, this circuit description will discuss the entire unit, rather than by PC board partitioning.

In the current PDU design, there are two possible configurations of this Power Supply. One is the JET-designed and built unit to be described here, and the other is a vendor supplied part-form, fit, and function equivalent to the JET unit-but comprising a different internal circuit design. The latter unit will not be discussed.

All circuitry running at elevated voltage levels has been located inside of a hermetically sealed can assembly filled with pure mineral oil for insulation, cooling, and vibration damping functions. The circuitry inside the can includes the transformers, rectifiers, and filter/multiplier capacitors. Circuitry involving the low voltage and control functions (regulator IC's, driver transistors, adjustment potentiometers, EMl filters, etc.) is located on an externally mounted PC board attached to the can assembly by a heat sink rail. The power semiconductors are mounted to this heat sink rail, providing conduction cooling to the can assembly, which in turn transfers its heat to the PDU chassis. The 28 VDC input and low voltage power outputs of the supply are provided to three AMPMODU connectors located on the external PC board assembly. The high voltage output for the CRT anodes is provided on two special connectors located on the can assembly, which mate with special cables from the CRT to prevent arcing and corona at altitude. Refer to Assembly Drawing ER0091-2, and Schematic Diagrams 506-1674 (Driver/Regulator), and 506-1675 (Rectifier/Filter) during this discussion.

POWER SUPPLY DESIGN PHILOSOPHY-GENERAL DISCUSSION

The heart of the design for this power supply is the type SG1526 controller chip. This device is a specialized PWM (Pulse Width Modulator) along with an internal voltage reference, oscillator, automatic symmetry control, automatic shutdown, and loop response circuitry, designed specifically as a power supply controller. A secondary regulation loop using a 741 OP Amp "piggybacks" on the output of the SG1526 and controls regulation of the focus output. The primary regulation loop is closed around the +15,000 VDC CRT second-anode output, with the secondary loop closed around the (nominal) +2500 VDC focus output. The other voltage outputs are independently regulated by zener diode circuits. The SG1526 chip drives two power transistors which drive the primaries of the main and focus power trnsformers in the can assembly. Another power transistor is used in a flyback circuit associated with the center tap supplies for the power transformers. Voltage multipliers, rectifiers, and filters within the can assembly convert the secondary outputs of the power transformers to the required DC voltages. A separate winding on the main power transformer supplies 6.3 VRMS for the CRT heater. Some system interconnect functions are also provided on the Drive/Regulator PC Board; carrythrough lines for some of the CRT elements and a +28 VDC power carrythrough for the ET1, which plugs into a connector on the board.

Power Supply Circuit Description-Detailed Discussion

Input power to the High Voltage Power Supply is +28 VDC aircraft power, conditioned for spikes and EMl by networks in the HEU power supply. ALC network is provided at the input of the HVPS, primarily to prevent outgoing EMl and also to assist in energy recovery by the flyback circuit. Components in this network are C6 thru C9 and L2. Zener diode CR9 (type UZ5836, $V_Z=36$), provides local overvoltage and polarity reversal protection. Output of the protection network supplies DC power to the IC's and to the flyback circuit.

Drive for the power conversion originates with an oscillator within the PWM chip U2 (SG1526), operating at approximately 9 Khz and adjustable by R7. This is converted into two Pulse Width Modulated square waves, 180° out of phase, and appears at pins 13, 14, and 16 of the chip as switching transistor closures. The common collectors of these transistors are internally connected to pin 14 and the emitters brought out to pins 13 and 16. The duty cycle of the PWM is proportional to energy demand by the power supply as a function of line and load, and is controlled by the regulator circuitry on the chip. Feedback for regulation is taken from the +15 KV output via a divider network (R5/R6) located within the can. Potentiometer R10 is supplied by the internal reference voltage (pin 18) of U2 through wing resistors R9 & R11, and is used to set the primary regulation loop for 15 KV output.

The output switching function of the PWM chip is used to control power transistors Q1, Q2, & Q3. Q2 and Q3 drive the push-pull primary windings of both the main and focus power transformers T1 & T2 through isolation diodes CR1, CR2, CR22, & CR23. Q1 is involved in the flyback circuit and switches on whenever either drive transistor is on. Voltage is thereby supplied to the power transformer primary center taps through inductor L1, which acts as a quasi-current source, and also stores energy in its magnetic field during this time. During the turnoff interval, the field of this inductor collapses, returning energy to the incoming DC supply by the action of diodes CR1, CR2, and the capacitors and inductors in the EMl network already described.

R8 (0.75 Ohm) is in series with the emitter current path of drive transistors Q2 and Q3 and serves to measure drive current. If this drive current becomes excessive due to power supply overload or component failure, the resultant voltage applied to pin 7 of U2 (current sense) will shut down the supply, preventing (further) damage to components. The network R5/CR3/CR4 protects the current sense input from damage from momentary switching spikes.

Capacitor C4 on pin 4 of U2 provides a "soft-start" or "slow-in" characteristic upon powerup, preventing a problem with overshoot of the output voltage before the loop has stabilized. The CRT rated anode voltage of 15 KV is very close to the maximum the tube can withstand without punchthrough or breakdown, and power supply overshoot cannot be tolerated. RC network R6/C3 on pin 3 of U2 provides loop response time constant tailoring to insure a stable loop.

Another feature of the SG1526 PWM regulator chip is the automatic symmetry control. Normally, under stable conditions, each output pulse would be of the same width. But during slewing of the pulse width, each successive pulse put out would be a little longer or shorter than the preceeding during the slew interval.

The net result would be that the sum of all the pulses put out at pin 13 would be a little longer or shorter than the corresponding sum for pin 16 output, resulting in a net DC offset in the transformer, which could cause a problem with magnetic saturation for rapid rates of slew. The SG1526 chip solves this problem by a special circuit that insures that during slewing each "pair" of output pulses is equal in width. It is only the successive pairs that vary in width; hence no asymmetrical flux condition can develop in the transformer core.

A cascaded or "piggyback" loop is used to control the +2500 VDC (nominal) focus output. OP Amp U1 (741) is used to modulate the conductivity of transistor Q4 which supplies a variable voltage to the primary centertap of focus transformer T2 as a function of feedback from focus voltage divider R7/R8 within the can assembly. Focus voltage tends to "track" the main output as both transformers are supplied by the same PWM square wave drive, and hence it is "preregulated" and the focus regulator circuit serves to fine tune the regulation as well as providing a means of necessary adjustment for the CRT focus. R12 serves as the focus adjustment, and is supplied by the PWM chip U2 internal reference voltage.

Because a high voltage power supply is subject to locally generated EMP whenever an arc is drawn from the output, all input pins of both IC's are protected by clamping diodes. Diodes involved in this function are CR3 through CR15, exclusive of CR9. Also diodes CR16 and CR17 protect the junctions of focus drive transistor Q4 from EMP damage.

Primary output of 15K VDC is developed by a ten stage voltage multiplier consisting of C3 through C11 and multijunction silicon rectifiers CR12 through CR21. A final LC filter assists in reducing noise at the output and suppressing entry of EMP into the supply during arcing at the output. Three other secondaries on power transformer T1 supply 6.3 VRMS for the CRT heater and input for the rectifier/filter/regulators for the +300 VDC and −120 VDC outputs respectively. These rectifier/filter/regulators are conventional in design and use simple RC filtering and "brute-force" zener diode regulation.

Focus voltage output of 2500 VDC is developed by a six stage multiplier consisting of multijunction rectifiers CR24 thru CR29 and capacitors C12 through C17. The multiplier is driven by the secondary of T2.

Figure 24:
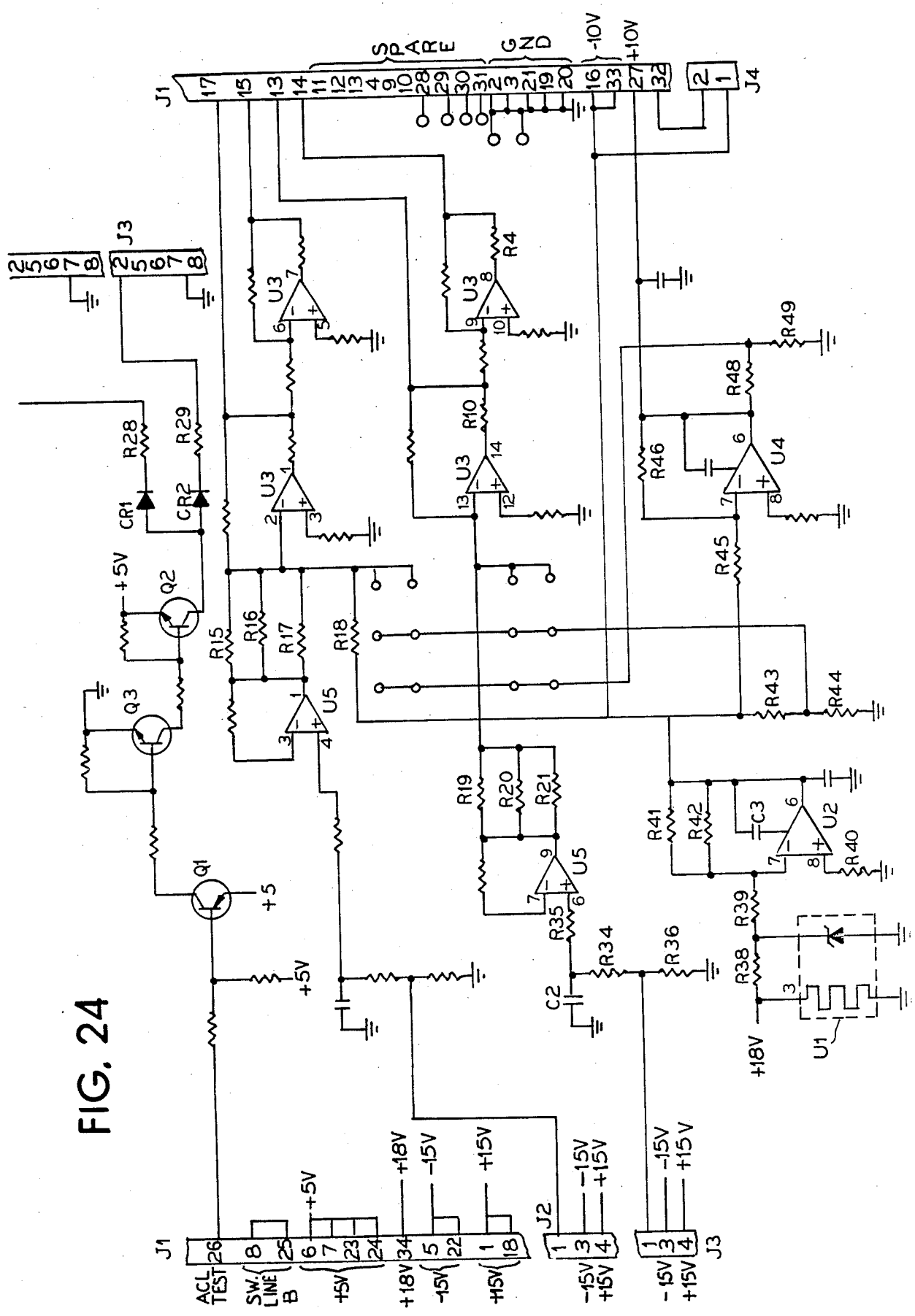

CIRCUIT DESCRIPTION for Inertial/Reference PC Board (FIG. 24)

The Inertial/Reference PC board assembly contains circuitry for implementing the following functions in the PDU:
1. Generation of the precision DC voltage reference required for various analog circuitry in the PDU.
2. Providing signal conditioning (filtering, scaling, offset, test, and calibration) for the Normal and Longitudinal Accelerometers.
3. Provision for mounting of the photoresistor used for automatic brightness control in a position below the port in the top cover.

The present configuration of the PDU has the accelerometers deleted; and therefore the associated circuitry has been depopulated from the PC board. However, certain PDU configurations for installations in aircraft where an inertial platform or equivalent strapdown system is not available will require the provisioning of the accelerometers in the PDU. Therefore this Circuit Description will discuss the required accelerometer circuitry.

Refer to the Schematic Diagram, Inertial Reference, Drawing No. E506-1651, during this discussion.

The precision DC voltage reference (+/−10.000 VDC, +/−0.001 VDC) is developed by Precision Reference IC U1 (LM199H), and Power OP Amps U2 and U4 (LH0041C), and associated passive components. U1 is a special integrated circuit containing a zener diode operating at the isothermal point of 6.95 VDC, a heater, a temperature sensor, and a closed-loop temperature regulating amplifier, all integrated on a single silicon substrate. It is provided in a four-lead TO-18 package covered with a heat-insulating shroud. The temperature regulation mechanism keeps the package at a controlled temperature above expected operating ambients, insuring voltage stability of the zener.

Unregulated +18 VDC from the HEU is supplied to pin 3 of U1 and provides power for the temperature control loop in U1. The same +18 VDC provides current through the 7.5K Ohm resistor, R38 to the Zener in U1. The stable voltage from the Zener is applied as input to the power OP Amp, U2, through 20.0K Ohm resistor R39. OP Amp U2 is operated in the inverting configuration, with gain calibrated by selection of resistor R41 to provide a voltage output at pin 6 of −10.000 VDC, +/−0.001 VDC. C3 and R50 are required to provide the required loop stability of U2 to insure noise free DC output and minimum transient disturbance of the DC output if the load should vary. The LH0041C is designed to provide a maximum DC output current of 200 milliamperes, although system requirements of the PDU are considerably less. The −10.000 VDC reference from pin 6 is supplied to board connector pins J1 16 and 33 for distribution in the PDU, and is also internally supplied to the accelerometer circuitry on the PC board as well as providing the input to U4, which develops the +10.000 VDC reference.

U4 and associated circuitry is identical to that of U2, except for the absence of a select gain resistor. It is also run in the inverting configuration at unity gain, insured by the use of 20.000K Ohm, 0.01% resistors R45 and R46. This amplifier "mirrors" the output of U2, providing the complementary +10.000 VDC, +/−0.001 VDC reference at pin 6, which is supplied to PC Board connector pin 27 for distribution through the PDU, as well as to the accelerometer circuitry on the board. Both U2 and U4 receive their power from the + and −15 VDC regulated PDU power developed on the Display Drive PC board from the + and −18 VDC unregulated input coming from the power supply in the HEU.

The remainder of the circuitry on the Inertial/Reference PC board (when present) is associated with the Normal and Longitudinal Accelerometers, and is required for signal conditioning (scaling, offset, calibration, and test).

A quasi-current source from a lower voltage is available from the reference from resistive divider networks R43/R44 and R48/R49, to use in "fine tuning" the calibration of the accelerometer circuitry, after the basic calibration has been set.

The accelerometers (where used) are of the force-rebalance servo type and are of inertial navigation quality. They are physically mounted in the bottom of the PDU chassis to take advantage of the fact that the PDU is a controlled-mounting LRU. The associated signal conditioning circuitry has been carefully designed to avoid losing the inherent accuracy of these accelerometers fromm drift or from the effects of common-mode ground loops in the transmission of the analog data over the aircraft cabling between the PDU and the HEU, where the conversion of the analog accelerometer data to digital format occurs. Scaling has been selected to use the maximum "analog bandwidth" of +/−10 VDC for expected usable acceleration input signal range, thus minimizing the percentage of noise and offset pickup in analog data transmission to the HEU. In addition, the conditioned accelerometer analog signals are transmitted to the HEU as a differential paired signal, to cancel out any effects of common mode ground loops on accuracy.

If the accelerometers were mounted in a truly orthogonal manner to the aircraft axes, the Normal and Longitudinal accelerometers would measure theoretically correct values. However, in reality they are mounted orthogonal to the PDU chassis, which is canted in the aircraft mounting tray. Thus each accelerometer measures a component (sin/cos theta) of the required axis, and the software "undoes" the effects of the canted mounting during data processing. The angle of cant is small enough that longitudinal unit measures mainly longitudinal acceleration, and likewise for the normal unit. Description of the circuitry will proceed without reference to the angle of cant, for simplicity.

The Longitudinal Accelerometer is mounted with its sensitive axis aligned with the fore/aft axis of the airplane. Thus for the sake of this discussion, it can be assumed that only a minimal component of the earth's one G field will be sensed by this accelerometer. It will mainly sense accelerations along the fight axis of the aircraft due to thrust and drag. Scaling has been selected for +/−10 volts per G on each of the complementary differential outputs, with no intentional electrical offset for earth's gravity. R36, 332 Ohm, 1%, is used to develop a voltage proportional to the torquing current in the accelerometer. R34, C2, and R35 form a simple filter to reduce noise from aircraft vibration superimposed on the meaningful acceleration band of interest. The resulting voltage is applied to U5, which is configured as a unity-gain, non-inverting buffer. R19, R20, and R21 are selected to obtain the required gain, as specified above. Additional terminals (without R-numbers) shown on the schematic associated with the input to U3 pin 13 provide a selection for bleeding reference current into the amplifier to calibrate out any offset in the longitudinal channel, whether due to the accelerometer or due to the OP amps. The two sections of U3 in the longitudinal channel provide the conditional longitudinal acceleration output to board pins 13 and 14, for transmission to the HEU. The second U3 amplifier section "mirrors" the voltage for differential transmission. Ten Ohm resistors R10 and R4 isolate the line capacitance of the cable run from the output stage of the OP Amp, to insure stability. The OP Amps in this circuit receive power from the +/−15 VDC regulated PDU power.

The channel associated with the Normal Accelerometer is essentially identical to that for the longitudinal channel just described, with the exception of R18. This resistor is selected to bleed reference current into the Normal acceleration channel sufficient to subtract out the effect of the 1.0 G earth's field sensed by the accelerometer. The gain in the normal channel is selected by R15, R16, and R17 to provide for +/−10 Volts/G at the differential output. Thus for a constant 1.0 G acceleration due to earth's gravity, the output from the amplifiers is at zero. By not transmitting the component due to gravity, the "analog bandwith" of the channel can be better utilized to gain better noise immunity. The terminals shown without R-numbers are provided to fine-calibrate the offset in the normal channel. Differential outputs for normal acceleration are provided on board pins 15 and 17, for transmission to the HEU.

Transistors Q1, Q2, and Q3, along with associated passive components, provide a means for injecting a disturbing current into the rebalance servos of the accelerometers for self test purposes. The way that this function is implemented inside the (Japanese) accelerometers is that if things are working properly, there is NO STEADY STATE OUTPUT in response to the test current, only a momentary "kick" as the loop readjusts. The writer feels that a KNOWN INCREMENTAL OUTPUT is a preferable response to a test input, as the "kick" is difficult to detect reliably and difficult to quantity. Also if the test circuitry fails, there is NO RELIABLE WAY of knowing this. The signal to initiate the accelerometer test input comes into the PC board on J1 pin 26 and is ACTIVE LOW. The signal is generated by the HUD BIT circuitry, to be discussed elsewhere. Diodes CR1 and CR2, in the path of the test current to the accelerometers, insure that there will be no effect of the test circuitry when it is in the "off" condition. Resistors R28 and R29 develop the required test current from the +15 VDC switched by Q2. The remaining transistors in the test circuit are level translators to turn on Q2 from the input discrete.

Physically, the Inertial/Reference PC Board is mounted horizontally on top of the Optical Unit, and is located directly beneath the top cover of the PDU, near the combiner mount. The board is mounted in a convenient location for easy access to the numerous select resistors during calibration and testing.

Figure 25:
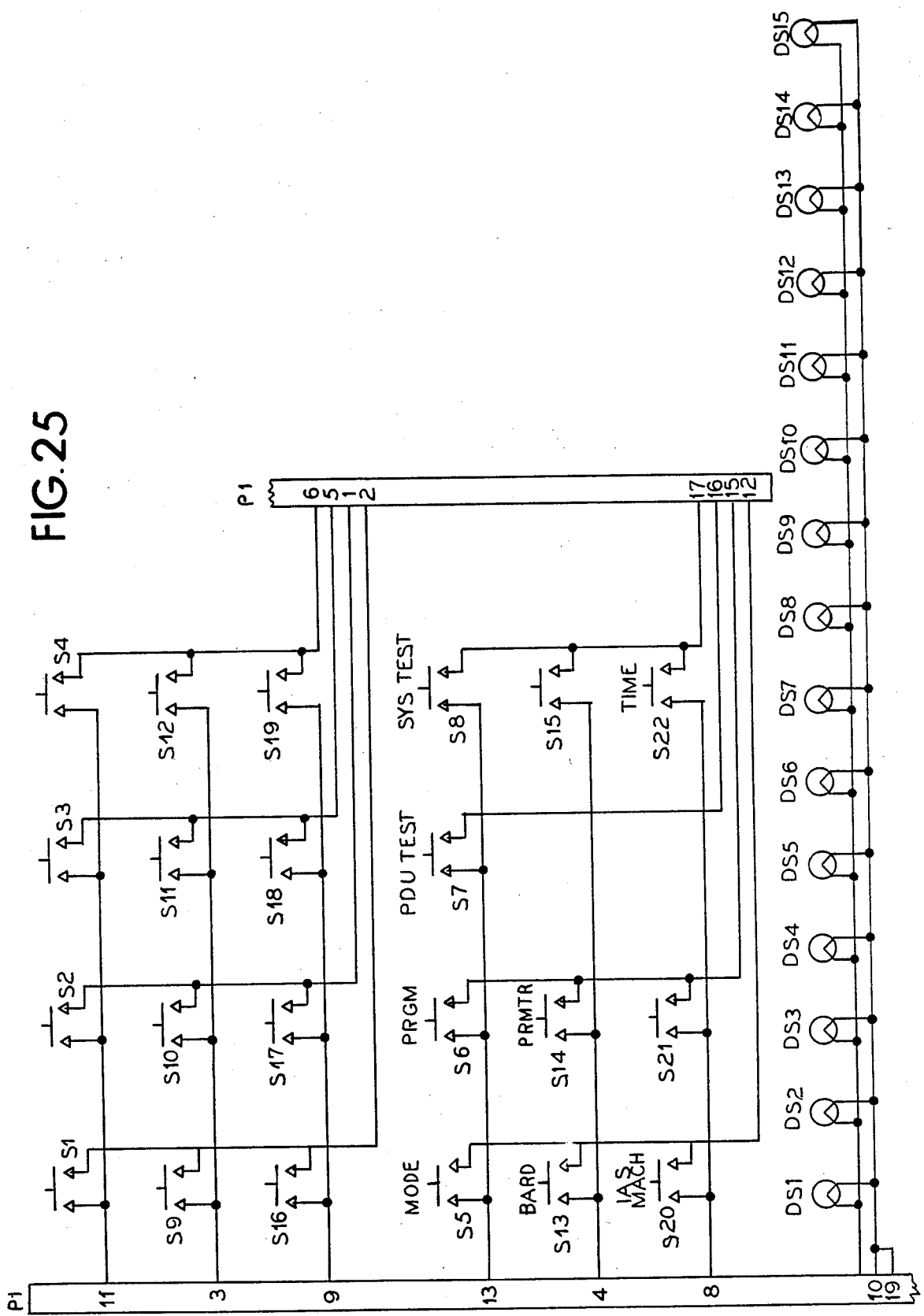

CIRCUIT DESCRIPTION for Keyboard PC Board (FIGS. 17 and 25)

The Keyboard PC Board provides the means of mounting the 22 SPST Momentary switches actuated by the silkscreened black plastic actuator buttons located in the Keyboard Assembly, mounted on the front (facing pilot) area of the PDU. Also mounted to this PC Board are 15 small incandescent lamps providing panel illumination for the Keyboard Assembly. A 20 pin male connector is provided to directly interface to the Keyboard Interface PC Board, located directly behind the Keyboard Assembly in the PDU.

The keyswitches are connected in a dual X-Y matrix arrangement as required by the 74C922 keyboard encoder chips on the keyboard interface PC board assembly. The lamps are connected in parallel, and are driven by a variable-voltage manually adjustable brightness control circuit to be described elsewhere.

Figure 26A:
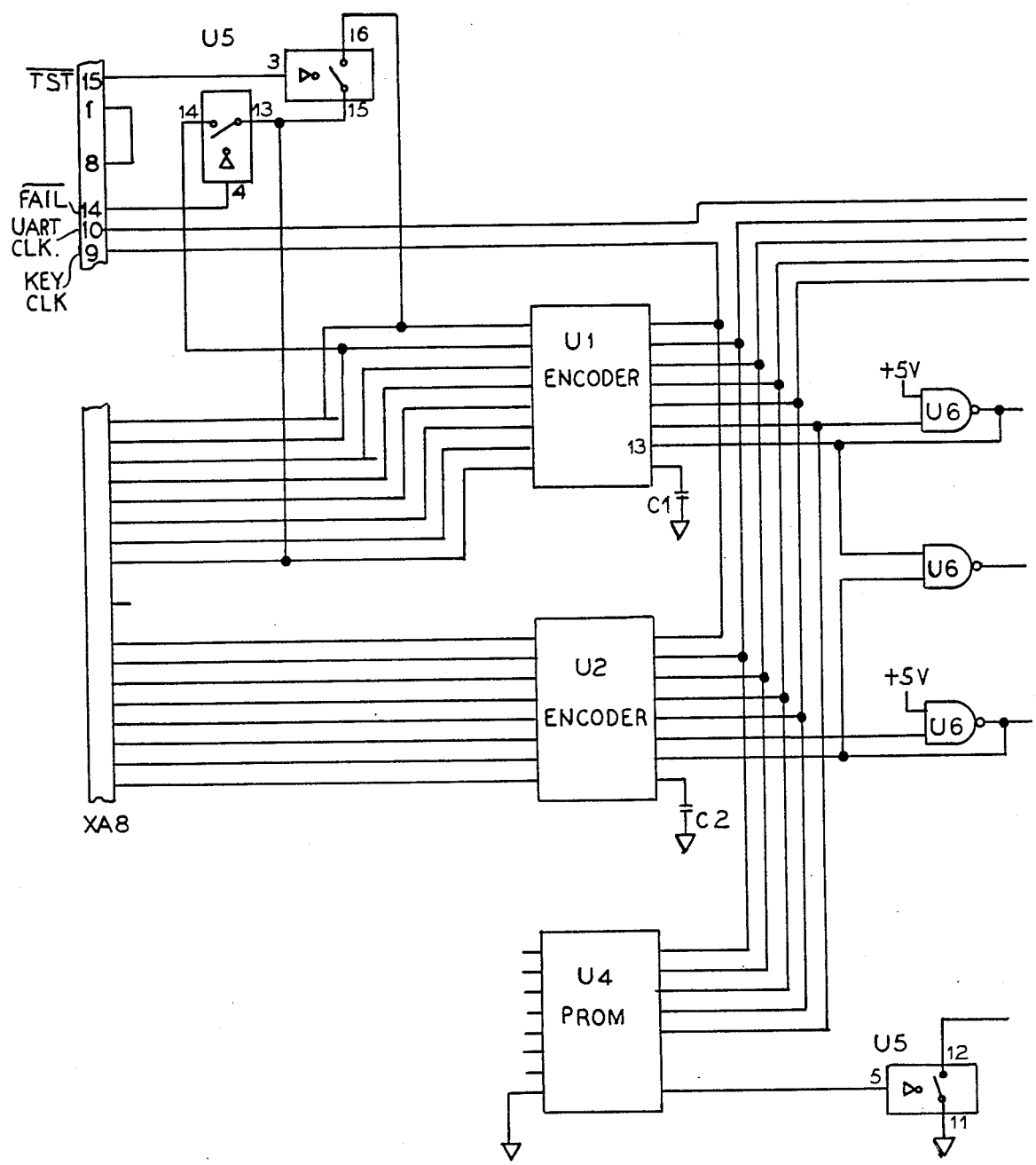
Figure 26B:
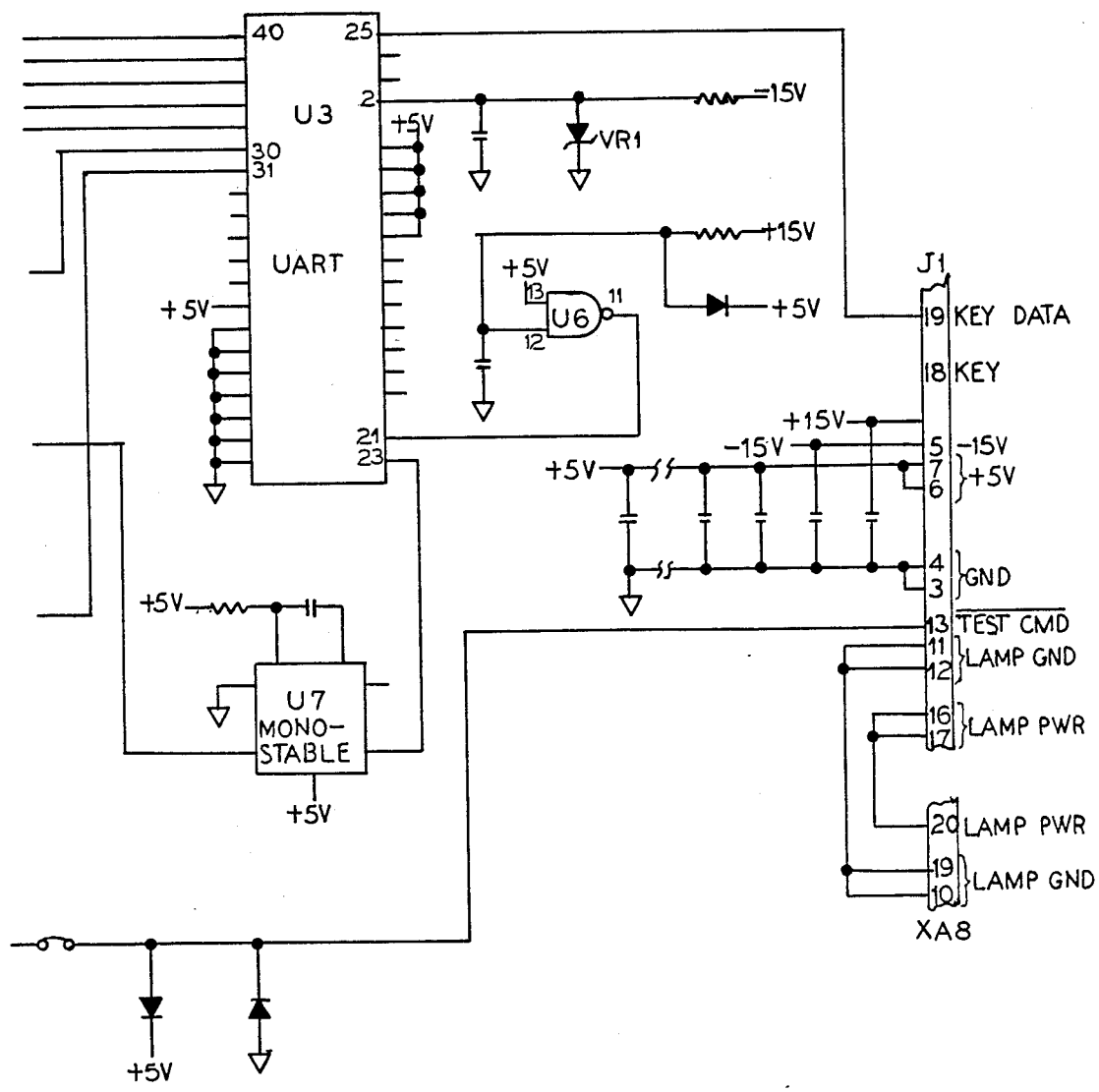
Figure 27A:
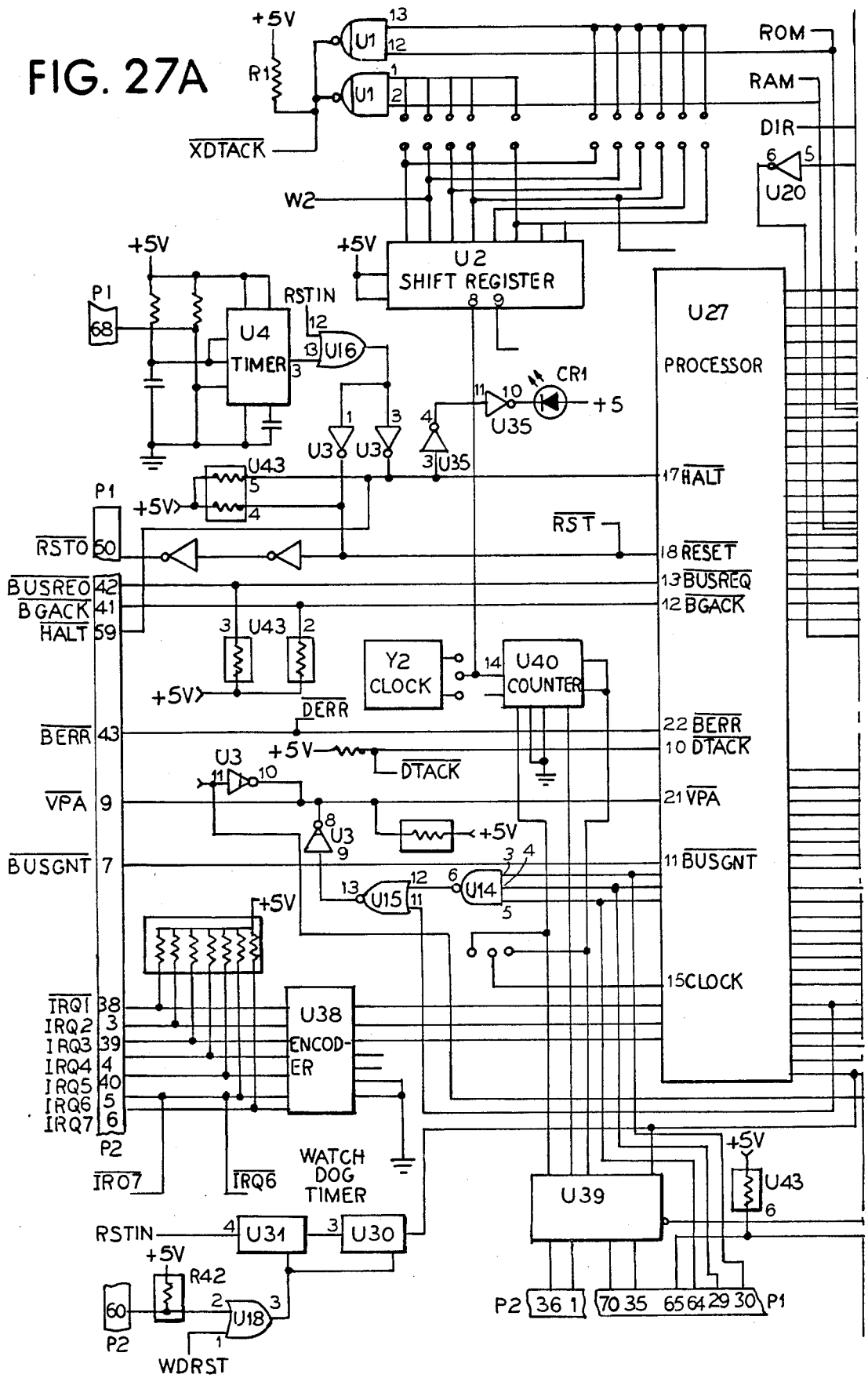
Figure 27B:
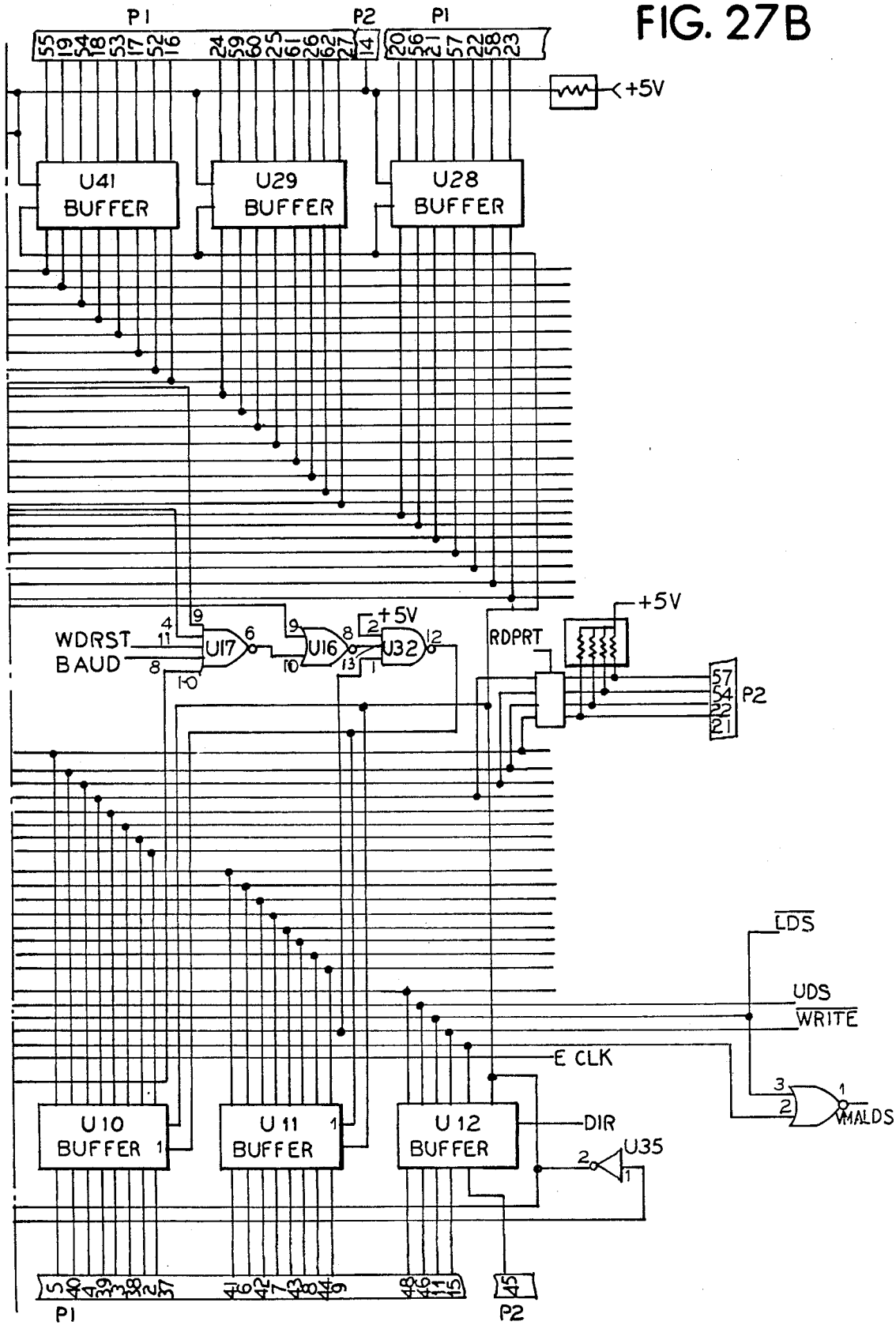
Figure 28A:
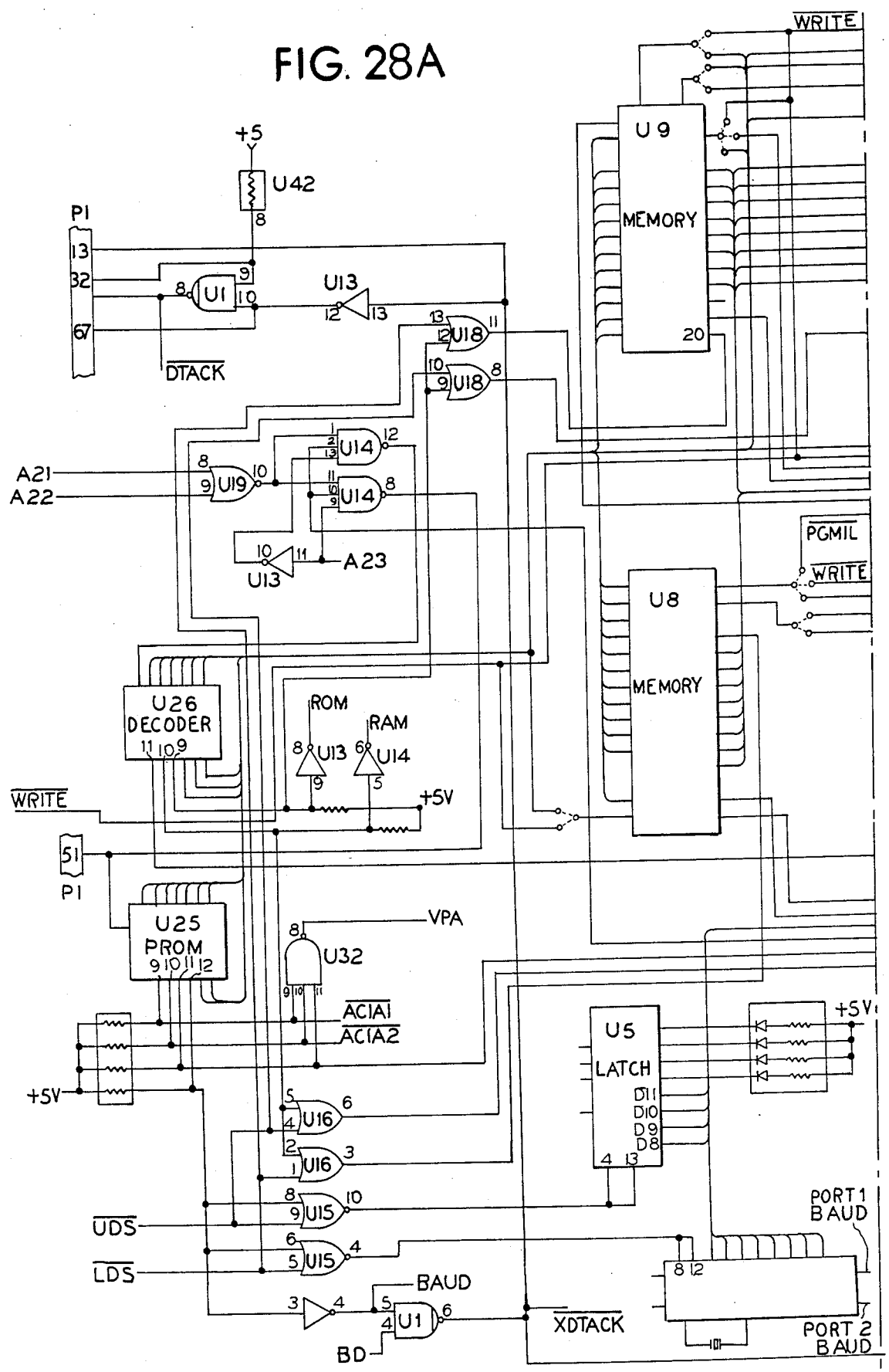
Figure 28B:
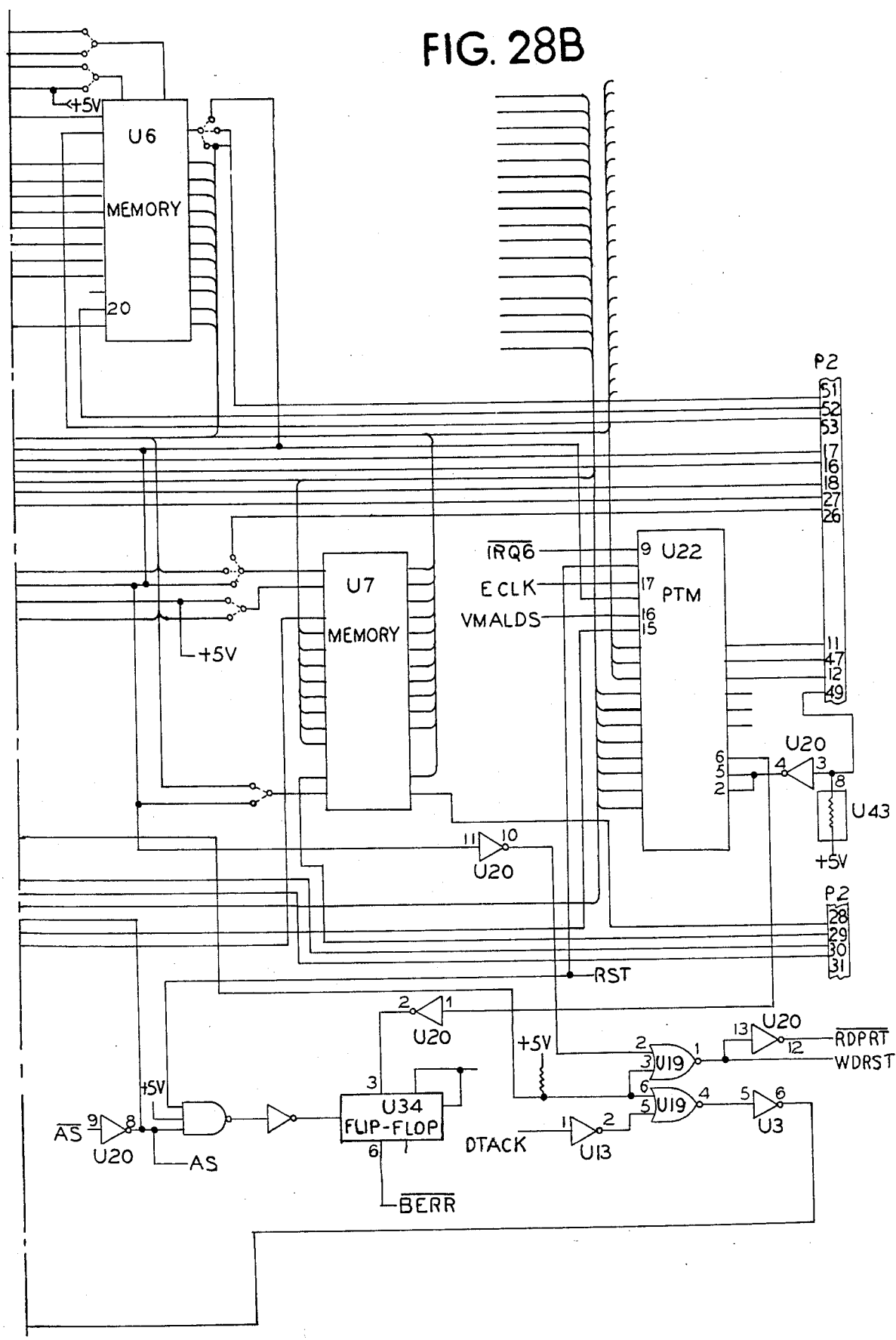
Figure 29:
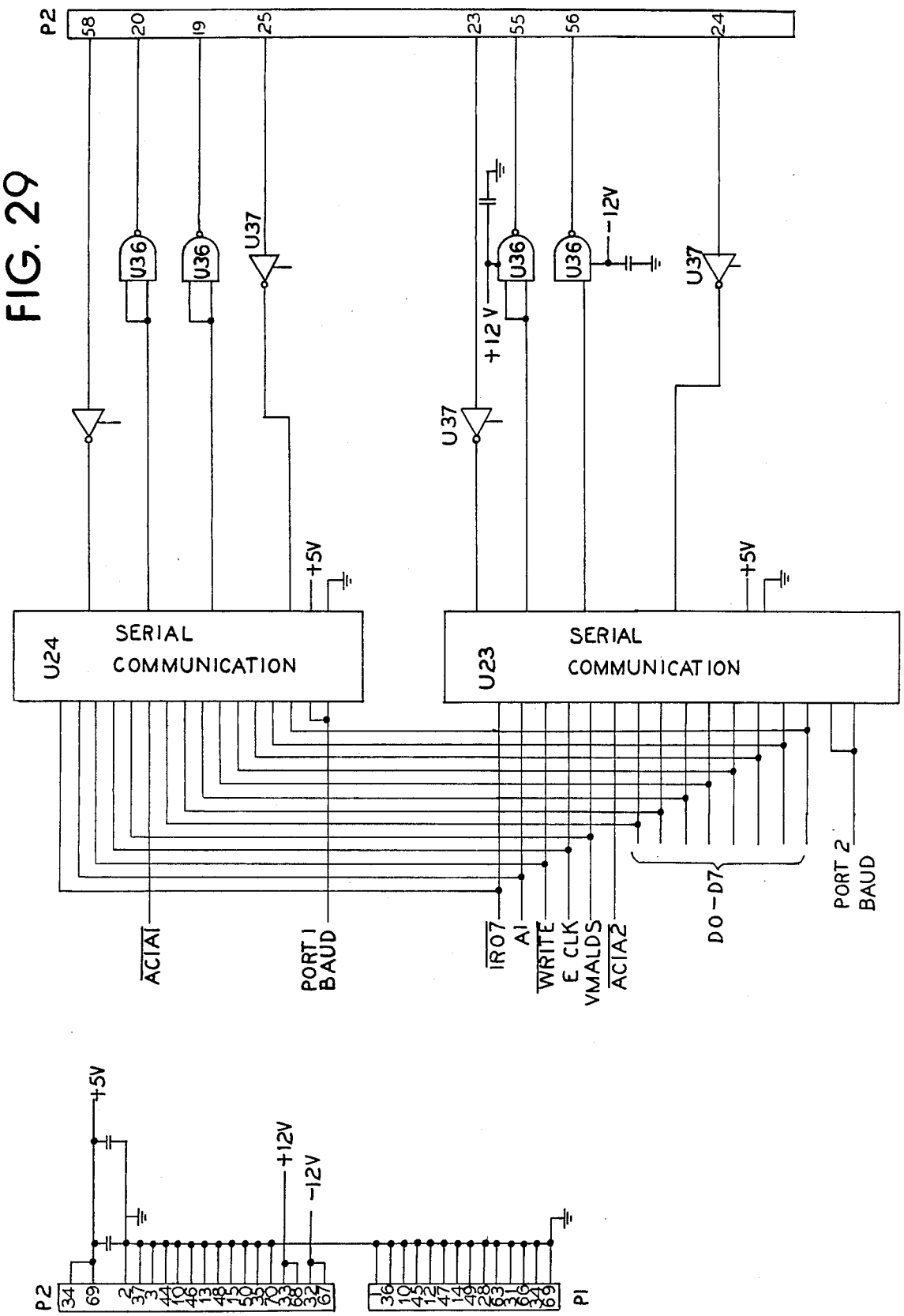

The schematic for the Keyboard PC Board assembly is provided by drawing 506-1673. This schematic shows the keytop nomenclature, crosspoint identification, and connector pinout identification for each keyswitch. Physical location of the keyswitches is as follows:

CIRCUIT DESCRIPTION for Keyboard Interface PC Board (FIGS. 18, 26A & 26B)

The Keyboard Interface PC Board assembly contains circuitry for converting keyboard key actuations into serial words for transmission to the HEU. Part of the BIT circuitry is also located on this PC board; that is involved in initiating the test functions and in reporting out failure status. The Keyboard Interface PC Board assembly is located directly behind the keyboard at the front (pilot facing) end of the PDU. Location in close proximity to the keyboard is necessary to avoid running the key scan lines over an excessive distance, as they are susceptible to noise pickup. The keyboard assembly mates directly to a 20 pin female terminal array on the Keyboard Interface PC Board assembly, avoiding the necessity of an additional cable run in the PDU. Refer to Schematic Diagram 506-1650 during the discussion of this PC Board.

Functions contained on the Keyboard Interface PC Board Assembly are:
1. Scanning & Encoding of Keyswitch Matrix
2. Conversion of Keycode to Serial Data Word
3. Detection of Manual PDU TEST Command
4. Conversion of PDU Status Discretes to Serial Data Words Scanning & Encoding of Keyswitch Matrix; Conversion of Keycode to Serial Data Words The keys on the keyboard are divided into two groups; the Function Group containing keys that command or control HUD modes and functions (10 keys), and the Numeric Group containing the keys for entering numeric data (12 keys).

Each group is provided with a type 74C922 Keyboard Encoder chip (U1 & U2) capable of servicing up to 16 keyswitches connected in a 4×4 matrix. This chip determines that a key is "down", scans the matrix to determine which key, then outputs a four-bit parallel word representing that key along with a validity discrete to indicate data available. This chip does not scan continuously like a calculator chip, but only after determining that a key is "down". The keyboard encoder chips also contain key debouncing circuitry, the time constant of which is determined by capacitors C1 and C2. The value of these capacitors has been determined experimentally for proper debouncing of the type of keyswitch used in the PDU keyboard. The encoder chips receive a clock signal of 6.4 KHz from the PDU Master Clock Generator located on the Display Logic PC Board.

Information regarding the matrix positions of each key can be found on the Schematic Diagram, 506-1673, for the Keyboard assembly. Data output of each keyboard encoder chip (U1 & U2) is provided to a four-bit parallel tri-state buss. This buss feeds four of the input lines for Transmit Data on the UART chip (U3, type MM5303), and four of the address lines on fusible-link PROM (U4, type 74LS288). Each of the keyboard encoder chips is provided with a Data Available output which goes high when a key depression has resulted in stable data in the encoder chip. This signal is inverted by a section of U6 and applied to the Output Enable (pin 13) of the encoder chip, placing the data on the tri-state buss. These Output Enable signals (Mutually exclusive for each encoder) are also supplied to Transmit Data inputs TD5 and TD6 (pins 30 & 31) of the UART, and result in bits within the output word identifying which encoder (key group) originated the data.

The logical "OR" of the Output Enables is provided to monostable U7 (54LS123) which generates a one microsecond Transmit Data Strobe pulse to the UART on pin 23, commanding it to send out the serial word on pin 25. This data is sent through the PDU wiring harness to a line driver on the Z-Axis Logic PC Board assembly for transmission to the HEU. The UART is used only as a transmitter; its receive mode remains unused in this application. Additional circuitry associated with the UART is Zener diode VR1, type 1N963B, and associated components used to provide a local source of $-12$ VDC required on pin 2 ($V_{GG}$), and circuitry associated with a section of U6 (pins 11-12-13) used to provide an initialization pulse at UART pin 21 during powerup. Clock signal of 316.8 Khz is supplied to the UART on pin 40 from the PDU Master Clock Generator.

A Code Table is given below relating key actuations to their serial data words. This table pertains to the Pilatus configuration of the HUD system, and other configurations may vary in these keycode assignments.

| NUMERIC GROUP | | | FUNCTION GROUP | | |
|---|---|---|---|---|---|
| KEY | MATRIX | KEYCODE | KEY | MATRIX | KEYCODE |
| ENTR | NX1-NY1 | 00010000 | IAS/MACH | FX1-FY1 | 00100000 |
| 7 | NX2-NY1 | 00010001 | BLANK | FX2-FY1 | 00100001 |
| 8 | NX3-NY1 | 00010010 | N/C | FX3-FY1 | 00100010 |
| 9 | NX4-NY1 | 00010011 | TIME | FX4-FY1 | 00100011 |
| BLANK | NX1-NY2 | 00010100 | RAD/BARO | FX1-FY2 | 00100100 |
| 4 | NX2-NY2 | 00010101 | PRMTR | FX2-FY2 | 00100101 |
| 5 | NX3-NY2 | 00010110 | N/C | FX3-FY2 | 00100110 |
| 6 | NX4-NY2 | 00010111 | BLANK | FX4-FY2 | 00100111 |
| 0 | NX1-NY3 | 00011000 | FLT | FX1-FY3 | 00101000 |
| 1 | NX2-NY3 | 00011001 | PRGM | FX2-FY3 | 00101001 |
| 2 | NX3-NY3 | 00011010 | PDUTEST | FX3-FY3 | 00101010 |
| 3 | NX4-NY3 | 00011011 | SYSTEST | FX4-FY3 | 00101011 |
| N/C | NX1-NY4 | 00011100 | TESTING | FX1-FY4 | 00101100 |
| N/C | NX2-NY4 | 00011101 | FAILMODE | FX2-FY4 | 00101101 |
| N/C | NX3-NY4 | 00011110 | N/C | FX3-FY4 | 00101110 |
| N/C | NX4-NY4 | 00011111 | N/C | FX4-FY4 | 00101111 |

Conversion of PDU Status Discretes to Serial Data Words

In addition to the physical keyswitches provided on the Keyboard assembly, keyboard encoder chip U1 (function group) receives two "phantom" key inputs in the form of analog switch (U5) closures. One of these closes when a PDU TEST cycle is in progress, and the other closes when a failure in the PDU from an uncommanded dead beam condition occurs. Each of these closures generates a specific word sent by the UART the HEU, so that the system software can be advised of the status of the PDU. These actions make up part of the BIT system.

Detection of Manual PDU TEST Command

Most changes in keyboard configuration required for specific PDU models or customer requirements would result in reassignments of the output data words representing specific keys, and could easily be handled by a table change in the HEU system software. However, one of the PDU keys is used to initiate a PDU self test independently of software; therefore the four-bit buss plus the Data Available line from encoder U1 is supplied to fusible-link PROM U4 (74LS288). This chip is programmed to recognize the depression of the key assigned to PDU TEST and close a section of analog switch U5, placing a "low" on the TEST CMD line, which is sent to the circuitry responsible for initiating a PDU BIT cycle. If the keyboard matrix changes to suit a specific requirement, this PROM would be programmed to recognize the new PDU TEST key.

CPU Board (15, FIG. 2, & FIGS. 27A, 27B, 28A, 28B & 29)

The JET-16 CPU board is the heart of the HUD system, and is composed of a Motorola MC68000 microprocessor, a 6840 timer (PTM), two 6850 Asynchronous Communication Interface Adapters (ACIAs), a COM8136 programmable baud rate generator, a 16 MHertz system clock, a hardware watchdog timer, buffering for all address, data and control lines, and 4 socket locations for various combinations of Ram and Eprom.

The system clock is provided by Y2 a 16 MHertz crystal oscillator in an hermetically sealed DIP. The 16 MHertz is fed to U2 DTACK timer on pin 8 and U40 pin 14 a 4 bit binary counter with outputs of 8, 4 and 2 MHertz. The 8 MHertz is fed to the processor U27 at pin 15 and is the basis for all of the internal timing in the MC68000.

Power-on reset is provided by U4 a 555 timer which is configured as a one-shot. A high of approximately 500 milliseconds is asserted at pin 3 of U4 and is OR-tied with the Watchdog timer output at U16-12,13 this pulse is applied to U3-1,3 which inverts the pulse and drives the processor HALT* and RESET* lines low for 500 milliseconds on power on. the HALT* signal is applied to CR1 light emitting diode through buffers U35-3,4 and U35-11,10 the LED is active on reset and whenever the processor is halted. The RESET* and HALT* lines of the processor are bi-directional and require open-collector devices with pull-ups to drive them, the pull-ups are provided at U43-4,5.

U30 and U31 form the Watchdog timer which is used to reset the processor if a failure occurs in software or hardware that causes the processor to not execute the code which generates the Watchdog reset pulse. U30 and U31 are 14 stage binary counters. U30 has as its input the processor Enable clock free running at 800 KHertz (1.25 microsecond period). The output of U30 at pin 3 is a clock with period of 0.02048 seconds which is applied to U31 input. U31 pin 4 will produce an output in 1.31 seconds if U30 and U31 are not reset by a pulse going high on U18-3. If the pulse does not occur the processor is reset and the entire system is reinitialized. In order for U18-3 to pulse high, pin 2 has to be pulled low at P2-60. If P2 pin 60 is not tied down then R42 pulls U18-2 up to 5 volts and the watchdog timer is disabled. If U18-2 is tied down then U18-1 is gated through, this signal WDRST is generated from a decoded output of U26-11 Address Decoder Prom. The decoder output of U26-11 is gated with inverted Write* which is actually then Read*, the active high signal WDRST is produced at U19-1 and is also inverted at U20-12 for signal RDPRT*. The PTM U22 generates an interrupt every 25 milliseconds which causes the processor to enter a subroutine that reads the decoded address 100000(hex) and sends out the WDRST pulse. As long as WDRST occurs before U31-4 times out (1.31 seconds) the Watchdog timer is reset and starts the count over again. If a malfunction occurs which causes the processor to stop reading 100000(hex) then the WDRST pulse will not be generated and the timer will time out causing the processor to be reset and the system will be reinitialized.

RDPRT* shares the same address as WDRST and is used to enable U39. IP0-IP3 are general purpose TTL inputs which are pulled high when not in use, normal useage would require a low level to be placed on any of these inputs. The processor periodically reads this input information by generating RDPRT* which enables U39 to place the levels on the data bus D0-D4.

U38 is an 8 input priority encoder, it is used to encode 8 levels of interrupt into 3 binary inputs (IPL0-IPL2) to the processor. All 8 inputs are pulled up through U44, a low level on any one of the inputs IRQ1-IRQ7 will cause the corresponding interrupt to be responded to by the processor.

U10-U12, U28, 29, U39 and U41 are buffers used to drive the signals that are going off the board. U11, U28, U29 and U41 are bus transceivers whose direction is determined by the signal DIR on P2-14 (used for testing), and the enable is provided by U35-2. U35-1 is pulled up by U43-6 and enters the board on P1-65 (also used for testing). U10,U12 are bus transceivers which are also enabled by U35-2 but the direction of data flow is determined by U32-12. Any address that decodes to a device on the JET-16 board puts a high on one of the inputs to U17-4,8,9,10 or 11 which puts a low at U17-6 and U16-10, U16-9 is normally low which gives a low at U16-8 and U32-13. U32-2 is tied high so if either U32-13 or U32-1 goes low a high is generated at U32-12, U10-1 and U12-1 and if U32-13 and U32-1 are both high then U32-12, U10-1 and U12-1 are low. All of this logic is simply to ensure that when data is read from a device on the JET-16 board the transceivers are not allowed to drive the local (on-board) bus.

U14-3,4 and 5 decode the function code outputs of the MC68000 to be all highs which puts a low at U14-6 and U15-12 where it is gated with AS* to ensure validity, when valid U15-13 and U31-9 go high and U31-8 goes low, this signal is VPA*. The function code of all highs (Interrupt Acknowledge) is produced when an interrupt occurs and, if auto-vectoring is desired this code is used to generate the VPA* signal as above. Auto-vectoring is used exclusively in the HUD system as it simplifies the hardware and is more than sufficient for the number of interrupt levels required by the system. 8 levels of interrupt are decoded using auto-vectors only 7 are useful the 8th is no interrupt pending.

The HUD system uses asynchronous bus cycles for all memory accesses. An asynchronous bus cycle consists of a memory access, with AS* to ensure validity, then some delay dependent on the specified access time of the memory devices and generation of DTACK* which tells the processor to complete the bus cycle. U2 is a serial input shift register and is used to generate the DTACK* signal for memory devices on the JET-16 board. U2-8 is the 16 MHertz clock input and U2-9 is Clr* input. When a memory cycle is started an address is presented on the address bus and AS* goes low to indicate that the address is valid, U20 inverts AS* at pin 8 which is presented to U2-9. When this clear input goes high the shift register begins shifting at the clock rate, since the serial input (pins 1,2) is tied high this high simply gets shifted through the register where it can be picked off at various stages depending on the memory requirements. U1-2,12 are the gating inputs of RAM and ROM respectively and are gated with U1-1,13 which are provided with jumpers to do the pickoff of the appropriate stage of U2. U1-3,11 are OR-tied open collector outputs pulled up by R1, this signal is XDTACK*. XDTACK* is used externally at P1-13 and also is asserted at U13-13 and inverted to U1-10, at U1 it is gated with SSG input from P1-32 (used for testing). SSG is normally open and therefore pulled high by U42-8, this high gates XDTACK through to U1-8 where it is DTACK*. DTACK* is an open collector output and is pulled up by R4 and applied to the processor at pin 10, DTACK*s from other boards in the system are also applied here through P1-33, they must be open collector outputs.

The processor inputs BSREQ* and BGACK* pins 13 and 12 respectively are not used by the HUD system but are provided to the connector for future use. P2-42 in BUSREQ* which is pulled high by U43-3 and P2-41 is BGACK* which is pulled high by U43-2. Also processor output BUSGNT* pin 11 is applied to connector P2-7 but is not used by the system.

Address decoding is accomplished by U13,U14,U19,U25 and U26. A23 is the most significant address bit and generally is used to distinguish between Memory devices and I/O devices (see address code chart) throughout the system. If A23 is low (indicating a memory address) then U13-11 and U14-9 will be low. U14-9 low will disable the gate and U14-8 will be high disabling U25 fuse-link PROM. U13-10 will go high, and if A22 and A21 are low (U19-9,8) then U19-10 will go high. Now U14-1 and U14-13 are high, as soon as A (U20-8) goes high indicating a valid address is present then U14-12 goes low enabling U26 fuse-link PROM.

Once the PROM has been enabled then A20-A12 are decoded to give outputs at U26-9,10 and 11. I/O decoding is similar except A23 must be high to enable U14-8 and U25 to decode A17-A9. JET-16 address decoding:

| CPU ADDRESS LINE | | | | | | | | | | | | DECODER | | |
|---|---|---|---|---|---|---|---|---|---|---|---|---|---|---|
| 23 | 22 | 21 | 20 | 19 | 18 | 17 | 16 | 15 | 14 | 13 | 12 | ADDRESS | DATA | TYPE |
| 0 | 0 | 0 | 0 | 0 | 0 | 0 | 0 | 0 | 0 | 0 | 0 | 000 | 7 | ROM 2764 |
| 0 | 0 | 0 | 0 | 0 | 0 | 0 | 0 | 0 | 0 | 0 | 1 | 001 | 7 | ROM 2764 |
| 0 | 0 | 0 | 0 | 0 | 0 | 0 | 0 | 0 | 0 | 1 | 0 | 002 | 7 | ROM 2764 |
| 0 | 0 | 0 | 0 | 0 | 0 | 0 | 0 | 0 | 0 | 1 | 1 | 003 | 7 | ROM 2764 |
| ROM ADDRESS IS FROM 0-3FFF(HEX) ON THE CPU BOARD USING 2764s. | | | | | | | | | | | | | | |
| 0 | 0 | 0 | 0 | 0 | 0 | 1 | 0 | 0 | 0 | 0 | 0 | 020 | B | RAM 6264 |
| 0 | 0 | 0 | 0 | 0 | 0 | 1 | 0 | 0 | 0 | 0 | 1 | 021 | B | RAM 6264 |
| 0 | 0 | 0 | 0 | 0 | 0 | 1 | 0 | 0 | 0 | 1 | 0 | 022 | B | RAM 6264 |
| 0 | 0 | 0 | 0 | 0 | 0 | 1 | 0 | 0 | 0 | 1 | 1 | 023 | B | RAM 6264 |
| RAM ADDRESS IS FROM 20000-23FFF(HEX) ON CPU BOARD USING 6264s. | | | | | | | | | | | | | | |
| 0 | 0 | 0 | 1 | 0 | 0 | 0 | 0 | 0 | 0 | 0 | 0 | 100 | D | PORTS |
| PORT (WDRST AND RDPRT*) ADDRESS IS 100000-100FFF(HEX) ON CPU BOARD. | | | | | | | | | | | | | | |

| CPU ADDRESS LINE | | | | | | | | | | | | | | DECODER | |
|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 09 | ADDRESS | DATA |
| 1 | 0 | 0 | 0 | 0 | 0 | 0 | 0 | 0 | 0 | 0 | 0 | 0 | 0 | 1 | 001 | B |
| 1 | 0 | 0 | 0 | 0 | 0 | 0 | 0 | 0 | 0 | 0 | 0 | 0 | 1 | 0 | 002 | E |
| 1 | 0 | 0 | 0 | 0 | 0 | 0 | 0 | 0 | 0 | 0 | 0 | 0 | 1 | 1 | 003 | D |
| 1 | 0 | 0 | 0 | 0 | 0 | 0 | 0 | 0 | 0 | 0 | 0 | 1 | 0 | 0 | 004 | 7 |

PTM ADDRESS IS 800201–80020F(ODD) DECODER ADDRESS IS 001
ACIA1 ADDRESS IS 800401,800403 DECODER ADDRESS IS 002
ACIA2 ADDRESS IS 800601,800601 DECODER ADDRESS IS 003
BAUD RATE GENERATOR ADDRESS IS 800801 DECODER ADDRESS IS 004
FAULT INDICATOR LATCH ADDRESS IS 800800 DECODER ADDRESS IS 004

U6,U7,U8 and U9 are 28 pin socket sites capable of handling many different types of memory devices. This versatility is made possible by jumper areas located near the sockets. The explanation that follows will consider only the most "normal" setup of these sockets i.e. U6 and U9 are 2764 EPROMs, U7 and U8 are 6264 type CMOS static RAMs. When U26 decodes an area of EPROM as listed in the chart then a low is asserted at U26-9, U13-9 and U18-9,12. U13-8 goes high and is applied to U1-12 where it waits for the DTACK* timer to generate DTACK* and complete the bus cycle. During the bus cycle UDS* and LDS* go low at U18-10,13 causing U18-8,11 to go low and cause CS*s pin 20 of U6 and U9 to below which allows data from the EPROMs onto the data bus. The RAM CS*s are similar except U16-1,2 and U16-4,5 do the gating of UDS* and LDS*. P2 pins 51,17,27 and 26 are tied to the Program inputs of the memory sockets and are normally tied high on the backplane. P2 pins 52,16,29 and 31 are tied to the Output Enable pins of the memory sockets and are normally tied low on the backplane. P2 pins 53,18,28 and 30 are tied to Programming Voltage input pins of memory sockets and are normally tied high on the backplane. The jumper areas by each memory socket provide combinations of address lines, Write line and +5 volts to appropriate pins on the sockets to allow many different combinations of memory devices to be used in the sockets.

When address 100000(hex) is decoded U26-11 goes low and U19-3,6 are low, DTACK* timing is provided by U13-1 going high from the DTACK timer, U13-2 goes low which puts low on U19-5. The lows on U19-5,6 cause U19-4 and U3-5 to go high and U3-6 goes low causing the DTACK to be supplied to the processor. WRITE* goes high (indicating a read) then U20-10 goes low and U19-2,3 are now low which causes a high at U19-1 WDRST and a low at U20-12 RDPRT*. WDRST is used to reset the Watchdog timer periodically and RDPRT* is used to read external data.

U25 fuse-link PROM is used to select the various I/O devices on the CPU board. U25-12 is selected to set the baud rate for both ACIAs and to latch the 4 bit LED display. When U25-12 goes low U13-3 is low and U13-4 and U1-5 go high, after appropriate time delay U1-4 goes high and U1-6 then goes low which is the DTACK to the processor. U15-6 and 8 are low and if LDS* is asserted U15-4 goes high and U21-8,12 go high causing the code placed on the data bus D0-D7 to be latched into the baud rate generator. The baud rates can be different from each ACIA but will be the same for transmit and receive of a given ACIA. If UDS* is asserted with U25-12 then U15-10 and U5-4,13 go high which latches in the data on D8-D11 to control which LEDs with light.

U25-9,10 and 11 all generate a VPA (valid peripheral address) tis signal is used to tell the processor that a synchronous bus cycle is necessary. Synchronous bus cycles are required when 6800 family peripheral chips are used with the MC68000 processor to synchronize the clocks of the 2 parts. U25-9,10 and 11 go to U32-11,10 and 9 if any of these go low then U32-8 goes high as does U3-11 which causes U3-10 to go low and assert VPA* at the processor. When VPA* goes low the processor syncs up with the 800KHertz Enable clock and then generates VMA* as an output. VMA* is gated with LDS* at U15-2,3 and produces VMALDS at U15-1.

When U25-11 is selected it puts a low on U22-15 chip select input of the PTM, this along wit VMALDS at pin 16 allow data to be written to or read from the PTM. Enable clock input is on pin 17 of U22 and is used as the basis for much of the timing in the HUD. The interrupt output pin 9 is tied to IRQ6* which generates a level 6 interrupt to the processor on programmable events. Normally P2-49 is open and is therefore pulled up by U43-8 this high at U20-3 causes a low at U20-4 which puts lows on U22-2,5 the gate inputs of the PTM, these gates need to below for the PTM counters to count. U22-6 is the output of counter number three of the PTM and is used to indicate a bus error; that is, a bus cycle that starts but does not receive back DTACK* or VPA* to terminate the cycle. The counter number 1 signals are put out to P2-11,12 and 47 for general purpose use (not used in HUD system). Counter number 3 output pin 6 is the bus error timer and is tied to clock input of flip-flop U34-3, if the timer times out, then a rising edge is presented to this input which clocks a low out U34-6 signalling a bus error to the processor U27-22.

U25-9 and 10 select ACIA1 or ACIA2 respectively. These parts U24 and U23 are serial communication devices with buffering (U36 and U37) to be compatible with RS232C signal levels. These devices are used mainly in test and debug of the system and are not normally used for HUD operation.

An aircraft real time display system is also of utility for providing a display image for viewing by an aircrew member while looking out of an aircraft at a scene relating to refueling or other airborne operation.

It will be apparent that many further modifications and variations may be effected without departing from the scope of the teachings and concepts of the present invention.

```
                              ;   Store the results of the scale factor test
                      tstb    d3                  ; Check the results
000372 4A03           jne     CLMPFAIL            ; Branch if failed
000374 660C           movw    #8,a7@-             ; Else signal everything
000376 3F3C 0008      jsr     SUBFAIL             ;   is ok
00037A 4EB9 0000 0000 jra     CLMPOK
000380 600A
                      CLMPFAIL:
000382 3F3C 0008      movw    #8,a7@-             ; Signal the
000386 4EB9 0000 0000 jsr     ADDFAIL             ;   failure
                      CLMPOK:
00038C 4CDF 00FB      moveml  a7@+,#0x00FB        ; Restore regs from stack
000390 4E75           rts                         ; Return ;   CLMPCALC - Clamp correction factor calculations
                      ;
                      CLMPCALC:
0002CA 48E7 1F00      moveml  #0x1F00,a7@-        ; Push D3-D7
0002CA 51C3           sf      d3                  ; Clear a reg for a test flag
0002CE 4CB9 00F0 0000 movemw  X2,#0x00F0          ; D4=X2, D5=X1, D6=Y1, D7=Y2
       2B3C
0002D8 48B9 00F0 0000 movemw  #0x00F0,CLMPX2      ; Store data for recording
       0000

;   Calculate X scale factor = (X1-X2)/SFDIFF
                      ;
0002E0 3005           movw    d5,d0               ; Load X1
0002E2 9044           subw    d4,d0               ; X1 - X2
0002E4 C0FC 0064      mulu    #100,d0             ; Scale by 100
0002E8 80FC 0A40      divu    #SFDIFF,d0          ; D0 = (X1 - X2) / SFDIFF = XSF
0002EC 0C40 0064      cmpw    #100,d0             ; Check against 100% limit
0002F0 6F04           jle     STOREXSF            ; Branch if within limits
0002F2 7064           moveq   #100,d0             ; Otw, limit XSF to 100%
0002F4 50C3           st      d3                  ; Remember the failure
                      STOREXSF:
0002F6 33C0 0000 2838 movw    d0,XSF              ; Store it ;   Calculate dots per degree for the X axis
                      ;
0002FC 3200           movw    d0,d1               ; Duplicate XSF in D1
0002FE C2FC 0088      mulu    #DOTPDEG,d1         ; D1 = XDOTPDEG
000302 33C1 0000 2834 movw    d1,XDOTPDEG         ; Store it ;   Calculate X bias = X1 - XSF * BIASOFF (include the 15 deg offset)
```

```
000308  C2FC 000F            mulu    #15,d1              ; 15 deg offset
00030C  C0FC 0D1C            mulu    #BIASOFF,d0         ; XSF * BIASOFF
000310  9280                 subl    d0,d1               ; D1 = 15 deg offset - nominal X1
000312  83FC 0064            divs    #100,d1             ; Remove scaling of 100
000316  D245                 addw    d5,d1               ; Add in actual X1 to get bias
000318  33C1 0000 282E       movw    d1,XBIAS            ; Store x bias ; Calculate Y scale factor = (Y1-Y2)/SFDIFF 00031E  3006                 movw    d6,d0               ; Load Y1
000320  9047                 subw    d7,d0               ; Y1 - Y2
000322  C0FC 0064            mulu    #100,d0             ; Scale by 100
000326  80FC 0A40            divu    #SFDIFF,d0          ; D0 = (Y1 - Y2) / SFDIFF = YSF
00032A  0C40 0064            cmpw    #100,d0             ; Check against 100% limit
00032E  6F04                 jle     STOREYSF            ; Branch if within limits
000330  7064                 moveq   #100,d0             ; Otw, limit YSF to 100%
000332  50C3                 st      d3                  ; Remember the failure
000334  STOREYSF:
000334  33C0 0000 283A       movw    d0,YSF              ; Store it ; Calculate dots per degree for the Y axis 00033A  3200                 movw    d0,d1               ; Duplicate YSF in D1
00033C  C2FC 0088            mulu    #DOTPDEG,d1         ; D1 = YDOTPDEG
000340  33C1 0000 2836       movw    d1,YDOTPDEG         ; Store it ; Calculate Y bias = Y1 - YSF * BIASOFF (include the boresight offset)

000346  3401                 movw    d1,d2               ; Dup YDOTPDEG in D2
000348  C0FC 0D1C            mulu    #BIASOFF,d0         ; YSF * BIASOFF
00034C  C2FC 001F            mulu    #DBLOFFST,d1        ; Twice the boresight offset
000350  E281                 asrl    #1,d1               ; Boresight offset
000352  9280                 subl    d0,d1               ; D1 = boresight offset - nominal Y1
000354  83FC 0064            divs    #100,d1             ; Remove scaling of 100
000358  D246                 addw    d6,d1               ; Add in actual Y1 to get bias
00035A  33C1 0000 2830       movw    d1,YBIAS            ; Store Y bias ; Calculate absolute Y bias = Y1 - YSF * BIASOFF (include the 15 deg offset)

000360  C4FC 000F            mulu    #15,d2              ; 15 deg offset
000364  9480                 subl    d0,d2               ; D2 = 15 deg offset - nominal Y1
000366  85FC 0064            divs    #100,d2             ; Remove scaling of 100
00036A  D446                 addw    d6,d2               ; Add in actual Y1 to get bias
00036C  33C2 0000 2832       movw    d2,AYBIAS           ; Store absolute Y bias
```

I claim as my invention:

1. An aircraft head up display system for providing a display image for viewing by a pilot in the pilot's field of view while looking out of an aircraft at a scene, in a forward direction, comprising:
   beam type image generating means having a light emitting screen providing a display region which is optically projected so as to provide a display image in the pilot's field of view, and having margin regions which are not optically projected into the pilot's field of view, said image generating means having a deflectable beam for deflection over the display region, and capable of being deflected at the margin regions;
   real time operating means for controlling said image generating means to cause the generation of a real time display in the display region which varies essentially in real time according to the status of the aircraft in flight, so as to assist the pilot in the control of the aircraft; and
   beam position sensing means coupled with respective margin regions of the image generating means so as to provide respective beam actual position signals when the beam is momentarily aligned with the respective beam position sensing means,
   said real time operating means while maintaining the generation of the real time display which varies essentially in real time, further providing beam deflection commands to cause the beam to scan the respective margin regions according to a plurality of plural coordinate search patterns, each extending in at least both X and Y directions, said scanning of said beam according to said search pattern being restricted to said margin regions and the real time operating means comparing beam actual position signals received from the beam position sensing means to previously stored beam reference coordinate values to determine beam registration error, and automatically correcting the deflection of the beam to substantially eliminate the beam registration error during further generation of the real time display.

2. In an aircraft head up display system according to claim 1, said real time operating means generating correction signals which are a measure of scaling errors with respect to each of plural coordinates of a coordinate system defining points in said light emitting screen of the image generating means such that image lines generated in the display region are corrected as to position and proportion and are maintained with essentially correct geometry during operation of the aircraft.

3. In an aircraft head up display system according to claim 1, said real time operating means generating correction signals which are a measure of drift of the center of the real time display from a central optical axis corresponding to an aircraft longitudinal axis as seen in the pilot's field of view, and maintaining the center o the display image essentially coincident with the aircraft longitudinal axis as viewed by the pilot.

4. In an aircraft head up display system according to claim 1, said real time operating means generating correction signals which are a measure of scaling errors with respect to each of plural coordinates of a coordinate system defining points in said light emitting screen of the image generating means such that image lines generated in the display region are corrected as to position and proportion and are maintained with essentially correct geometry during operation of the aircraft, and said real time operating means generating correction signals which are a measure of drift of the center of the real time display from a central optical axis corresponding to an aircraft longitudinal axis as seen in the pilot's field of view, and maintaining the center of the display image essentially coincident with the aircraft longitudinal axis as viewed by the pilot.

5. In an aircraft head up display system according to claim 1, said real time operating means generating said sequences of beam deflection commands within a time interval of not more than twenty milliseconds.

6. In an aircraft head up display system according to claim 1, said real time operating means generating a plurality of successive beam deflection commands for each of said search patterns.

7. In an aircraft head up display system according to claim 1, said real time operating means during approach for a landing, generating said sequences of beam deflection commands at intervals of not greater than thirty seconds while maintaining said real time display without flicker.

8. In an aircraft head up display system according to claim 1, said beam position sensing means comprising photosensitive elements coupled with margin regions at diametrically opposite margins of the display region so as to provide for correction of both scaling and drift errors of said display image.

9. A real time display system, comprising
   beam type image generating means having first and second beam activated regions,
   real time operating means controlling said image generating means to effect the generation of a real time display in the first beam activated region which varies essentially in real time according to a physical process, and
   beam position sensing means coupled with said second beam activated region of the image generating means so as to provide beam actual position signals representing an actual instantaneous position of the beam with respect to at least two coordinate axes of a coordinate system,
   said real time operating means while maintaining the real time display which varies essentially in real time, further providing beam deflection signals causing the beam to scan said second beam activated region so as to produce said beam actual position signals, and said real time operating means supplying a sequence of plural coordinate digital commands for effecting deflection of the beam in accordance with a plurality of plural coordinate search patterns, each extending in at least both X and Y directions and only within said second beam activated region and in the vicinity of the coupling of said beam position sensing means with said second beam activated region and said real time operating means correcting the deflection of the beam so as to tend to maintain a constant relationship between respective coordinate reference values of the beam deflection signals with respect to the two coordinate axes, and beam activation of the beam position sensing means.

10. In a real time display system according to claim 9, said real time operating means storing a plural coordinate digital command value at which the search pattern activates the beam position sensing means.

11. In a real time display system according to claim 10, said real time operating means providing a sequence of digital commands in generating a subsequent search pattern based on a stored plural coordinate digital command value from a preivous search pattern.

12. In a real time display system according to claim 10, said real time operating means providing a further sequence of digital commands in generating a further search pattern, beginning at a stored digital command value corresponding to the position of the beam which produced the beam position signal in a previous search pattern.

13. In a real time display system according to claim 9, said operating means effecting deflection of said beam in said first and second beam activated regions by means of a common stroke type deflection control.

14. In a real time display system according to claim 9, said operating means effecting deflection of said beam over said light emitting screen by means of a common raster-type deflection control.

15. In a real time display system according to claim 14, said raster-type deflection control effecting scanning of the second beam activated region along successive linear beam paths which reliably cover the vicinity of the coupling of the beam position sensing means with said second beam activated region.

16. In a real time display system according to claim 15, said beam position sensing means defining a beam sensing point radially offset outwardly of the first beam activated region and lying at a distance from a beam undeflected position which is larger than a maximum beam deflection from the undeflected position which is required to generate said real time display.

17. In a real time display system according to claim 9, said beam position sensing means defining not more than four beam sensing locations.

18. In a real time display system according to claim 9, said beam position sensing means being coupled with only two beam sensing locations at diametrically opposite margins of the first beam activated region.

19. A display system, comprising:
beam type image generating means for producing a beam and having a light-emitting screen including a central display region and marginal regions radially offset from the central display region,
operating means controlling said image generating means to effect the generation of an optical image in said central display region,
photosensor means coupled with plural individual points at respective marginal regions of the image generating means so as to detect both horizontal and vertical beam deflection errors, the beam when in substantial alignment with the respective individual points causing the photosensor means to produce respective beam actual position signals,
said operating means having beam deflection driver means for effecting deflection of the beam both in the central display region and in the marginal regions, and having deflection control means coupled with said deflection drive means for effecting generation of an optical image in said central display region and for effecting scanning of the beam over said marginal regions so as to activate said photosensor means to generate the respective beam actual position signals, said operating means supplying a sequence of plural coordinate commands for effecting deflection of the beam in accordance with a plurality of plural coordinate search patterns, each extending in at least both X and Y directions and only within said marginal regions and in the vicinity of the plural individual points coupled with said photosensor means,
said operating means correcting the deflection of the beam based on the values of driving signals applied to the beam deflection driver means which are required to cause the beam to activate the photosensor means via the respective individual points thereby maintaining the optical image in a predetermined position on said light emitting screen.

20. In a display system according to claim 19, said operating means correcting the deflection of the beam based on a comparison of the values of driving signals required to cause the beam to impinge on individual points at diametrically opposite sides of an undeflected position of the beam so as to tend to maintain a fixed relationship between a center of the optical image and a center of the light-emitting screen.

21. In a display system according to claim 19, said operating means correcting the deflection of the beam based on a comparison of the values of driving signals required to activate respective points which are substantially spatially separated with respect to a given coordinate system axis so as to tend to maintain a constant scale of the optical image with respect to such coordinate system axis.

22. In a display system according to claim 19, said operating means correcting the deflection of the beam based on a comparison of the values of driving signals required to cause the beam to impinge on individual points at diameterically opposite sides of an undeflected position of the beam so as to tend to maintain a fixed relationship between a center of the optical image and a center of the light-emitting screen, and so as to tend to maintain a constant scale of the optical image.

23. In a display system according to claim 19, with said beam type image generating means producing a substantial field in the vicinity of the light-emitting screen, and said photosensor means being located remote from said light-emitting screen and being optically coupled with respective individual points at the light emitting screen.

24. In a display system according to claim 23, said photosensor means having respective fiber optic cable means of substantial length coupling said photosensor means with the respective individual points at the respective marginal regions of the light-emitting screen.

25. In a display system according to claim 24, said operating means comprising operational amplifier means having a given open circuit gain, and capacitive coupling means coupling said photosensor means with said operational amplifier means such that said operational amplifier means transmits a signal with substantially said open circuit gain when the photosensor means is activated by the beam.

26. In a display system according to claim 25, said photosensor means comprising PIN diodes having respective first terminals at ground potential and having a common capacitor connecting second terminals thereof with an input of said operational amplifier means.

27. In a display system according to claim 25, with said operational amplifier means having first input means coupled with said photosensor means, and having second input means, and test pulse generator means connected with said second input means of said operational amplifier means for effecting a test activation of said operational amplifier means simulating the activation of said photosensor means.

28. In a display system according to claim 27, said operational amplifier means having means for maintaining said operational amplifier means unresponsive to activation of said photosensor means for so long as a test signal is supplied to said second input means.

29. In a method for automatically maintaining a desired geometrical relationship between beam deflection commands and the location of a resultant image display on a beam activated display screen in spite of variable influences due to temperature changes, component aging effects, and the like, said method comprising:
- establishing reference beam deflection command values for representing respective beam position sensing locations within the range of deflection of the beam,
- supplying beam deflection commands causing the beam to trace a resultant image display and to maintain the image display according to real time changes in physical events, and while maintaining said image display without perceptible flicker also causing scanning of the beam in the vicinity of respective beam position sensing locations, by supplying a sequence of plural coordinate commands for effecting deflection of the beam in accordance with a plurality of plural coordinate search patterns, each extending in at least both X and Y directions and only within said beam position sensing locations,
- comparing the beam deflection commands actually corresponding to the beam position sensing locations with reference beam deflection command values to obtain beam deflection correction values, and
- thereafter modifying the commands in accordance with said beam deflection correction values to substantially maintain the desired geometrical relationship between the resultant image display and the beam deflection commands.

30. In a method according to claim 29, with a display screen having an electrostatic field in the vicinity thereof which would tend to interfere with electronic sensing of the beam at the beam position sensing locations, said method including conducting light pulses produced at the display screen by impingement of the beam at the beam position sensing locations to remotely located photosensor means disposed out of the effective range of the electrostatic field.

31. In a method according to claim 30, said method comprising supplying beam deflection commands maintaining the image display at a central region of the display screen, and conducting light pulses to the photosensor means from beam position sensing locations outside of the central region.

32. In a method according to claim 31, said method comprising conducting light pulses to the photosensor means from not more than four point-like beam position sensing locations at the margin of the display screen.

33. In a method according to claim 31, said method comprising conducting light pulses to the photosensor means from only two point-like beam position sensing locations arranged generally diametrically opposite each other at the margin of the display screen.

34. In a method according to claim 29, said method comprising supplying beam deflection commands to cause scanning of the beam in the vicinity of the respective beam position sensing locations at least every thirty seconds while maintaining the image display without perceptible flicker.

35. In a method according to claim 29, said method comprising
- supplying beam deflection commands causing the beam to trace along beam paths of various slopes in a direct stroke generating fashion in producing the image display, and supplying respective sets of beam deflection commands defining respective beam search patterns in the vicinity of the respective beam position sensing locations also in a direct stroke generating fashion.

36. A method of maintaining a selected scanning relationship between information to be displayed and magnitudes of corresponding beam deflections over a beam activated display screen, said method comprising:
(a) establishing at least two beam position sensing locations within the range of deflection of the beam,
(b) causing the beam to produce an image display on the display screen, and also causing the beam to scan the display screen in the vicinity of each of the beam position sensing locations contemporaneously with the production of the image display, and effecting deflection of the beam in accordance with a plural coordinate search pattern in at least both x and Y directions and only within said beam position sensing location for each beam sensing location,
(c) producing a deflection command signal in response to scanning the beam position sensing location,
(d) sensing the magnitude of said deflection command signal required to cause the beam to register with the beam position sensing location, and
(e) correcting subsequent deflection command signals based on the sensed magnitude of step (d) to establish a fixed scanning relationship between the information to be displayed and the resultant magnitudes of corresponding beam deflections.

37. A method according to claim 36, with said method comprising
- causing the beam to produce an image display at a central region of the display screen and also causing the beam to scan the display screen at a margin region thereof, the beam position sensing location being in such margin region of the display screen and being reliably offset from the central region, and blocking transmission of light from such margin region of the display screen to a viewer who is observing the image display so that steps (b), (c) and (d) may be carried out while a viewer is observing the image display without being distracted by the beam scanning at the margin region of the display screen.

38. A method according to claim 37, with said method comprising
- establishing beam position sensing locations at diametrically opposite margin regions of the display screen,
- causing the beam to scan the diametrically opposite margin regions,
- sensing the magnitudes of deflection command signals required to cause the beam to register with the respective beam position sensing locations,
- and correcting the subsequent deflection command signals so that the image display tends to remain centered with respect to the display screen.

39. The aircraft head up display system according to claim 1, wherein each of said beam position sensing means is a single photodetector.

40. The aircraft head up display system according to claim 39, wherein each of said margin regions has only one beam position sensing means.

41. The aircraft head up display system according to claim 9, wherein said beam position sensing means is a single photodetector.

42. The aircraft head up display system according to claim 41, wherein said second beam activated region has only one beam position sensing means.

43. The aircraft head up display system according to claim 19, wherein said photosensor means is a single photodetector coupled to one individual point in each margin region.

44. The aircraft head up display system according to claim 29, wherein said beam sensing location has only one photodetector.

45. The aircraft hed up display system according to claim 36, wherein said beam sensing location has only one photodetector.

* * * * *